United States Patent
Lake-Schaal et al.

(10) Patent No.: US 12,280,308 B2
(45) Date of Patent: Apr. 22, 2025

(54) INTRA-VEHICLE GAMES

(71) Applicant: WARNER BROS. ENTERTAINMENT INC., Burbank, CA (US)

(72) Inventors: Gary Lake-Schaal, Los Angeles, CA (US); Arvel Chappell, III, Los Angeles, CA (US); Pamela J. Allison, Los Angeles, CA (US); Lewis Ostrover, Los Angeles, CA (US); William Zajac, La Crescenta, CA (US); Lea Carla L. Buenaventura, Los Angeles, CA (US); Genevieve Morris, Los Angeles, CA (US); Prashant Abhyankar, Burbank, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 111 days.

(21) Appl. No.: 17/429,293

(22) PCT Filed: Feb. 7, 2020

(86) PCT No.: PCT/US2020/017339
§ 371 (c)(1),
(2) Date: Feb. 7, 2022

(87) PCT Pub. No.: WO2020/163801
PCT Pub. Date: Aug. 13, 2020

(65) Prior Publication Data
US 2024/0335738 A1  Oct. 10, 2024

Related U.S. Application Data

(60) Provisional application No. 62/803,386, filed on Feb. 8, 2019.

(51) Int. Cl.
*A63F 13/216* (2014.01)
*A63F 13/795* (2014.01)
(Continued)

(52) U.S. Cl.
CPC .......... *A63F 13/216* (2014.09); *A63F 13/795* (2014.09); *A63F 13/803* (2014.09); *A63F 13/814* (2014.09)

(58) Field of Classification Search
CPC .... A63F 13/216; A63F 13/795; A63F 13/803; A63F 13/814
(Continued)

(56) References Cited

U.S. PATENT DOCUMENTS 8,577,543 B2 * 11/2013 Basir .................... G07C 5/0833
455/563
9,687,729 B2 * 6/2017 Hansson ................. A63F 13/55
(Continued)

FOREIGN PATENT DOCUMENTS

EP          3244591 A1    11/2017
KR    10-2018-0084496 A    7/2018
WO    WO 2019/068025 A1    4/2019

OTHER PUBLICATIONS

Jade Star, "Flockmod! Art competition! Episode 1", https://www.youtube.com/watch?v=SNVm0AXCCcE, Mar. 22, 2015. (Year: 2015).*
WO, PCT/US2020/017339 ISR and Written Opinion, Jun. 10, 2020.
"The Field Trip to Mars" retrieved from http://framestorevr.com/field-trip-to-mars, 2016, pp. 1-5.
EPO, EP 20752461.2 Extended European Search Report, Oct. 7, 2022.

*Primary Examiner* — Michael A Cuff
(74) *Attorney, Agent, or Firm* — Bookoff McAndrews, PLLC

(57) ABSTRACT

A smart media player configures interactive media customized for passengers temporarily sharing a common conveyance (e.g., an automobile or other vehicle), using programmed methods. The methods include identifying profile data for each of the passengers and trip data for the common (Continued)

conveyance. Then, the smart media player may select an interactive media title for the passengers as a group based on at least one of the profile data or the trip data, including one or more of a variety of games for playing with other passengers in the vehicle. The interactive media title may be configured for output by the smart media player while the passengers are sharing the common conveyance. The media player plays the interactive media title in the common conveyance enabled for interaction with the passengers during the period.

24 Claims, 35 Drawing Sheets

(51) Int. Cl.
*A63F 13/803* (2014.01)
*A63F 13/814* (2014.01)

(58) Field of Classification Search
USPC .......................................................... 463/36
See application file for complete search history.

(56) References Cited

U.S. PATENT DOCUMENTS

| | | | |
|---|---|---|---|
| 10,812,976 B2* | 10/2020 | Ramic | H04W 4/40 |
| 11,420,552 B2* | 8/2022 | Singh | B60Q 3/76 |
| 2013/0030645 A1* | 1/2013 | Divine | B60K 35/00 |
| | | | 709/217 |
| 2015/0077235 A1* | 3/2015 | Pisz | G06F 3/017 |
| | | | 340/426.23 |
| 2015/0077327 A1 | 3/2015 | Pisz et al. | |
| 2016/0133230 A1* | 5/2016 | Daniels | G06F 3/147 |
| | | | 345/633 |
| 2017/0309072 A1 | 10/2017 | Li et al. | |
| 2018/0040163 A1 | 2/2018 | Donnelly et al. | |
| 2018/0189717 A1 | 7/2018 | Cao | |
| 2018/0357233 A1 | 12/2018 | Daze et al. | |
| 2018/0374016 A1* | 12/2018 | Sano | G05D 1/0212 |
| 2019/0282892 A1* | 9/2019 | Miyaki | A63F 13/212 |
| 2019/0303438 A1* | 10/2019 | Wilson | G10L 15/1815 |
| 2019/0318648 A1* | 10/2019 | Zhang | G06N 3/08 |
| 2022/0409996 A1* | 12/2022 | Gonzalez Franco | G06F 3/011 |

* cited by examiner

Trip Data 600

| ID | A | B | ... | n |
|---|---|---|---|---|
| Pick Up | X0 | X1 | ... | Xn |
| Initial Location | X0 | X1 | ... | Xn |
| Terminal Location | Xz | Xz | ... | Xz |
| Drop Off | Xz | Xz | ... | Xz |
| Duration (min) | 150 | 60 | ... | 30 |
| Intermediate Locations | IL1, IL2, IL3, IL4 | IL2, IL3, IL4 | ... | n/a |
| Visible Places (Trip Event) | Beach, Dog Park, Bridge, Café Sign | Dog Park, Bridge, Café Sign | ... | Café Sign |

2401
IDENTIFYING, BY ONE OR MORE PROCESSORS, PROFILE DATA FOR EACH OF THE PASSENGERS AND TRIP DATA FOR THE COMMON CONVEYANCE

2402
SELECTING, BY THE ONE OR MORE PROCESSORS, AN INTERACTIVE MEDIA TITLE FOR THE PASSENGERS AS A GROUP

2403
PROVIDING, BY THE ONE OR MORE PROCESSORS, THE INTERACTIVE MEDIA TITLE CONFIGURED FOR OUTPUT BY AT LEAST ONE INTERACTIVE MEDIA PLAYER DURING A PERIOD IN WHICH THE PASSENGERS ARE SHARING THE COMMON CONVEYANCE

2404
PROVIDING, BY THE ONE OR MORE PROCESSORS, THE INTERACTIVE MEDIA TITLE CONFIGURED FOR OUTPUT BY AT LEAST ONE INTERACTIVE MEDIA PLAYER DURING A PERIOD IN WHICH THE PASSENGERS ARE SHARING THE COMMON CONVEYANCE

FIG. 24B

2405
CONFIGURING, BY THE ONE OR MORE PROCESSORS, PARAMETERS OF THE INTERACTIVE MEDIA TITLE BASED AT LEAST IN PART ON THE PROFILE DATA AND THE TRIP DATA

2406
DEFINING A ROUTE FOR THE COMMON CONVEYANCE BASED AT LEAST IN PART ON THE INTERACTIVE MEDIA TITLE

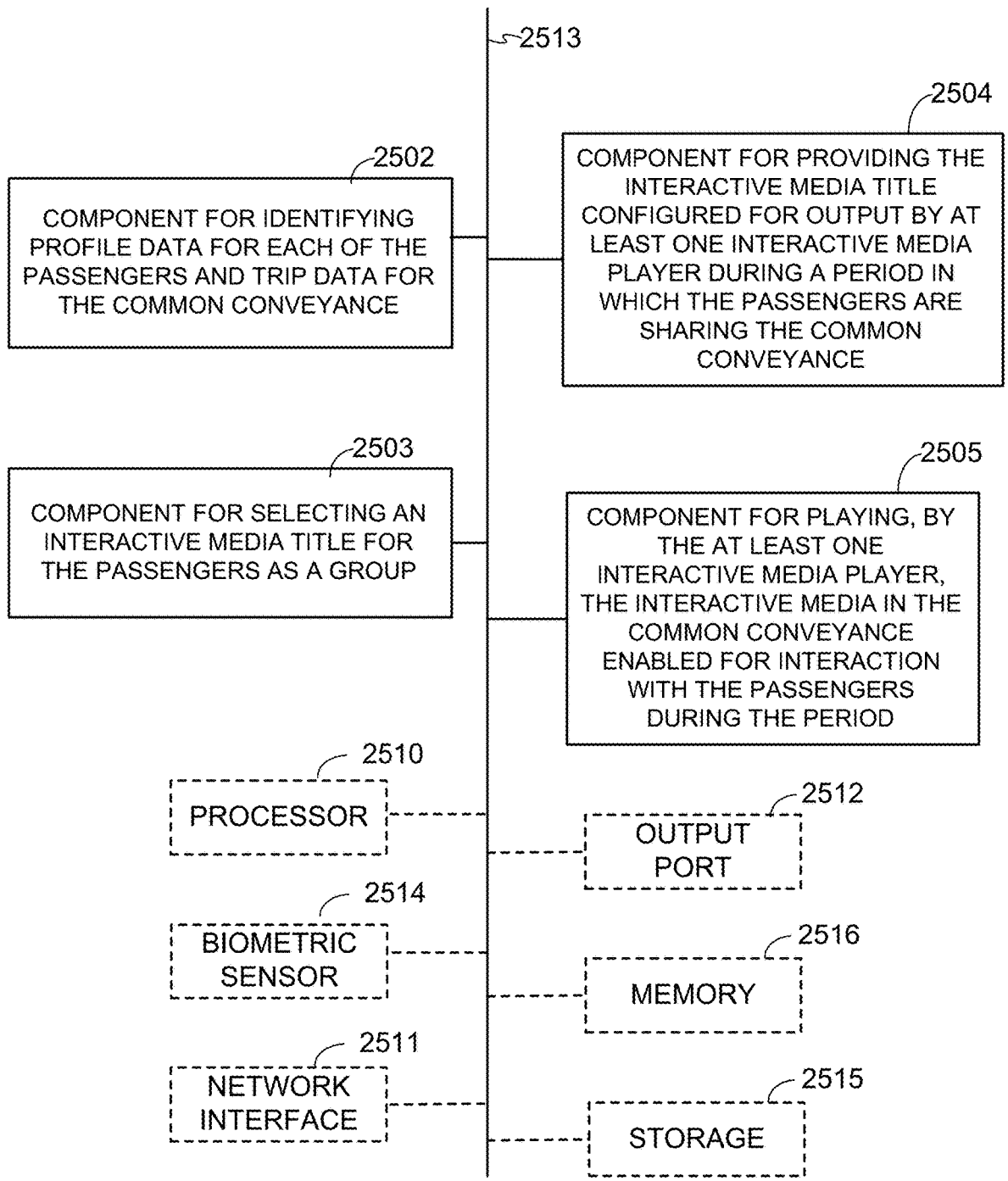

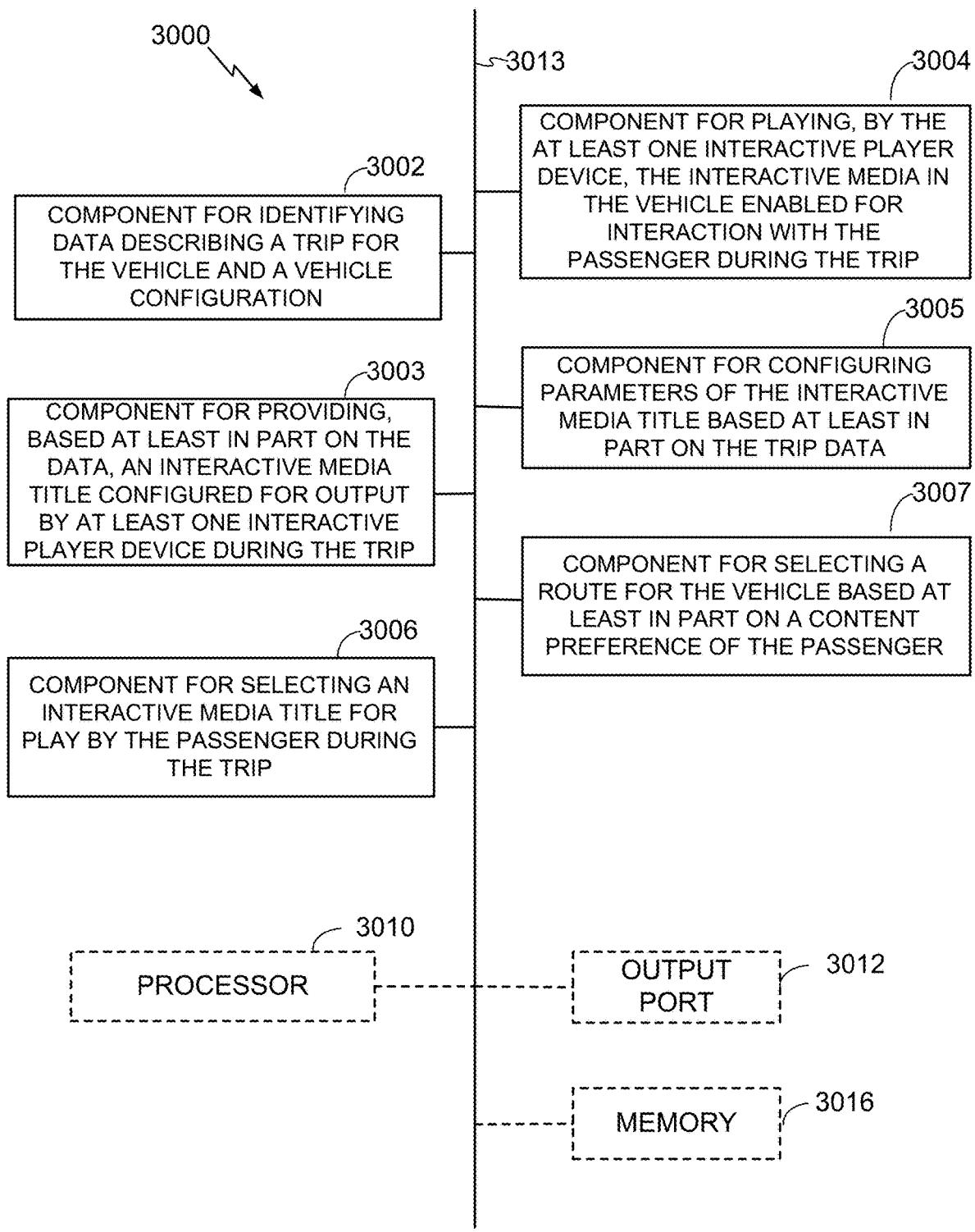

INTRA-VEHICLE GAMES

PRIORITY CLAIM

The present application is a 371 of International Application Serial No. PCT/US2020/017339, filed Feb. 7, 2020, which claims priority to U.S. Provisional Patent Application Ser. No. 62/803,386 filed Feb. 8, 2019, both of which are incorporated in their entireties by reference.

FIELD

The present disclosure relates to methods and apparatus for configuring route-related games customized for a passenger traveling in a vehicle or a group of passengers temporarily sharing a common conveyance, based on trip data and/or passenger profile data.

BACKGROUND

As people increasingly use ride-sharing services for transportation, and as investment in self-driving and connected cars increases, increasing content consumption during transportation in vehicles is foreseeable. Already, consumers can choose their own entertainment from channels available through their car's audio system, their smartphone's interface, or a seatback entertainment system as in airplanes, buses and trains. Passengers can watch their vehicle as it navigates towards its destination. But they cannot automatically configure the interactive media content consumed during travel based on route-based information, except by manual effort.

Traditional travel games are known in several platforms. Branching narratives in computer-generated audio-video entertainment date back to the 1980's or earlier. Sophisticated video games of the present day blur the boundary between narrative and interactive entertainment, blending branching and interactive techniques. Immersive entertainment technologies such as virtual and augmented reality bring further opportunities to enthrall viewers. Data mining by machine learning enables discovery of new correspondences between low-level data and various targets, including consumer preferences and propensities. Proliferation of mobile phones and Internet of Things (IoT) devices drive an explosion of network-connected sensors. Much data for interactive media content configuration, including configuration of games available in vehicles, is available from various sources. But technologies for using this content to deliver customized interactive game based on route-related information are rudimentary.

It would be desirable, therefore, to develop new methods and other new technologies for configuring interactive media customized for passengers temporarily sharing a common conveyance in relation to specific trips by specific passengers, or by a single passenger traveling in a vehicle with specific route information, that overcome these and other limitations of the prior art and deliver more compelling entertainment experiences for the audiences of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a computer-implemented method executed by a digital media player (e.g., a smart media player) configures interactive media customized for passengers temporarily sharing a common conveyance. As used herein, a "digital media player" is a computing apparatus or system comprising a processor or cooperating processors configured with executable instructions and components for receiving digital inputs from user interface devices and sensors, processing the digital input determining therefrom a digital output from a store of media components, e.g., video, audio, and other data configured for producing human-perceptible output, for example, smart phones (mobile client devices), system of mobile smart devices and a local server. A "conveyance" may be, or may include a vehicle or vessel for transporting one or more passengers, including, in some embodiments, one or more drivers, pilots, or the like. A "common conveyance" is a conveyance occupied or configured for two or more passengers. The method may include identifying, by one or more processors of the media player, profile data for each of the passengers and trip data for the common conveyance. The method may include selecting, by the one or more processors, an interactive media title for the passengers as a group based on at least one of the profile data or the trip data. The interactive media title may be, or may include, a game, a branched narrative, or other content responsive to user input. The method may include providing, by the one or more processors, the interactive media title configured for output by at least one interactive media player during a period defined at least in part by shared presence of the passengers in the common conveyance; and playing the interactive media title in the common conveyance enabled for interaction with the passengers during the period.

In an aspect, the method may further include configuring, by the one or more processors, parameters of the interactive media title based at least in part on the profile data and the trip data. The profile data may include account identifiers for the passengers and the method may further include identifying one or more interactive media titles indicated as ready for play by one or more electronic accounts identified by the account identifiers wherein the selecting selects one of the interactive media titles indicated as ready for play. The selecting may further include serving a user interface to the at least one interactive media player that enables one or more of the passengers to provide intentional input to the selecting by the one or more processors. The profile data may include, for example, at least one of present preference data, past preference data, and trip purpose for each of the one or more passengers. The method may include loosening the preference criteria in response to intentional input from one or more of the passengers indicating an intention for applying less exclusive criteria.

In an aspect, the method may further include processing, by the one or more processors, involuntary biometric sensor data indicating a transient neurological state of each of the one or more passengers relating to current or past preferences. The selecting further may include selecting the interactive media title based on at least one of the input, the past preference data, and the involuntary biometric sensor data.

In an aspect, the method may further include, by the one or more processors, defining a route for the common conveyance based at least in part on the interactive media title.

In a related aspect, the method may further include synchronizing play of content relating to the one or more places to times at which the common conveyance passes respective ones of the one or more places. The one or more processors may base the synchronizing on location data from one or more location sensors located in or on the common conveyance, optionally by receiving a signal from a beacon in the conveyance's surrounding environment.

In an aspect, the trip data may define one or more criteria selected from the group consisting of: a duration for an interactive media session for play by passengers in the common conveyance, an initial location at which the one or more processors schedule initiation of the session, a terminal location at which the one or more processors schedule termination of the session, and one or more intermediate locations along a route defined by the one or more processors for the conveyance.

In an aspect, the selecting is based on the one or more criteria, at least in part by an algorithm that evaluates relationships between user-facing elements of the interactive media and one or more of: the initial location, the terminal location and the one or more intermediate locations. The one or more processors define the one or more intermediate locations based at least in part on pickup or drop locations of one or more of the passengers.

In an aspect, the method may further include, by the one or more processors, inviting at least one or more of the passengers into the common conveyance prior to the playing. The one or more processors may base the inviting on optimizing matches in preferences of the at least one or more of the passengers from a pool of potential passengers, using an algorithm based on one or more of: an aggregate measure of preference criteria weighted by defined weighting factors and a predictive machine learning algorithm trained over a set of preference criteria with an objective of maximizing a measure of passenger satisfaction with inclusion in an invited group. In addition, or in an alternative, the one or more processors may base the inviting on satisfying preferences of any two or more of the passengers for at least one of blind dating or companionship with known but unspecified friends.

In other aspects, the method may further include, by the one or more processors, receiving matching time budget and cost budget information from at least two or more of the passengers. The one or more processors, in response to receiving a message from a passenger requesting separation from one or more other ones of the passengers, execute one or more of: scheduling a transfer to a different conveyance for the passenger and isolating the passenger from the one or more other ones of the passengers by activating an isolation barrier.

The interactive media title may have various aspects. For example, the interactive media title may include a karaoke game. In such case, the method may include, by the one or more processors, selecting songs for the game based on the trip data including at least places visible to the passengers along a route traveled by the common conveyance. For further example, the interactive media title may include a game, and the method may include, by the one or more processors, awarding game rewards in response to detecting social behavior by any one or more of the passengers during the period. For example, the one or more processors may detect the social behavior selected from the group consisting of: ridesharing, delivering, contributing, teaching or encouraging.

In many cases, the interactive media title may include a game, and the method may include providing the interactive media title configured for output by the at least one interactive media player as augmented reality displayed in a window or other viewing area of the common conveyance. Optionally, the identifying may further include identifying a special travel version of a video game. In an aspect, the one or more processors may track at least one of game progress or game rewards earned by any one or more of the passengers during the period and communicate the at least one of game progress or game rewards to a server for use after termination of the period in at least one of the special travel version of the video game during travel or the video game. In an aspect, the one or more processors may limit the at least one of game progress or game rewards to play of the special travel game during the period.

In some embodiments, the interactive media title includes a conversational game and the selecting includes selecting a topic for a conversation based on predicted aggregate interest in the topic by the passengers. The method may further include, by the one or more processors, configuring the interactive media title to output conversational prompts concerning the topic.

In some embodiments, the interactive media title may include a virtual presence component enabling at least one of: enabling virtual presence of a passenger to a mixed reality application outside of the common conveyance, serving a virtual presence inside the common conveyance of a person outside the common conveyance, and extending a time of play of the interactive media title by one or more of the passengers past a termination of the period.

In some embodiments, the interactive media title may include a creative work component, and the method may include, by the one or more processors, enabling at least one of collaborative work by any one or more of the passengers in a common workspace displaying the creative work.

The foregoing method concerns interactive content for two or more users in a common conveyance. A related method may be used to configure interactive media customized for a passenger traveling in a vehicle. The method may include: identifying, by one or more processors, data describing a trip for the vehicle and a vehicle configuration; providing, by the one or more processors based at least in part on the data, an interactive media title configured for output by at least one interactive player device during the trip; and playing, by the at least one interactive player device, the interactive media in the vehicle enabled for interaction with the passenger during the trip.

In an aspect, the method may further include configuring, by the one or more processors, parameters of the interactive media title based at least in part on the trip data. The method may further include selecting, by the one or more processors, an interactive media title for play by the passenger during the trip. In some embodiments, the interactive media title may include a virtual driving game enabling the passenger to experience an alternative simulated route of the vehicle during the trip. In an alternative, or in addition, the interactive media title may include a virtual driving game enabling the passenger to experience an alternative viewpoint from the vehicle; a virtual driving game enabling the passenger to virtually interact with objects outside the vehicle; a virtual driving game enabling the passenger to experience a simulation of driving a virtual vehicle with substantially different dynamic characteristics from the vehicle; or a travel game incorporating at least one intermediate destination or waypoint selected by the one or more processors to surprise the passenger. In another aspect, the interactive media title may include content capture and editing components enabling the passenger to capture content using one or more cameras of the vehicle and edit the content into a video. The interactive media title further may include a content integration component enabling the passenger to integrate video content from one or more external sources into the video. In a related aspect, the method may further include, by the one or more processors, selecting a route for the vehicle based at least in part on a content preference of the passenger.

The foregoing method may be implemented in any suitable programmable computing apparatus coupled to an output device such as a video player device, by provided program instructions in a non-transitory computer-readable medium that, when executed by one or more computer processors (hereinafter collectively or individually may be referred to as "processor"), cause the apparatus to perform the described operations. The processor may be local to the apparatus and user, located remotely, or may include a combination of local and remote processors. An apparatus may include a computer or set of connected computers installed in a vehicle, or portable devices (e.g., smartphones or notepad computers) coupled to a node or network via an access point in a vehicle or otherwise linked to a vehicle for a specific trip. An interactive media player device may include, for example, a personal computer, mobile phone, notepad computer, projector, haptic interface, scent dispenser, virtual reality device, or augmented reality device. In some implementations, the interactive media player device may include hardware elements or configurations located on or in a vehicle, for example: a 4D film presentation system and/or any of its components, such as a motion generating system or moving seat, e.g., D-BOX seats by D-BOX Technologies Inc. (Canada) or MX4D® theatre seats by MediaMation, Inc. (Torrance, CA); a noise cancellation technology such as Quiet Bubble™ by Silentium Ltd. (Israel); mixed reality gears and equipments, e.g., a VR vest such as KOR-FX by Immerz, Inc. (Cambridge, MA); a display screen configuration including one or more displays, tactile gear/interface, olfactory interface, haptic devices, pneumatic devices, hydraulic devices, motorized devices, a port to a mobile phone, or the like.

As used herein, "vehicle" is defined as a movable physical body or structure that may house one or more persons including a passenger as defined herein, for example, an autonomous vehicle; an amusement ride; an interior of transportation vessels such as an elevator, taxi, airplane, bus, etc.; a kiosk; a house, (e.g., a motorhome, a camper, or a traditional home); a mobile office space (mobile or otherwise), and the like, that may or may not be associated per se with transportation of people. In an aspect, the vehicle may be a connected vehicle or other vehicle coupled to a mobile mesh network. As the connected vehicle travels along a route, it may connect to and exchange data with servers of a mobile mesh network or other network based at least on proximity to the vehicle, quality of wireless connectivity between each prospective mobile mesh network server and a receiver, for example a media player within the connected vehicle, or servers at places of interest. As used in the present disclosure, connected vehicles may be referred to simply as vehicles and may include various suitable types of vehicles, whether driven autonomously or driven by a person. Connection and disconnection of nodes of the mobile mesh network may themselves be geographic location data.

Other elements of the apparatus may include, for example, an audio output device and a user input device, which participate in the execution of the method. An apparatus may include, or may couple to, a virtual or augmented reality device (including xR mixed reality output devices that may include augmented and virtual reality outputs), such as a headset or other display that reacts to movements of a user's head and other body parts. The apparatus may include, or may couple to, biometric sensors that provide data used by a controller to control details of the interactive media.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 24A is a flow chart illustrating aspects of a method for configuring interactive media customized for passengers temporarily sharing a common conveyance based on profile data and trip data.

FIGS. 24B-24J are flow charts illustrating further optional aspects or operations of the method diagrammed in FIG. 24A.

FIG. 25 is a conceptual block diagram illustrating components of an apparatus or system for configuring interactive media customized for passengers temporarily sharing a common conveyance based on profile data and trip data.

FIG. 30 is a conceptual block diagram illustrating components of an apparatus or system for configuring interactive media customized for a passenger traveling in a vehicle.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
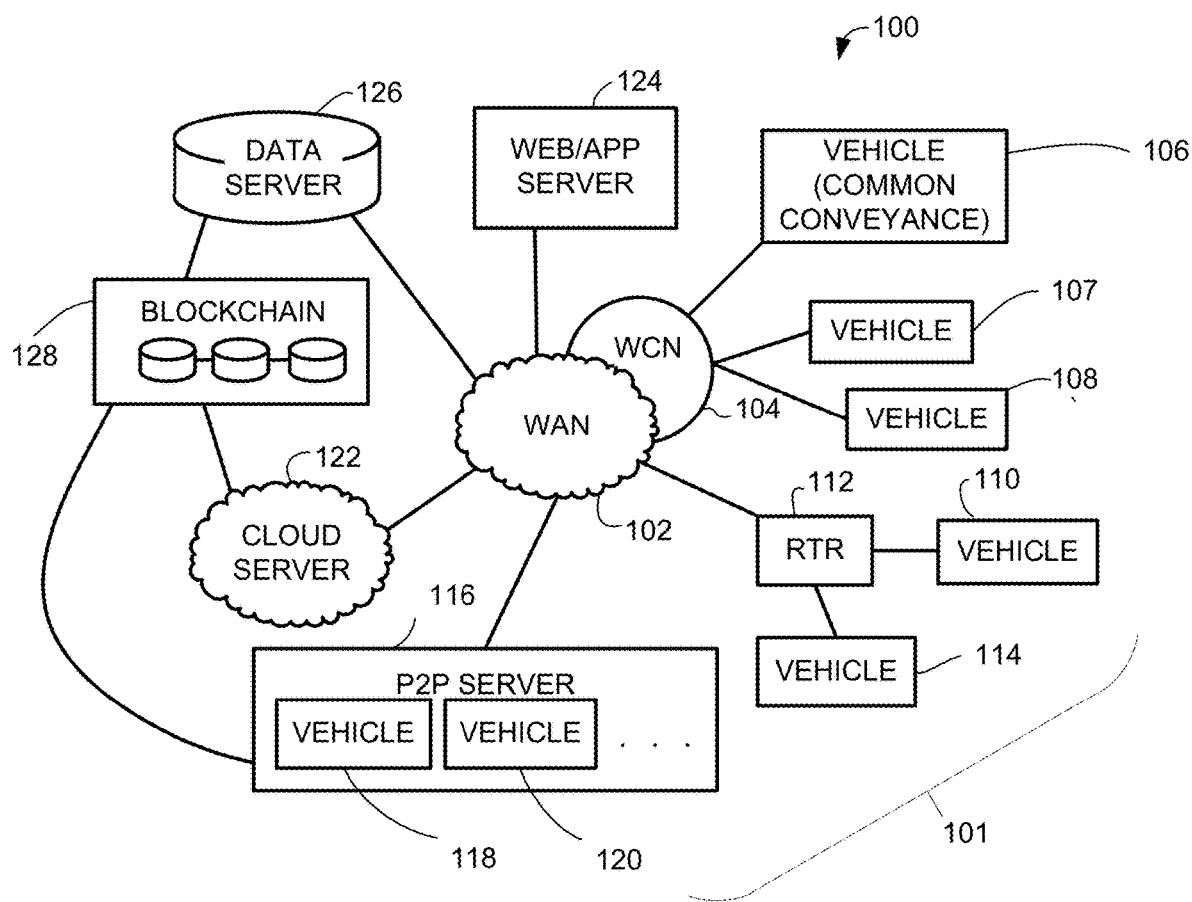
FIG. 1 is a schematic block diagram illustrating aspects of a system and apparatus for configuring interactive media customized for one or more passengers in a vehicle or in relation to a vehicular trip, coupled to one or more vehicular systems and client devices.

FIG. 1 illustrates aspects of an exemplary environment 100 in which a system and apparatus for implementing a method for configuring interactive media customized for passengers temporarily sharing a common conveyance, or configuring interactive media customized for a passenger traveling in a vehicle, may operate. The method allows for configuring interactive media such as non-narrative multimedia or other content for ad hoc and planned groups in shared spaces based on various factors such as passenger profile and trip data, in the vehicle-server environment 100. Other architectures may also be suitable.

The methods may include using profile data for one or more passengers to select or configure interactive media (e.g., contents and parameters). As used herein, "passenger profile" or "profile data" means data descriptive of a passenger, for example, physical location/city of the passenger, the passenger's surrounding context such as weather and temperature (e.g., sunny, raining, snowing, daytime/nighttime, hot vs. cold, etc.), social trends in general or in the passenger's own social network, personal attributes of the passenger such as age/sex/height/weight/race, favorite actors, fictional characters or other celebrities, passenger's status in a role-play game, or passenger status in a real or fantasy social network. Passenger profile may also include the reward status (points earned in one or more venues of a franchise (e.g., retail stores, amusement parks, live events, etc.) hosted or sponsored by an entertainment company and subscription status in a subscription-based membership service, e.g. Gold level in DC Universe by Warner Bros. Entertainment Inc. Passenger profile information may be used to select or configure interactive media to satisfy at least one of the passenger's interests, preferences, or safety needs.

The methods may also include using trip data for the common conveyance shared by one or more passengers (e.g., a vehicle or vessel, motorized or otherwise) in which a passenger travels, to select or configure interactive media (e.g., contents and parameters). In an aspect, at a high level, the trip data may include travel context data regarding the traveler relevant to a purpose of a trip, for example time, place, booking information, stated reason, such that the media components are directed to furthering the purpose of the trip, for example, by preparing the travelers for the destination or revisiting an experience at the origin or places along the route. A purpose of a trip may be determined based on the origin or destination, or both, for example, a theme park, a conference, an outdoor activity, a sporting event, a musical performance, a dramatic performance, a cinematic experience, a shop or collection of shops, a restaurant or collection of restaurants, a social event, or a holiday celebration. In an aspect, the purpose of the trip may be determined or received from a tour application. For example, the 'purpose of a trip' may include taking the trip itself, i.e. the journey or the outing or simply getting out (perhaps with others) for a ride. Further details of the trip data as used herein will be discussed below, e.g., with reference to FIG. 6.

In a network architecture, sensor data may be collected and processed locally, and used to control streaming of interactive media to the client(s) from a network source. In some embodiments, interactive media may be controlled locally, and log data provided to a remote server for improving predictive analytics algorithms and tracking use. As used herein, "interactive media" title or content is defined as digital computer-readable interactive sensory content for generating output from an interactive media output device (e.g., a smart media player), and "predictive analytics algorithm" may include any one or a combination of a machine-learning algorithm or a rules-based algorithm.

A processor may provide interactive media content to a user/passenger/player actor via software or hardware or both during a time spent in a vehicle (e.g., a trip in an autonomous vehicle, or an enjoyment of a simulated ride or 4D cinematic experience augmented with environmental effects such as motion, tactile effects, haptics, scents/odors, light/strobes, sound, fog machine, bubbles, snow, water sprays, wind/air, humidity, etc.). Interactive media content may include, for example, electronic media content for generating output such as audio, video and text; virtual, augmented or mixed reality (VR/AR/xR) content; vehicle simulation; image projection/projection mapping (e.g., on clothing, vehicle interior/exterior, etc.); surround screen; olfactory or tactile stimulus; merchandise; vehicle environment (e.g., seat/space configuration), climate control, noise cancellation, etc.); artificial intelligence robot (e.g., driver/passenger/user avatar or simulated personality such as a cartoon character by way of image being displayed, audio being played, etc.); and the like. For example, interactive media may include intra-vehicular social applications and games. In particular, the interactive media content may be configured to support interactive features resembling game (e.g., video game, etc.) features or may be devoid of interactive features except for responding to data indicative of user neurological or neurophysiological states. In some implementations, the interactive media content may include simulation or avatar of a vehicle driver or passenger, one or more fellow passengers, or a companion. For example, the simulation or avatar may include simulating at least one of the vehicle driver or a fellow passenger for purposes of furthering a narrative or for providing companionship such as a conversational counterpoint for passengers. In other examples, the interactive media content may include a social robot that can be configured to consider passenger preferences and trip information, such as a persona of the vehicle configuring itself and then displaying a visage with its unique personality on the vehicle's main display screen. In some implementations, a passenger's smartphone may contain an application that simulates a character from movies, online video, television, video gaming or other fiction. When the application senses or receives a message informing it that the passenger is traveling, it may activate the character simulation and operate the simulation to entertain or inform the passenger using the voice and mannerisms of the character. As yet another example, the interactive media content may refer to digital audio-video content that is arranged at least in part by a script designed to entertain and evoke emotions in viewers according to a scheme for narrative tension, sometime referred to herein as an "emotional arc."

As used herein, users (e.g., passengers) are always consumers of interactive media content from which a system node collects real-time emotional response data for use in controlling aesthetic output. When actively participating in content via an avatar or other agency, users may also be referred to herein as player actors. Viewers are not always users. For example, a bystander may be a passive viewer that does not interact with the content via an emotional response. As used herein, a "node" includes a client or server participating in a computer network.

When interacting with interactive media content production process (e.g., interactive media content AI) by expression of emotion, the user is a player actor in the interactive media content AI narrative. Player actors can interact with content in various ways, including for example natural language communication with NPCs and other player actors, locomotion and virtual locomotion within an immersive experience, and emotional feedback loop with other player actors, NPCs and the narrative environment.

Users of interactive media content, e.g., passengers, may react passively during viewing by natural expression of their emotions. As used herein, "passenger" includes all vehicle occupants to the extent their attention will not be diverted by entertainment from safely driving the vehicle, including non-drivers for all forms of content described herein and also drivers but only for non-distracting content, including mainly hands-free audio, imagery, olfactory or tactile content presented at times and in modes that will not distract the driver from driving. Significant use cases for the present technology include autonomous vehicles in which all occupants are passengers and no danger of distracting the driver by entertainment content exists. Use cases may also include human-driven vehicles, in which the entertainment content should be presented in a mode that does not distract the driver, for example, on a mobile device or mixed reality headset.

In an aspect, passengers (e.g., "player actors") may actively interact with characters or other objects appearing in the interactive media title. As used herein, a "player actor" is a passenger of the vehicle and a user of a client device or interface equipped with or coupled to interactive media player(s) or biometric sensors, who uses the client device or interface to interact with characters or objects in interactive media content by entering a neurological, cognitive, or neurophysiological state (e.g., emoting), whether or not also using a controller to provide direct input, such that the narrative behavior of the character or object changes without requiring an intentional action by the player actor. "Narrative behavior" means behavior that changes the narrative, for example, character dialogue or actions. Thus, player actors include users who affect the narrative by emoting inwardly or outwardly without taking an intentional action, as distinct from "player characters" in certain prior interactive content. Player characters interact with the narrative by manipulating a controller (e.g., keyboard or dedicated game controller) or other direct input. Unlike player actors, player characters cannot alter the narrative by achieving a biometric-detectable neurological state without any intentional action.

In an aspect, the methods may include using predictive analytics in producing (e.g., selecting or configuring) interactive media contents. As used herein, "predictive analytics" encompasses machine learning algorithms, rule-based predictive modeling algorithms, statistical algorithms, and other techniques to forecast future or unknown events based on current and historical data. A predictive analytics process may predict an affinity of a passenger traveling in a vehicle or a group of passengers sharing a common conveyance, based at least in part on the profile data and/or trip data of the passenger(s), which may include the preference criteria and geographic location data. The affinity may then become part of the passenger profile.

The present description uses "user," "passenger," and "player actor" interchangeably when discussing interactive media content production process, for example, using a predictive analytics AI. Interactive media content production process enables adaptation of the interactive media content to increase or maintain narrative tension experienced by the user, based at least in part on real time neurological or cognitive feedback through physical or biometric sensing of the user's involuntary neurological, cognitive, or neurophysiological states, e.g., valence and arousal. Interactive media content process such as predictive analytics AI also enables adaptation of the interactive media content based at least in part on data inputs from physical or environmental sensors as discussed in more detail below.

Referring to FIG. 1, a suitable vehicle-server environment 100 may include various computer servers and other network entities including client entities in communication via one or more networks, for example a Wide Area Network (WAN) 102 (e.g., the Internet) and/or a wireless communication network (WCN) 104, for example a cellular telephone network, using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers.

Client devices may include, for example, portable passenger devices 132, 134 (PPDs, FIG. 2) such as smartphones, smartwatches, notepad computers, laptop computers, and mixed reality (xR) headsets, and special purpose media players and servers, such as vehicle media controllers (VMCs, FIG. 2) installed as part of vehicular electronic systems. VMCs 162 may be coupled to vehicle controllers (VCs) 164 as a component of a vehicular control system. The VC may control various other functions with various components, for example, engine control, interior climate control, anti-lock braking, navigation, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more data servers 126 and/or cloud server 122 for holding data, for example video, audio-video, audio, graphical content components of interactive media content for consumption using a client device, software for execution on or in conjunction with client devices, for example sensor control and emotion detection applications, and data collected from users or client devices. Data collected from client devices or users may include, for example, passenger (user) identity, passenger profile (user profile data), sensor data and application data. Passenger identity, passenger profile, and sensor data may be collected by a background (not user-facing) application operating on the client device, and transmitted to a data sink, for example, a cloud-based data server 122 or discrete data server 126. Application data means application state data, including but not limited to records of user interactions with an application or other application inputs, outputs or internal states. Applications may include software for control of cinematic content and supporting functions. Applications and data may be served to one or more system nodes including vehicles 101 (e.g., vehicle or common conveyance 106 through vehicle 120) from one or more of the foregoing servers (e.g., 122, 124, 126) or other types of servers, for example, any server accessing a distributed blockchain data structure 128, or a peer-to-peer (P2P) server 116 including a peer-to-peer network such as a mesh network (including partial, full, and wireless mesh networks), such as may be provided by a set of vehicle devices 118, 120, etc., and the like, operating contemporaneously as microservers or clients.

In an aspect, information held by one or more of the content server 126, cloud-based content server 122, distributed blockchain data structure 128, or a peer-to-peer (P2P) server 116 may include a data structure of interactive media contents, which may include, but not limited to, media components such as video clips suitable for including in the interactive media content such as a video. The data structure may relate user-perceivable aspects of interactive media contents to identifiers of the media components, for example by using profile values, and to one or more indicators of semantic meaning relevant to one or more travel events, and other unique metadata sets characterizing each of the components. As used herein, a "media component" is a discrete package or collection of data that encodes a component of interactive media content. Media components may include, for example, "media segments," which are sets of audio, video, audio-video, or other encodings of sensory output by an interactive media player having a beginning, ends, and duration. An audio clip, a video clip, or an audio-video clip are examples of a media segment. Media segments may include parallel tracks of encoded data, each of which is itself a media segment. For example, an audio-video segment includes a video segment in parallel to an audio segment. If the media player supports other sensory output modalities, other types of media segments may include, for example, a motion simulation segment for driving a motion simulator, an olfactory segment for driving an odor generator, a tactile segment for driving a tactile output device, and so forth. Other media components are not segments but nonetheless are data that encodes sensible output. For example, three-dimensional (3D) model data and related texture data are not media segments but once rendered by a game engine will appear in outputted interactive media title and are necessary to render the content as intended.

The network environment 100 may include various vehicles (collectively referred to as vehicles 101), for example an autonomous or connected vehicle 106, mobile home/office 107, airplane 108, elevator 109 (not shown), kiosk, etc., that may be connected to servers via the WCN 104 and/or WAN 102; any one of the foregoing vehicle devices including 118, 120, or an amusement ride 110, a mixed reality (e.g., virtual reality or augmented reality) vehicle 114 that may be connected to servers via a router 112 and the WAN 102 and/or WCN 104, and the like. In general, vehicles 101 may be, or may include or communicably connected to, computers used by users to access interactive media content provided via a server or from local storage.

Figure 2:
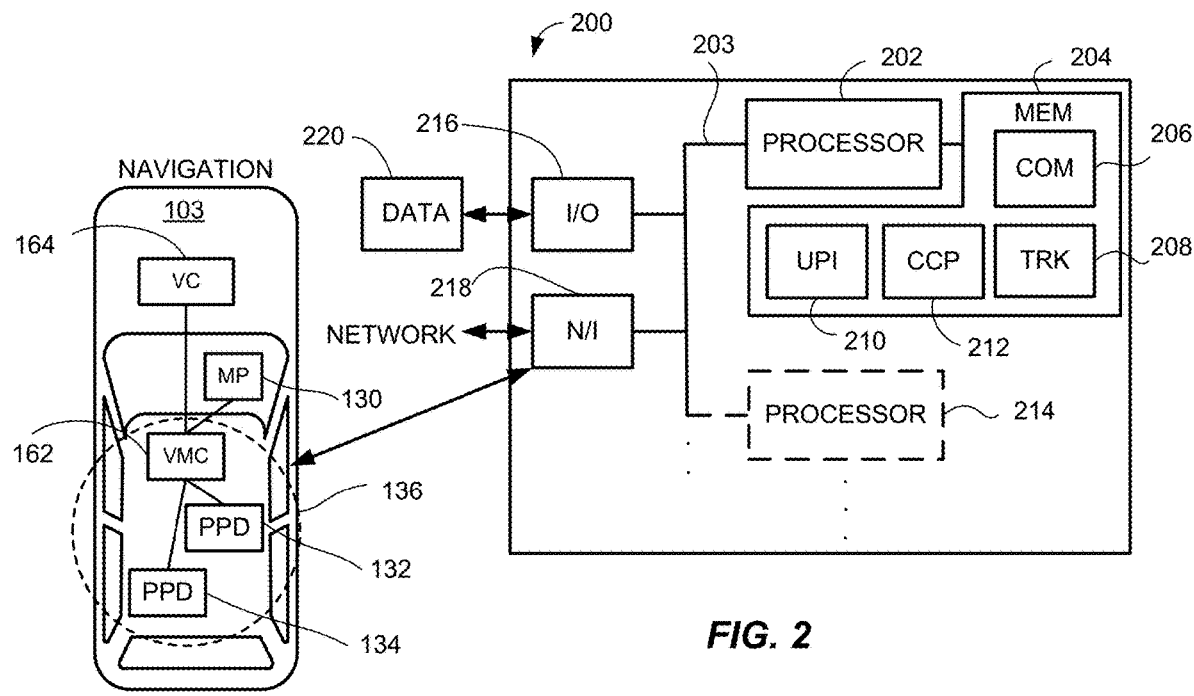
FIG. 2 is a schematic block diagram illustrating aspects of a server for configuring interactive media customized for one or more passengers in a vehicle or in relation to a vehicular trip.

Referring to FIG. 2, the vehicle 103 in the network environment 100 may include various passenger portable devices, for example a mobile smartphone client (not shown) of a user who has not yet entered the vehicle 103, for example while waiting for the vehicle to arrive or coming to meet the vehicle. Other client devices may include, for example, a notepad client, or a portable computer client device, a mixed reality (e.g., virtual reality and augmented reality) client device, or the VMCs 162. PPDs may connect to one or more networks. For example, the PPDs 132, 134, in the vehicle 101 may connect to servers via a vehicle controller 164, a wireless access point (not shown) communicably connected to the wireless communications network (WCN) 104, the WCN 104 and the WAN 102, in which the VC 164 acts as a router/modem combination or a mobile wireless access point (WAP). For further example, in a mobile mesh network 136, nodes 132, 134, 162 may include small radio transmitters that function as a wireless router. The nodes 132, 134, 162 may use the common Wi-Fi standards to communicate wirelessly with client devices, and with each other.

Mesh network nodes may be programmed with software that tells them how to interact within the larger network. By following a set of common mesh network protocols, the mesh network nodes may transport information across the network by hopping the information wirelessly from one mesh node to the next. The nodes may automatically choose the quickest and most reliable path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity." In general, client devices may be, or may include, computers or media players used by users to access media content provided via a server or from local storage. In traveling vehicles such as the example vehicles 101, use of a mobile mesh network protocol may enable nearby vehicles to share network bandwidth and information more efficiently using different frequencies and cached content.

For example, passengers in two or more vehicles 101 traveling to a popular destination such as a sporting event or theme park may be interested in the same or similar content. Continuing the example, suppose that the first vehicle 103 has already downloaded many media components making up the shared content and its mobile mesh network 136 comes within range of a second vehicle, e.g., one of the vehicles 118 and 120 in a compatible mesh network 116. Then, one or more of the VMC 162, media player (MP) 130 and PPDs 132, 134 of vehicle 103 may join the mesh network 116 of vehicle 118. Once the new nodes have joined, the original nodes 132, 134, and 162 of the mesh network 136 of vehicle 103 may cooperate to transmit media components or other data to the new nodes in the second vehicle (118 or 120), without needing to pass data through the WCN 104 or WAN 102. Thus, demands on other networks may be reduced. Mesh networks may be useful in delivering trip-configured content because client devices in vehicles following similar routes may be both more likely to request similar content and to be relatively near to each other.

FIG. 2 further shows an interactive media content server 200 for controlling output of digital interactive media content, which may operate in the environment 100, in similar networks, or as an independent server. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle states, users' emotional states and viewing history. Vehicle states may include road conditions, location, multi-axial velocity and/or acceleration, estimated arrival time, destination, and other information. Viewing history may include a log-level record of variances from a baseline script for a content package or equivalent record of control decisions made in response to player actor emotional states and other input. Viewing history may also include content viewed on TV, Netflix and other sources. The processor may control output of interactive media content responsive to sensor data indicating a user's emotional state, for example as described in International (PCT) Application Serial No. PCT/US18/53614 by inventors hereof, incorporated by reference herein. Any source that contains a derived emotional arc may be useful for input to an emotional-reacting content control algorithm.

The server 200 may track player actor actions and emotional responses across multiple content titles for individuals or cohorts. Some types of servers, e.g., cloud servers, server farms, or P2P servers, may include multiple instances of discrete servers 200 that cooperate to perform functions of a single server. In some embodiments, the source 220 may be separately or additionally used for sensor data indicative of vehicle or travel conditions. Suitable sources may include, for example, Global Positioning System (GPS) or other geolocation sensors, one or more cameras configuring for capturing road conditions and/or passenger configurations in the interior of the vehicle 150, one or more microphones for detecting exterior sound and interior sound, one or more temperature sensors for detecting interior and exterior temperatures, door sensors for detecting when doors are open or closed, and any other sensor useful for detecting a travel event or state of a passenger.

The server 200 may include a network interface 218 for sending and receiving applications and data, including but not limited to sensor and application data used for controlling interactive media content. The content may be served from the server 200 to a vehicle 101 or stored locally by the client device. If stored local to the client device, the client and server 200 may cooperate to handle sensor data and other player actor functions. In some embodiments, the client may handle all content control functions and the server 200 may be used for tracking only or may not be used at all. In other embodiments, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking emotional response and other interactive data for a user or cohort, for one or more content titles, subject to user permissions and privacy settings. In some embodiments, tracking module 208 may include functions for tracking travel events using sensor data from the source(s) 220 and/or navigation and vehicle data received through the network interface 218 or other coupling to a vehicle controller.

The modules may include, for example, a user profile integration (UPI) module 210. The UPI module 210 may include instructions that when executed by the processor 202 and/or 214 cause the server to perform one or more of determining associations of interactive media contents with one or more parameters indicating user-perceivable characteristics of the interactive media contents or the video clips. For example, the UPI module 210 may apply a rule-based algorithm, a heuristic machine learning algorithm (e.g., a deep neural network, hereinafter "predictive analytics algorithm") or both, to create one or more sets of content identifiers consistent with the input parameters. In some embodiments, the UPI module 210 may apply the rule-based algorithm or the heuristic machine learning algorithm to data indicative of player actor emotional reactions thereby identifying a user's internal state useful for a content control algorithm. The UPI 210 when executed by the processor may cause the server to assign a likelihood of a targeted outcome, e.g., a defined emotional state targeted for the interactive media content's emotional arc, for specific control actions. The UPI module 210 may perform other or more detailed operations for selecting interactive media content or preferred video clips as described in more detail herein below.

The modules may further include a content configuration process (CCP) module 212. The CCP module 212 may include instructions that when executed by the processor 202 and/or 214 cause the server 200 to perform one or more of assembling or configuring interactive media content for delivery to one or more interactive media players in the vehicle, where the parameters of the interactive media content or title may be configured based at least in part on the profile data and/or trip data, and further operations as described in more detail herein below that when executed by the processor causes the server to perform any one or more of the functions described herein for an interactive media title. In alternative embodiments, the content configuration process or function may be omitted from the server memory 204 and provided in the memory of a client device. The memory 204 may contain additional instructions, for example an operating system, and supporting modules.

Figure 3A:
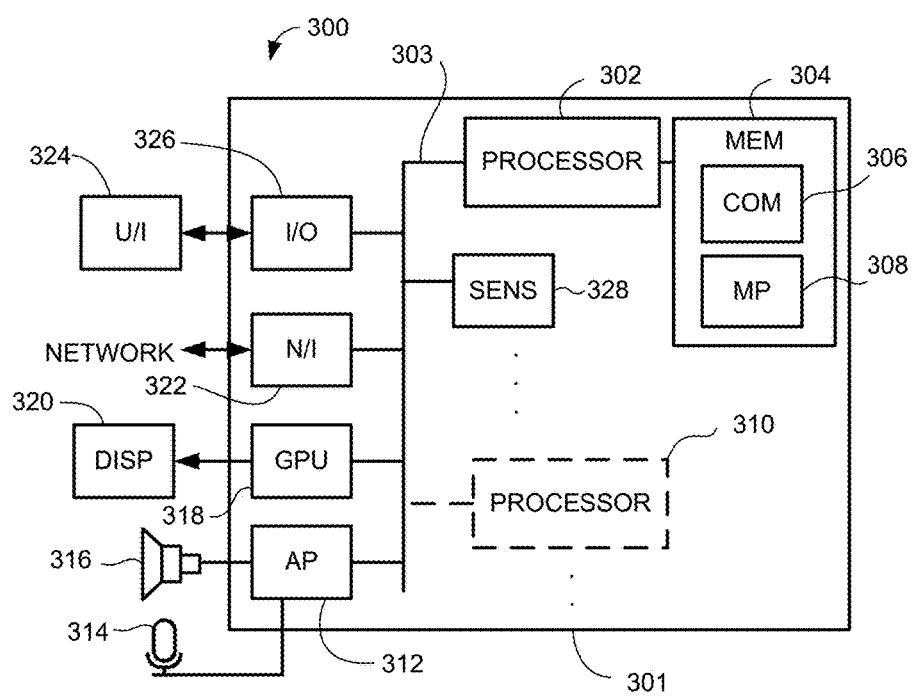
FIG. 3A is a schematic block diagram illustrating aspects of a client device for configuring interactive media customized for one or more passengers in a vehicle or in relation to a vehicular trip.

Referring to FIG. 3A, aspects of a content consumption apparatus (client device) or interactive media player 300 for controlling output of interactive media content responsive to sensor data indicating a user's emotional state are described. In some embodiments, the same computing device (e.g., apparatus 300) may operate both as a content consumption apparatus and as a content configuration server, for example, as a node of a mesh network. In such embodiments, the computing device may also include functional modules and interface devices as described above for the server 200.

The apparatus 300 may be located in or on the vehicle 101. The client 300 may include a processor 302, for example a central processing unit based on 80×86 architecture as designed by Intel™ or AMD™, a system-on-a-chip as designed by ARM™, or any other suitable microprocessor(s). The processor 302 may be communicatively coupled to auxiliary devices or modules of the content consumption apparatus 300, using a bus or other coupling. In some aspects, the processor 302 and its coupled auxiliary devices or modules may be housed within or coupled to a housing 301, for example, a housing having a form factor of a dashboard inside an automobile, an onboard infotainment system inside an automobile (e.g., an entertainment system built in or connected to a passenger seat, the ceiling, or any other part of a vehicle), a kiosk, an elevator infotainment display, a digital signage, an in-flight entertainment system, an amusement ride, seats in 4D venues, a television, a set-top box, a smartphone, a tablet, wearable goggles, glasses, visor, or other form factors.

A user interface device 324 may be communicably coupled to the processor 302 for providing user control input to an interactive media content process as described herein. The process may include outputting video and audio for a conventional flat screen or projection display device. In some embodiments, the interactive media content process may be, or may include, audio-video output for an immersive mixed reality content display process operated by a mixed reality immersive display engine executing on the processor 302.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB), Bluetooth®, Wi-Fi™, or equivalent ports. Control input may also be provided via one or more sensors 328 coupled to the processor 302. The sensors 328 may include, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a plenoptic camera, a radio receiver, a multi-camera tracking sensor/controller, an eye-tracking sensor, an infrared/heat signature sensor, a microphone or a microphone array. In some aspect, any or all of the sensors 328 may be housed in a single or multiple devices, such as a smartphone and the like.

In some implementations, the sensors 328 may be located inside the vehicle, outside (e.g., on the exterior of) the vehicle, or both. For example, accelerometers, bump cancelling sensors, audio/noise canceling sensors, and/or light canceling sensors may be located outside, and position sensors (e.g., sensing position(s) of passenger(s)), depth sensors, gesture sensors (e.g., Kinect™ by Microsoft Corporation in Redmond, WA), and/or microphone(s) may be located inside, the vehicle 101. For example, a smartphone device, an IoT device, a smart device (e.g., Apple Watch by Apple, Inc, Google Home by Google, Inc., Amazon Echo by Amazon, Inc., etc.) or other network-enabled device may house and provide or augment functionalities of one or more of the foregoing sensors. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity, position, size, orientation and movement of the user's physical environment and of objects in the environment, motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspect, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server may track users' biometric states and viewing history. Viewing history may include a log-level record of control decisions made in response to player actor biometric states and other input. Viewing history may also include content viewed on TV, Netflix™ and other sources. The server 200 may track user actions and biometric responses across multiple content titles for individuals or cohorts.

Sensor data from the one or more sensors 328 may be processed locally by the CPU 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the interactive media content server 200, the client 300 may include a network interface 322, e.g., an Ethernet port, wired or wireless, or a 4G/LTE/5G cellular communications network interface, etc. Network communication may be used, for example, to enable multi-user experiences, including immersive or non-immersive experiences of interactive media content. The system may also be used for multi-user applications, for example social networking, group entertainment experiences, instructional environments, video gaming, and so forth. Network communication can also be used for data transfer between the client 300 and other nodes of the network, for purposes including data processing, content delivery, content control, and tracking. The client 300 may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, a light field display (e.g., support near-eye solution and far-eye solution, or generate images from different planes a-la wave guide bending), a pass-through display e.g., a head-mounted virtual retinal display by Magic Leap, Inc. (Plantation, FL) or other digital display device. For example, a switchable electric glass screen that transitions from transparent to opaque, paired with a 4K transparent LCD display, may be used. Example of such display device includes the display screens used in "Field Trip to Mars" by Framestore VR Studio (http://framestorevr.com/field-trip-to-mars/). Other digital display devices may also be used.

The display device 320 may be incorporated into a vehicle (incl. virtual reality headset worn by a passenger inside a vehicle) for example, a window of an autonomous vehicle, an amusement ride, an interior of transportation vessels such as an elevator, taxi, airplane, bus, etc., a kiosk, or other immersive display systems. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, interactive media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of emotional state and as a device for user input of verbal commands, or for social verbal responses to NPC's or other player actors.

The content consumption apparatus 300 may further include a random-access memory (RAM) 304 holding program instructions and data for rapid execution or processing by the processor during controlling interactive media content in response to trip information or other data. When the client 300 is powered off or in an inactive state, program instructions and data may be stored in a long-term memory, for example, a non-volatile magnetic, optical, or electronic memory storage device (not shown). Either or both RAM 304 or the storage device may include a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor.

Program instructions may be grouped into functional modules 306, 308, to facilitate coding efficiency and comprehensibility. The modules, even if discernable as divisions or grouping in source code, are not necessarily distinguishable as separate code blocks in machine-level coding. Code bundles directed toward a specific type of function may make up a module, regardless of whether machine code on the bundle can be executed independently of another machine code. The modules may be high-level modules only. The media player module 308 may perform operations of any method described herein, and equivalent methods, in whole or in part. Operations may be performed independently or in cooperation with another network node or nodes, for example, the server 200.

Figure 3B:
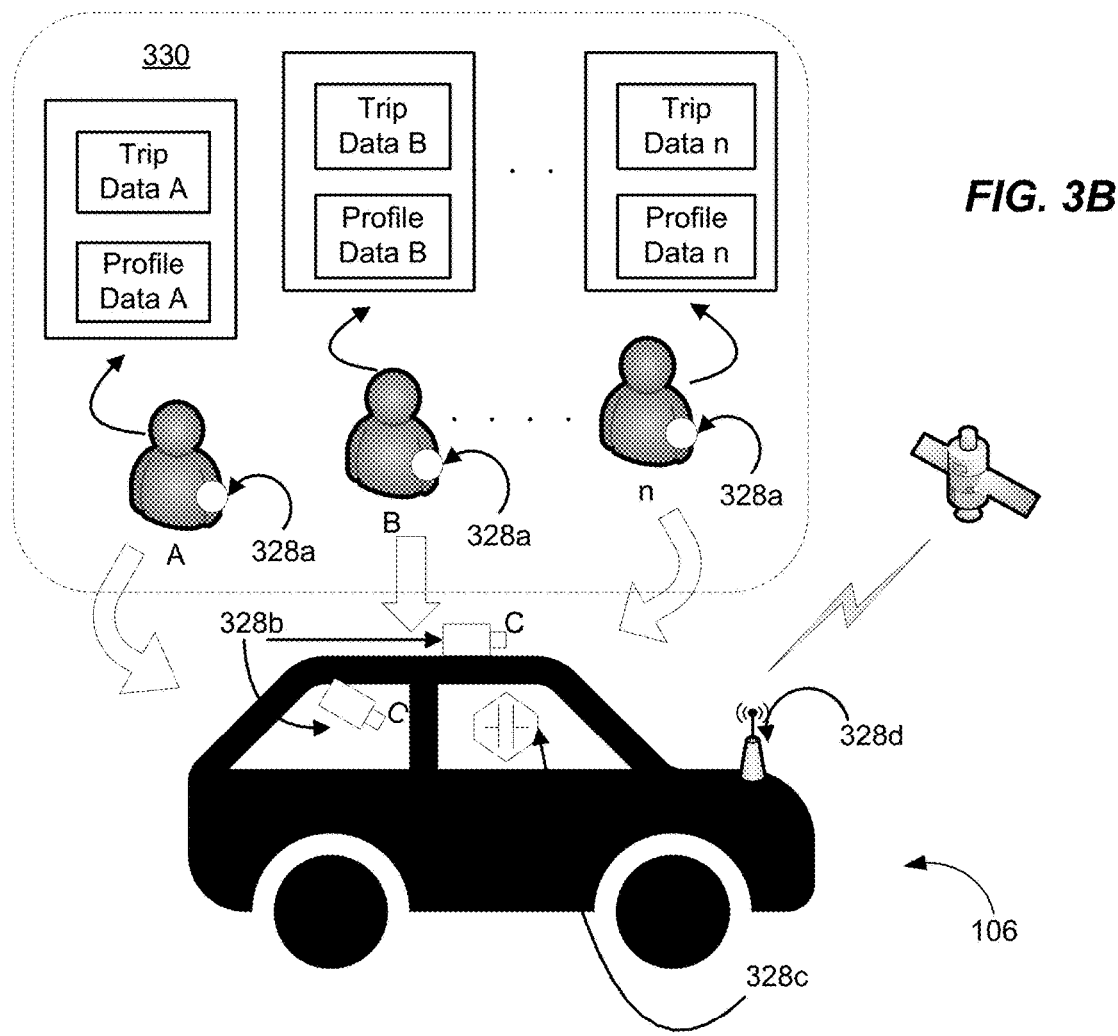
FIG. 3B is a schematic block diagram illustrating aspects of a system and apparatus for configuring interactive media customized for one or more passengers in a vehicle or in relation to a vehicular trip, which may involve controlling output responsive to, trip data, profile data, and/or sensor data indicating one or more passengers' emotional state(s).

FIG. 3B is a schematic block diagram illustrating aspects of a system and apparatus for configuring interactive media customized for one or more passengers in a vehicle or in relation to a vehicular trip, which may involve controlling output responsive to, trip data, profile data, and/or sensor data indicating one or more passengers' emotional state(s). In an aspect, a group of passengers 330 is sharing a common conveyance 106. In one example, the group of passengers 330 includes passenger A, passenger, B, and up to n number of passengers that may fit the common conveyance 106. In another aspect, a passenger is traveling alone in a vehicle 106. Each passenger provides a respective profile data and trip data, which may be provided to the processor upon the vehicular travel. One or more passengers may be equipped with a biometric sensor 328, such as a smartphone, smart watch, or other biometric devices that provide biometric feedback information about the passenger. The vehicle 106 may be equipped with internal or external cameras 328b that may capture and provide audio-video information about one or more places, objects, etc., within sight from the common conveyance, or passenger(s) inside the vehicle 106. In an aspect, the vehicle 106 is equipped with one or more biometric sensors 328c that provide biometric feedback information about the passenger(s) onboard the vehicle 106. Vehicle 106 may also be equipped with a geolocation sensor 328d that provides geolocation and trip information of the vehicle 106.

Figure 3C:
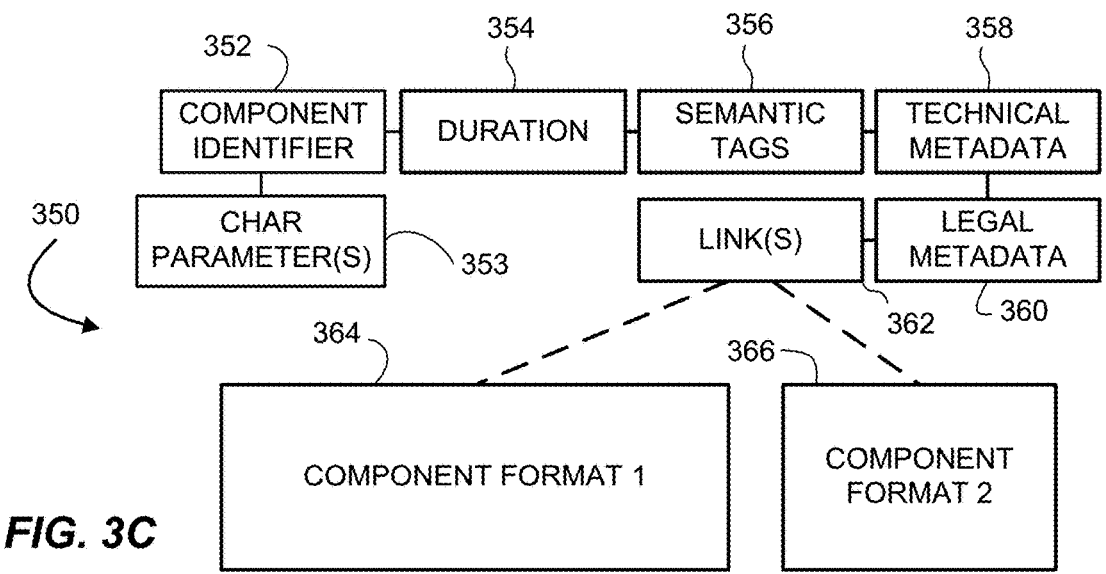
FIG. 3C is a schematic block diagram illustrating an example of a data structure for relating components of interactive media title to profile data, trip data, and other data.

Systems, apparatus and methods as described herein may make use of a data structure that relates interactive media contents in an ordered arrangement of media components to one or more parameters for media content, including at least one or more indicators of semantic meaning relevant to one or more travel events. FIG. 3C shows an example of a data structure 350 for relating content components of interactive media contents each referenced by a component identifier 352 to passenger identity, passenger profile including preference data and geographic location data, user profile data, and/or other data. The data structure may be implemented as a relational database, a flat data table, a distributed ledger, or by any other useful computer-readable digital data structure for storing, locating and accessing related components of binary-encoded data. The data structure 350 may include self-associated records each including a unique identifier 352 of a content component (e.g., an index number), a duration 354 value (e.g., frames or seconds) of a content segment if applicable, one or more semantic tags 356 relevant to passenger profile or user profile data, technical metadata 358 as needed to select, configure or produce an interactive media content or a video that includes the content component or video clips identified by the identifier 352, legal metadata such as for example license or censorship requirements applicable to the media component, and one or more links to non-transitory, computer-readable copies 364, 366 of the media component. The copies 364, 366 may be identical copies for redundancy or more efficient distribution, may be copies in different formats (e.g., a large format 364 and a small format 366) for different output modes, or both. It may be efficient to store the copies 364, 366 in a different storage system than the metadata 350 for more efficient operation of the server 200. For example, the server 200 may load the data structure 350 into its Random Access Memory (RAM) and access the component copies 364, 366 on a remote server or local magnetic or electronic memory device.

Figure 4A:
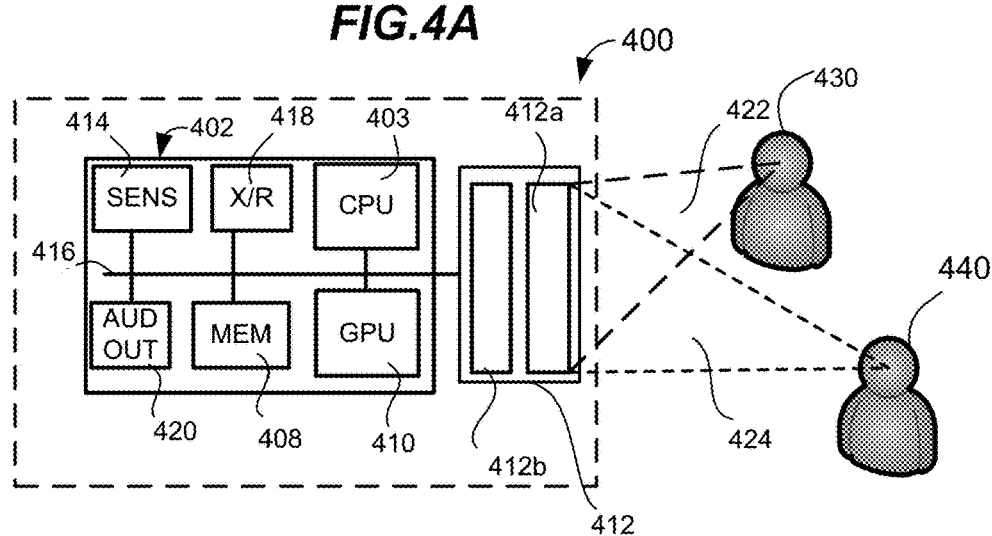
FIG. 4A is a schematic diagram showing features of an apparatus for configuring interactive media customized for one or more passengers in a vehicle or in relation to a vehicular trip, involving a light field display.

FIG. 4A is a schematic diagram illustrating one type of a virtual display device 400, as an example of the display installed in client 300 (e.g., on a window in an autonomous vehicle 106 or any vehicle shown in FIGS. 1-2) as an example of a more specific form factor. That is, in addition to conventional 2D output or 3D output for display on two-dimensional (flat or curved) screens (e.g., by televisions, mobile screens, or projectors), the interactive media configuration methods disclosed herein may be used with Virtual Reality (VR), Augmented Reality (AR), or Mixed Reality (xR) output devices. In an alternative or in addition, each of the passengers may consume the interactive media content on a personal computing device, for example a smartphone, notepad computer or mixed reality headset. The interactive media content output device, e.g., display for the client 300 may be provided in various form factors, of which device 400 provides but one example. The innovative methods, apparatus and systems described herein are not limited to a single form factor but may be used in any media output device suitable for interactive media content output. As used herein, interactive media content output (interactive media title) includes any digital signal that produces audio-video output. In an aspect, the content may be outputted according to a script or narrative, which may be branching and interactive. In an aspect, the interactive media content varies in response to a detected emotional state of the user.

The virtual display device 400 may include a light field display 412 including a switchable electric glass screen 412a that transitions from transparent to opaque, paired with a 4K transparent LCD display 412b. The device 400 supports near-eye 422 solution and far-eye 424 solution, for example, by generating images from different planes a-la wave guide bending. For example, a user 430 viewing the light field display 412 from a position or plane that is nearer to the display 412 (as indicated by near-eye plane or position 422) than a user 440 viewing the display from a different position or plane (e.g., far-eye 424), may each view alternate or different views of the interactive media content being displayed on the light field display 412.

The virtual display device 400 may include additional electronic components such as a simulation display processing unit 402 (e.g., a computing device such as a notebook computer, tablet, smartphone, etc.). The display 412 may be driven by the Central Processing Unit (CPU) 403 and/or Graphics Processing Unit (GPU) 410 via an internal bus 416. Components of the unit 402 may further include, for example, a transmit/receive component or components 418, enabling wireless communication between the CPU and an external server via a wireless coupling. The transmit/receive component 418 may operate using any suitable high-bandwidth wireless technology or protocol, including, for example, cellular telephone or wireless technologies as described elsewhere herein. The transmit/receive component or components 418 may enable streaming of video data to the display and communications unit 402 from a local or remote video server, and uplink transmission of sensor and other data to the local or remote video server for control or audience response techniques as described herein.

Components of the simulation display processing unit 402 may further include, for example, one or more sensors 414 coupled to the CPU 403 via the communications bus 416. Such sensors 414 may include, for example, an accelerometer/inclinometer array providing orientation data for indicating an orientation of the simulation display processing unit 402 and/or the virtual display device 400, or an eye-tracking sensor for tracking eye position or movement of the users (e.g., user 430 and user 440). The one or more sensors 414 may further include, for example, a Global Positioning System (GPS) sensor indicating a geographic position of the user (e.g., users 430 and 440). The one or more sensors 414 may further include, for example, a camera or image sensor positioned to detect an orientation of one or more of the user's facial expressions, or to capture video images of the user's physical environment (for VR mixed reality), or both. In some embodiments, an eye-tracking sensor, a camera, image sensor, or other sensor configured to detect a user's eyes or eye movements may be mounted in or on the light field display 412 or the simulation display processing unit 402 and coupled to the CPU 403 via the bus 416 and a serial bus port (not shown), for example, a Universal Serial Bus (USB) or other suitable communications port. The one or more sensors 414 may further include, for example, an interferometer positioned in the support structure 404 and configured to indicate a surface contour to the user's eyes. The one or more sensors 414 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data including nervous system responses capable of indicating emotion via algorithmic processing.

Components of the display and communications unit 402 may further include, for example, an audio output transducer 420, for example a speaker or piezoelectric transducer in the display and communications unit 402 or audio output port for headphones or other audio output transducer mounted in headgear 424 or the like. The audio output device 420 may provide surround sound, multichannel audio, so-called 'object-oriented audio' (e.g., Dolby Atmos and DTS: X), positional audio effects (e.g., 3D Audio), or other audio track output accompanying a stereoscopic immersive VR video display content. In an aspect, different passengers in a vehicle (e.g., users 430 and 440) hear different audio output from the audio output device 420 depending on where the passengers are located in the vehicle 101. Components of the display and communications unit 402 may further include, for example, a memory device 408 coupled to the CPU 403 via a memory bus. The memory 408 may store, for example, program instructions that when executed by the processor cause the apparatus 400 to perform operations as described herein. The memory 408 may also store data, for example, audio-video data in a library or buffered during streaming from a network node.

Figure 4B:
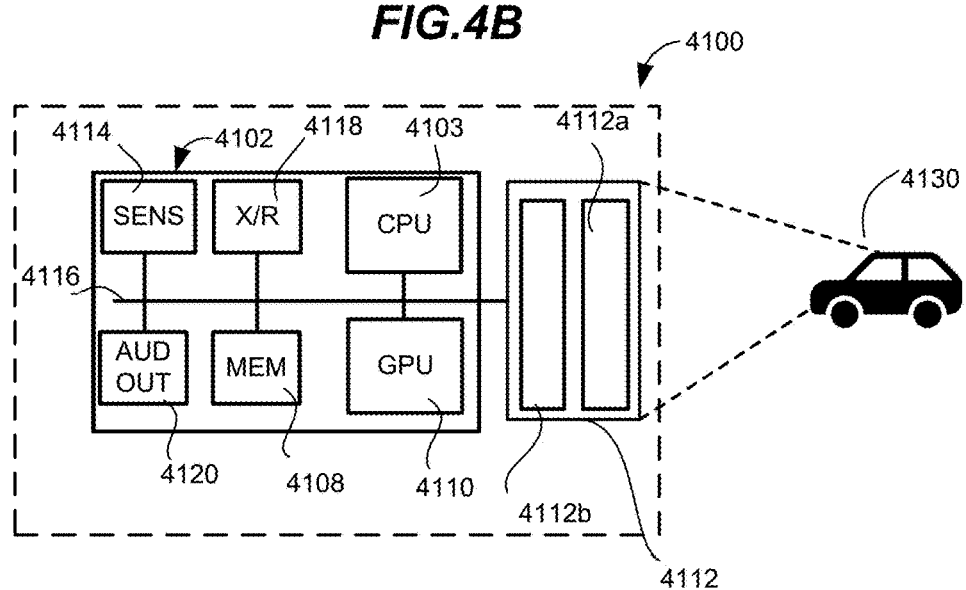
FIG. 4B is a schematic diagram showing features of an apparatus for configuring interactive media customized for one or more passengers in a vehicle or in relation to a vehicular trip, involving projecting simulated interactive media to a display surface in or on the vehicle.

FIG. 4B is a schematic diagram illustrating another type of a virtual display device 4100, as an example of the display installed in client 300, e.g., on one or more parts (e.g., windshield, windows, sunroof, etc.) of common conveyance 106. That is, the virtual display device 4100 involves projecting interactive media content to a display surface in or on the vehicle as an example of the display installed in client 300, e.g., on the interior and/or exterior of the vehicle 106 as an example of another more specific form factor. In some embodiments, the virtual display device 4100 may include a display 4112, which may be a light field display that includes a switchable electric glass screen 4112a that transitions from transparent to opaque, paired with a 4K transparent LCD display 4112b. Similar to the device 400, the device 4100 may support near-eye solution and far-eye solution, for example, by generating images from different planes a-la wave guide bending. Alternatively, other display technologies may be employed for the display 4112, such that the near-eye and far-eye solution may or may not be supported.

The virtual display device 4100 may include additional electronic components such as a simulation display processing unit 4102, a CPU 4103, a GPU 4110, one or more sensors 4114, an internal bus 4116, a transmit/receive component or component 4118, an audio output transducer 4120, whose structures and/or functionalities may be similar or identical to the corresponding components identified in FIG. 4A.

For example, in some implementations, the virtual display device 4100 may display interactive media contents onto the (interior and/or exterior surface of) autonomous vehicle 106 to simulate a celebrity vehicle, such as the Presidential Limousine, Batmobile, etc.

Figure 4C:
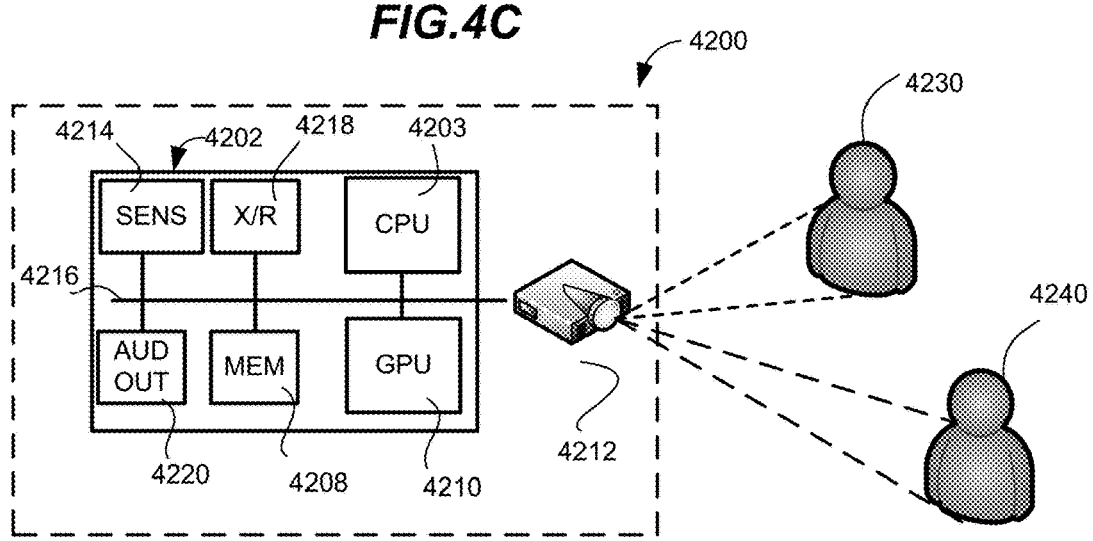
FIG. 4C is a schematic diagram showing features of an apparatus for configuring interactive media customized for one or more passengers in a vehicle or in relation to a vehicular trip, involving projecting interactive media onto persons or objects outside of the vehicle for virtual interaction.

FIG. 4C is a schematic diagram illustrating another type of a virtual display device 4200, as an example of the display installed in client 300, e.g., in or on an autonomous vehicle 106 as an example of a more specific form factor. In some embodiments, the virtual display device 4200 may include a display 4212, which may be a projector that projects real or holographic image onto a medium such as an object or in midair. For example, in some implementations, the virtual display device 4200 involves projecting interactive media content onto clothing (of the passenger(s)), or projecting a simulated personality in midair or on a display device in an autonomous vehicle 106. Apparatus for midair projection may include, for example, frosted orthogonal translucent screens or volumes with suspended reflective particles enclosed by transparent panes.

The virtual display device 4200 may include additional electronic components such as a simulation display processing unit 4202, a CPU 4203, a GPU 4210, one or more sensors 4214, an internal bus 4216, a transmit/receive component or component 4218, an audio output transducer 4220, whose structures and/or functionalities may be similar or identical to the corresponding components identified in FIG. 4A.

Figures 5, 6:
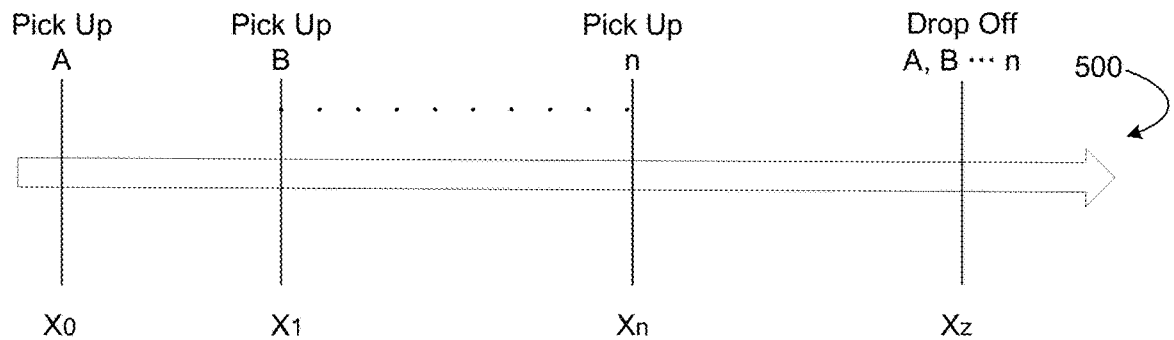
FIG. 5 is a concept diagram illustrating a map of pick up location(s), drop off location(s), initial location, intermediate location(s), and terminal location that may be involved in a common conveyance or a passenger's vehicular travel according to one or more embodiments.
FIG. 6 is a schematic block diagram illustrating an example of a data structure of trip data.

Turning to FIG. 5, FIG. 5 is a concept diagram that elaborates on the common conveyance concept depicted in FIG. 3B above. FIG. 5 illustrates a map of pick up location(s), drop off location(s), initial location, intermediate location(s), and terminal location that may be involved in a travel 500 in a common conveyance 106 by the group of passengers 330 in FIG. 3B, or a vehicular travel 500 by a passenger in vehicle 106, according to one or more embodiments. In an aspect, Pick Up A refers to the location $x_0$, where passenger A is designated or has been picked up by the common conveyance 106. Similarly, Pick Up B refers to the location $x_1$, where passenger B is designated or has been picked up by the common conveyance 106, and Pick Up n refers to the location $x_n$, where passenger n is designated or has been picked up by the common conveyance 106. In an example, Drop Off refers to the drop-off location $x_z$ where passengers A, B . . . n will be dropped off, such that no passenger will remain in the vehicle 106 thereafter. In some aspect, the pick-up location $x_0$ may be set by the processor as the initial location at which the one or more processors schedule initiation of an interactive media session, and the drop off location $x_z$ may be set as the terminal location at which the one or more processors schedule termination of the session. In another aspect, the initial location and the terminal location may be set by the processor at different locations between $x_0$ and $x_z$. Any location between $x_0$ and $x_z$ along the route 500 may be designated as intermediate locations by the processor(s). Of course, it should be noted that passengers A, B . . . n may be designated to be, or picked up or dropped off at, any location along the route 500, and their respective locations may coincide with one another, or not.

FIG. 6 is a schematic block diagram illustrating an example of a database structure of trip data 600 for use by one or more processors in configuring interactive media customized for the passenger(s), illustrated as a text data table representing travel context data regarding the passengers relevant to route-related information, for example time, place, booking information, stated reason or derived purpose of the trip, such that the interactive media components are configured based on the travel context data. The table may be organized as a relational database model, a self-referential database model, or any other suitable model known in the art or that may come to be known in the future. In an aspect, a first row holds account identifiers for the passengers, such as the name of the passengers or a unique passenger ID assigned to the passenger. In an aspect, a second row holds the pick-up location information for the respective passengers A, B . . . n identified in the first row (ID). In an aspect, a third row may hold initial location information at which the processor schedules initiation of the interactive media session for play by one or more passengers in the common conveyance 106, or a single passenger traveling in the vehicle, and a fourth row may hold terminal location information at which the processor schedules termination of the interactive media session for play by one or more passengers in the common conveyance 106, or a single passenger traveling in the vehicle. In an aspect, the Drop Off row may hold drop-off location information designated by the respective passenger or the processors as a result of the passenger playing the interactive media title. In an aspect, the Duration row holds the duration information during which the respective passenger is expected to experience the common conveyance. For example, the duration information may be derived by the processors based on the pick-up time of the passenger, the drop off location, and the estimated time of arrival at the drop off location using a navigation application (e.g., Google Maps) or any other suitable navigation application known in the art to estimate the duration of travel between the pick up location and the drop off location for each respective passenger. In an aspect, the Intermediate Locations row may hold information about intermediate locations along the route of travel for respective passengers. In an example, the intermediate locations may be designated by the passengers via manual input using U/1 324, microphone 314, display 320, a hailing app used by the passenger in hailing the vehicle 106. In other embodiments, the intermediate locations may inferred be by the processor from information collected from the passenger's smartphone or another device communicably connected to the vehicle 106 and used in hailing the vehicle 106, or available information on the internet including social media information pertaining to the passenger (e.g., Facebook accounts, etc.). In some examples, the processor may make such inference using algorithms that are further described herein below. Similar or other means that may be appreciated by those having ordinary skill in the art may be used. Visible Places row may hold information about one or more places in sight from the common conveyance vehicle 106 of a defined route through which the one or more processors schedule the vehicle to pass during a period in which the passenger(s) are sharing the common conveyance, or a passenger is traveling in the vehicle. In some aspect, such information may be derived using image recognition process to identify the visible places (trip events) that are in sight of the cameras 328b. in another aspect, such information may be derived from geolocation information derived from the geolocation sensor 328d, independently or in conjunction with the information derived using the image recognition process above.

Figure 7A:
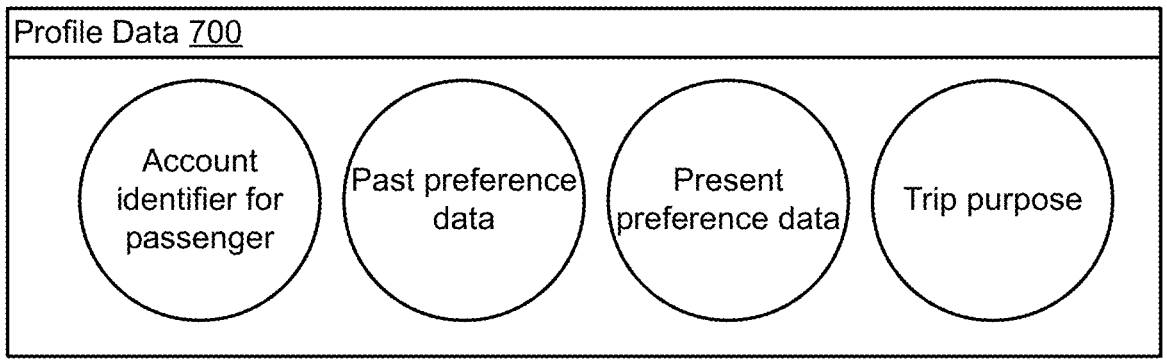
FIG. 7A is a schematic block diagram illustrating an example of a data structure of profile data.

FIG. 7A is a schematic block diagram illustrating an example of a database structure of profile data for use by one or more processors in configuring interactive media customized for the passenger(s), which may be modeled as a text data table like the example of the data table for the trip data discussed above with reference to FIG. 6. The table may be organized as a relational database model, a self-referential database model, or any other suitable model known in the art or that may come to be known in the future. The database of profile data 700 may include any or all of the profiling data pertaining to passengers as previously defined herein, and in particular, the database of profile data 700 may include account identifier for passenger, past preference data, present preference data, and trip purpose with respect to each passenger with the account identifier. If an account identifier for a passenger does not exist or is lost for a given passenger, one may be created anew, including present preference data and trip purpose, some or all of which may be automatically populated with predefined default datasets by the processor.

Figure 7B:
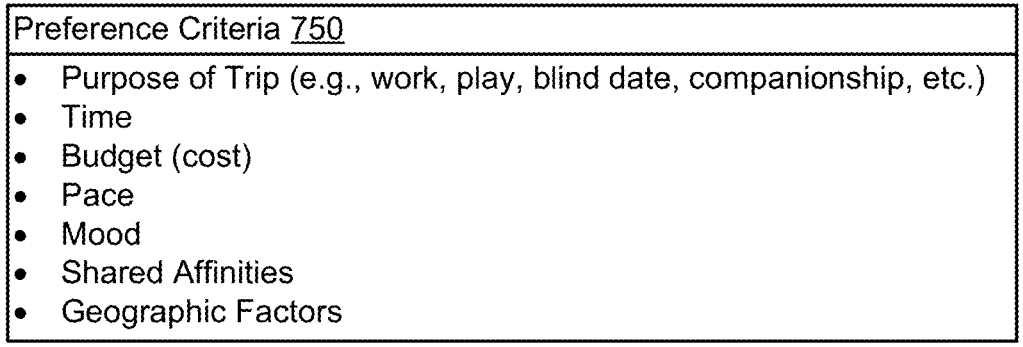
FIG. 7B is a schematic block diagram of the preference criteria aspects of the data structure of profile data.

FIG. 7B is a schematic block diagram of the preference criteria aspects 750 of the database structure of the profile data database 700. In an aspect, the preference criteria may be used by the processor to assign or deduce present preference data of the passenger identified by the account identifier. Preference criteria 750 may include: purpose of the trip (in the common conveyance/vehicle 106), such as work, play, blind date, companionship, etc.; time budget (hour or duration) of the trip; budget (cost); pace; mood, shared affinities, and geographic factors. Once a passenger experiences a ride on the common conveyance or vehicle 106, the preference criteria assigned or deduced as the present preference data will be moved to the past preference data bucket of the respective passenger, and past preference data may be maintained as a log history in the database of profile data 700.

Figure 8:
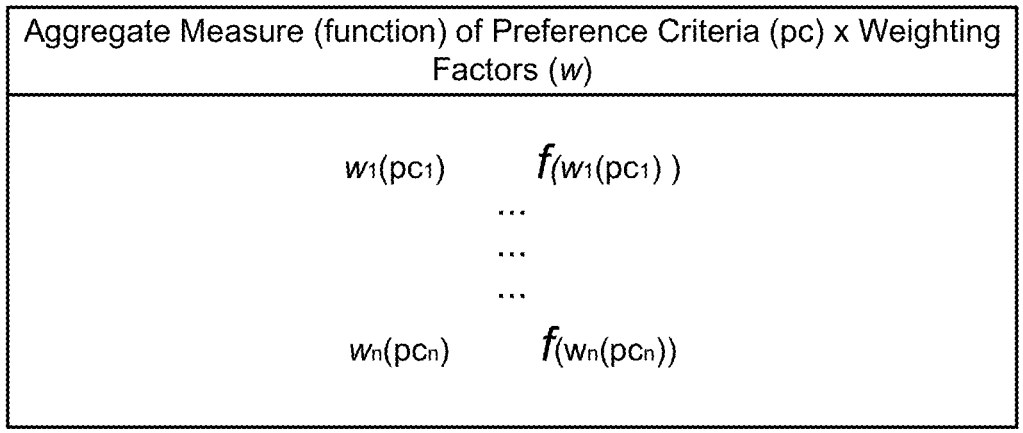
FIG. 8 is a schematic block diagram of the weighting of aggregate measure of preference criteria according to one or more embodiments.

FIG. 8 is a schematic block diagram of the weighting of aggregate measure of preference criteria according to one or more embodiments. In an aspect, the processor may calculate the aggregate measure of preference criteria 750 (pc) as a function of the weighting criteria (w) to derive a common interest in content or activity planned or ongoing in the common conveyance 106. In another aspect, the processor may use the weighted aggregate measure of preference criteria to determine the preference criteria with highest priority for a passenger traveling in a vehicle 106.

Having described examples of suitable clients, servers, and networks for performing the methods for configuring interactive media customized for passengers temporarily sharing a common conveyance, or for configuring interactive media customized for a passenger traveling in a vehicle, more detailed aspects of these methods will be addressed. The apparatus 200 and 300 may each perform the methods, alone, or working in cooperation.

Figure 9:
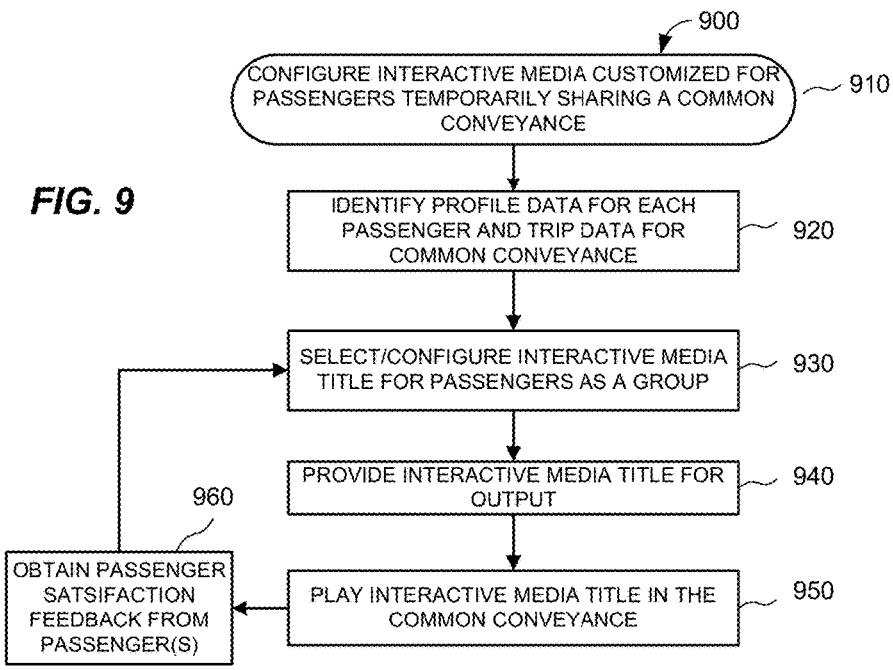
FIG. 9 is a flow chart illustrating high-level aspects of a method for configuring interactive media customized for passengers temporarily sharing a common conveyance.

FIG. 9 illustrates an overview of the methods 900 for configuring interactive media customized for passengers temporarily sharing a common conveyance, which may include related operations in any functional order or in parallel that may be performed by one or more processors (e.g., 202, 214, 302, 310). References will also be made to (elements appearing in) preceding FIGS. 1-8 and to elements referenced in the subsequent FIG. 10 in discussing FIG. 9.

An interactive media customization method begins at process 910, when a group of passengers is detected in a vehicle, boarding a vehicle, hailing a vehicle, or other activity for temporarily sharing a common conveyance. As used herein, "boarding" includes entering the vehicle and waiting to enter the vehicle, for example, waiting at a designated location for the vehicle to arrive after hailing a ride. At the process 920, one or more processors receive signals indicating passenger profile data 1010 (including passenger preferences criteria) and the trip data 1015 of the passengers sharing the common conveyance 106. In some embodiments, the processor(s) access a database (e.g., any one or more of 116, 122, 124, 126, 128, 220, etc.) including configuration information for the vehicle 106 upon receiving the signals. As used herein, "passenger" is defined as an occupant of the common conveyance engaged in travel, and may include, for example, a passenger of a common conveyance (e.g., vehicle 106), not precluded from acting as driver or pilot in some instances. In some implementations, the passenger profile may include digitally encoded data bits concerning affinity information related to the passenger, such as: the passenger's favorite characters (e.g., cartoon characters such as Bugs Bunny, Tweety, etc.) or amusement rides (e.g., theme park attraction rides such as Justice League 3D, etc.); social graph, status or topic for a meeting or social event preparation (e.g., a Facebook status, etc.); activity level or likes/dislikes for outdoor activity; favorite teams or players (e.g., professional sports teams/players, fictional teams/characters, etc.); favorite artists or songs; preferred merchandise and shopping style (e.g., cartoon character goods, or shopping at a particular retail store, etc.); culture; age; personal interests; and interactive content preferences (e.g., for holiday, season, religion, etc.), and the like.

In some aspect, the one or more processors at a content server may maintain a data structure holding components for interactive media contents. The data structure may be of any useful type, for example as described herein above in relation to FIG. 3C. In an aspect, the interactive media content may include an interactive and/or defined narrative such as audio video work, for example a movie, an episode of a serial drama, a documentary, an infomercial, a video game, an advertisement, a talk show or social game, or other programs, animated or not. The data structure may further include an ordered arrangement of components for the interactive media content, for example audio video clips or an episode of a series and the like.

The passenger profile data 1010 and the trip data 1015 (as part of the database of profile data 700 and the database of trip data 600, respectively) may be received or retrieved from one or more of the servers 116, 122, 124, 126, 128, and the like. In some aspect of the present disclosure, the sources of the passenger profile 1010 may include another server, or from an application (or "app"), or from a third-party server. For example, the source may be a server or an application from a tour company.

In an aspect, the profile data for a passenger may include data bits representing at least the passenger identity (account identifier), preference profile (incl. past and present), and trip purpose. As used herein, the preference profile is a subset of a profile data for a passenger, and it is defined as electronic data that describes the preferences of one or more users for interactive media output, and may include, for example, favorite types of entertainment, actors, characters, genres, colors, color scheme, music, and so forth.

In an aspect, the trip data may include data bits representing at least the vehicle's trip origin, destination, an estimated duration, and places along the trip's route. The trip data contains information representing geospatial locations of one or more data targets, and may include, for example, positional coordinates such as the latitude, longitude, and height relative to an ellipsoidal Earth model as may be provided by a satellite-based radio navigation system such as the Global Positioning System (GPS), street address, name (e.g., landmark or building names such as the Golden Gate Bridge, San Francisco International Airport, Stanford University, city name, etc.), street view (e.g., Street View available on Google Maps, etc.), and the like of the data target.

In one aspect, a passenger uses her smartphone communicably connected to the vehicle 106 to hail the vehicle 106 using a ridesharing app (e.g., Uber, etc.) to take a trip on the vehicle 106 to a desired destination. As part of hailing the vehicle 106, passenger profile data 1010 and/or trip data 1015 may be collected from the smartphone by the processor 202, 214, or 302. For example, at least the destination and timing (trip start time and estimated or actual end time) may be collected. In other embodiments, the passenger profile 1010 and/or trip data 1015 may be collected or inferred from input by the passenger via U/I 324, or from available information on the internet including social media information pertaining to the passenger (e.g., Facebook accounts, etc.). In certain embodiments, passenger profile 1010 may include data bits that signify mood (discussed in more detail below), desired vehicle experiences, passenger watchlists or alert lists, news and current events, and other information of evident interest. Similarly, the passenger profile 1010 and trip data 1015 may be collected with respect to any of the vehicles 101 (involving other use examples other than the ridesharing scenario described above) using similar or other means that may be appreciated by those having ordinary skill in the art.

At the process 930, the method may include producing interactive media title for the passengers as a group by at least one of selecting or configuring the interactive media content components from the interactive media content database. In an aspect, the selection or configuration of the components is based on the profile data 1010 and the trip data 1015 for one or more of the passengers sharing the common conveyance. In another aspect, the selected or configured components refer to at least one place along the route while in-bound from or out-bound to a trip destination as part of an interactive narrative. In an aspect, time (for example, hour, day, month, season, etc.) of the trip may also be used in the selection or configuration of the interactive media content components. The method may also include selecting or configuring, and producing the interactive media content based in part on the specifications of the hardware such as the interactive media player for entertainment consumption at each vehicle, for example whether the media player has 3D or virtual reality/augmented reality capabilities. In another aspect, the selection or configuration of the components is based on the passenger's or the group of passengers' mood as indicated by, or detected based on, one or more measures of passenger satisfaction 1040 and/or the biometric data 1020. In further aspect, the selection or configuration of the components includes selecting a second or more additional passengers to share the common conveyance in the vehicle based on matching an interest of those additional passenger(s) to the interactive media content. In some aspect, the interactive media content may be a still or video image for projecting to a display surface in or on the vehicle 101. The one or more processors at process 930 may use an interactive media content algorithm 1030, which may be a rule-based algorithm, a predictive analytics (AI) algorithm (interactive media content AI), or a combination of both, to select and configure an interactive media content for the identified passenger. Further details of the structure and operations of the interactive media content algorithm 1030 will be discussed below with reference to FIGS. 11-20.

In some aspect, the selecting and configuring operation at the process 930 may be configured to process destination (drop off location) or route features (e.g., initial location, intermediate locations, and/or terminal location; pick up location; duration of the trip; visible places; FIG. 6) for the common conveyance. For example, destination or route features may include digitally encoded data bits concerning the fastest route to a destination, the shortest route, whether to avoid highways, whether to avoid tolls, whether the route includes one or more intermediate locations or visible places, traffic condition (e.g., construction, weather, or accident causing a traffic delay), etc. The destination or route features may additionally or alternatively include data bits related to destination information, such as a theme park, a conference or meeting, an outdoor activity (e.g., national parks), baseball or other sports event, concert or other live performance, shopping or dining destination(s), social occasion of any type (e.g., birthday party, graduation party, etc.), holiday or season (e.g., Halloween, Fourth of July, etc.), and the like.

In some embodiments, the method 900 executed by the one or more processors running rule-based algorithm responds to words uttered or otherwise expressed (e.g., via text input) by the group of passengers and detected by the vehicle 106 via the U/I 324, microphone 314, sensors 328, etc., or intentional gestures performed by a passenger in the group of passengers and detected via the U/I 324, one or more sensors 328, or the like, and configure interactive media content. For example, the passenger group riding a vehicle 106 equipped with a virtual display device 400 may utter a voice command, "Play Harry Potter movie," upon riding the vehicle 106, and in response, the selecting/configuring process may select or configure an appropriate interactive media content, for example, playing an interactive movie file corresponding to the film, "Harry Potter and the Sorcerer's Stone" on a virtual display device 400.

In some embodiments, the predictive analytics (AI) algorithm 1030 may be used to predict elements of the interactive media content likely to appeal to the detected passenger(s), and/or to configure mood-sensitive content for the vehicle 106. The details of data streams and operations of an example of the predictive analytics algorithm 1030 are described with reference to FIGS. 11-12, below. It should be noted that instead of or in conjunction with the biometric data 1020, any one or more of the passenger profile data 1010, preference criteria 750, and trip data 1015 may be used, and instead of or in conjunction with the emotional indicators 1040, other sensory data detected by sensors 328, or data input by a user (passenger) via U/I 324 or 314 and the like may be used.

In an aspect, the interactive media configuration method 900 at the process 930 may configure mood-sensitive content components of the interactive media content. For example, in some embodiments, lighting, music and/or ambiance settings of the vehicle 106 that may form a part of the interactive media configuration may be configured according to passenger's mood. In some embodiments, the configuration of the mood-sensitive content may be based on a purpose of the trip, which may include information such as the destination categories, recent travels (time zone) and time of day. Destination categories may be read, for example, from location log history stored in the passenger profile 1010 or the trip data 1015, the passenger's smartphone or other connected device capable of location tracking, or the like. Examples of the purpose of the trip may include Work, Pleasure, Home, Weekend, Fun, Party, Drinks, Dinner, Date, and the like. Of course, other choices may be possible. That is, historic data indicative of habits or preferences of the passengers, e.g., music listening habits, times of day of travel, travel destination, and what routes the passenger travels, may be used to configure the mood-sensitive content. If such data does not exist for the passengers, then one may be preassigned (randomly or otherwise) as a default. For example, lighting inside the vehicle may be set to match a color temperature of outside environment if day time, and if night time, the lighting may be set based on the type of travel, e.g., a bright and flashy party lights for Party night-out, or a romantic soft lighting for a romantic date, etc. Passengers may override the lighting/ambiance settings via voice commands or other user commands. Ambience settings may include, for example, control or settings related to vehicle environment such as temperature, humidity, lighting, music, and the like, in or on the common conveyance.

At the process 940, the one or more processors deliver the produced interactive media title selected or configured at the process 930 to the passengers sharing the common conveyance, e.g., to the one or more interactive media player devices such as the interactive media content consumption apparatus 300, including but not limited to the virtual display devices 400, 4100, and 4200, and any or all of the components thereof.

At the process 950, the at least one interactive media player plays the interactive media in the common conveyance enabled for interaction with the passengers during the period. In some embodiments, the interactive media configuration operation 900 may include supporting continuity of play or execution of interactive media title between different vehicles, platforms, and or rides. For example, suppose the group of passengers initially receives an interactive media content (e.g., the Harry Potter movie) for enjoyment inside a ride share (such as Uber, etc.) on vehicle 106 on his way to a first destination (e.g., the airport). Once arriving at the first destination (e.g., the airport) or upon receiving an input from the group of passengers to pause the play of the interactive media content, the processor(s)

executing the selecting/configuring operation 930 may pause the interactive media content. The position of the pause in the interactive media content may be stored as part of the passenger profile data 1010 as metadata or the like. Then, once the group of passengers boards another vehicle 108 (e.g., an airplane for the passenger's flight) or upon specifically requesting resuming the interactive media content on a different vehicle 108 (or a different aesthetic output device 300), the interactive media content may be seamlessly resumed to support continuity of the interactive media content.

At the process 960, the one or more processors obtain one or more emotion indicator feedback from the passenger, which may be looped back to the process 930 to further refine the process of selecting or configuring of the interactive media content. process 930 uses a predictive analytics algorithm to correlate biometric data for a passenger, or her cohort(s) in the group of passengers sharing the common conveyance, to an emotional indicator. Optionally, the predictive analytics algorithm may be configured to process context-indicating data in addition to biometric data, which may improve accuracy. Context-indicating data may include, for example, user location, user position, time-of-day, day-of-week, ambient light level, ambient noise level, and so forth. For example, if the passenger's context is full of distractions, biofeedback data may have a different significance than in a quiet environment. An emotional indicator may be a symbolic value that relates to an emotional arc. The indicator may have constituent elements, which may be quantitative or non-quantitative. For example, an indicator may be designed as a multi-dimensional vector with values representing intensity of psychological qualities such as cognitive load, arousal, and valence. Valence in psychology is the state of attractiveness or desirability of an event, object or situation; valence is said to be positive when a subject feels something is good or attractive and negative when the subject feels the object is repellant or bad. Arousal is the state of alertness and attentiveness of the subject. The predictive analytics algorithms may include at least one supervised machine learning (SML) algorithm, for example, one or more of a linear regression algorithm, a neural network algorithm, a support vector algorithm, a naïve Bayes algorithm, a linear classification module or a random forest algorithm.

The process 930 may select destination branches at narrative forks of interactive media content, based on emotional indicators, predictions of emotional response, and a targeted emotional arc for the passenger(s). A participating control node may make predictions using machine learning tools to predict narrative elements likely to produce a targeted emotional state in the passenger/user or cohort. Once making the prediction, the control node selects the branch having the combination of elements scored as most likely to produce the targeted emotional response. In addition, the control node may base the branching decision partly on player actor direct input in a manner resembling an interactive video game, by weighing direct input together with emotional indicators. Direct user input may include, for example, spoken or texted verbal input, input from a game controller, bodily movement detected by a camera array, or selection of control links in a user interface. Further, the control node may base the branching decision partly on contextual indicators, such as dialog with NPC's or other player actors. Other examples of user input and emotional indicators may include, for example, eye tracking (gaze at ratio for engagement), facial action units (valance/arousal), heart rate (from a biometric sensor), IR (heat as a tell for arousal), and pupil dilation (arousal).

At a high level, in an aspect, interactive media content may be caused to alter itself based on engagement (eye tracking gaze) and arousal from content and or from the emotional arcs. The interactive media content will change and auto edit in order to keep passengers engaged. Content alterations for engagement at a basic level involve changing the music and SFX volume/mixing to re-engage. Brightness of the screen may also be adjusted. In some implementations, mood-sensitive content components may include scary or violent contents that form a part of the interactive media title, and such contents may be cut, censored, or deselected as part of configuration process 930 when the passengers are children and the biometric data collected from the passengers indicate fear or adversity.

In an aspect, if low engagement (eye tracking measured gaze angle/time) or low arousal based on biometric signals (lower than baseline arousal from sensors), the interactive media content may be re-edited in real-time with alternate contents with more attention grabbing performances (as defined by the creative) to engage the passengers. Alternate segments may be identified and stored in a database described herein for this function.

An example of a rule-based algorithm for changing and auto editing the interactive media content is provided below:

```
Baseline_arousal_for_rider = sensor_type_arousal_measurement under
no stimulus
Start ride
Start calibration signal
Measure baseline arousal & valance
Provide content selection
Play content
[ while content plays
    monitor arousal and engagement of viewers
if (arousal && engagement (via eye gaze detection) < baseline_arousal
&& engagement
{
    increase volume by 5%
      play_Alternate_sequences_in_Show_to_increase_arousal
count++; ' count how many attempts made to re-engage viewers
    }
    if count >15 ' after 15 tries present user the option to change show
    {
    prompt user to ask if they would like to watch another show
    if yes present other show options and if no continue to play and
disable content alterations via biometrics
    }
]
```

For example, engagement via gaze detection is determined by the type of content and average time engaged viewers watch the show without looking away.

An interactive media content control node may be configured to change the characteristics or behaviors of characters, objects, or environments appearing in interactive media content (collectively, "supportive content"), with or without altering the narrative. A supportive content selection operation at the process 930 selects characteristics and behaviors of audio-video elements based on emotional indicators, predictions of emotional response, and a targeted emotional arc for the passenger/user or cohort. Supportive content selection may predict responses to changes and weigh emotional inputs with user inputs, using techniques that parallel branch selection. For example, a first user's past responses may indicate an association between the color red and happiness, while a second user's responses indicate an association between green and happiness. For scenes intended to be happy, the supportive content selection operation may cause more red objects to be displayed for the first user, and more green for the second user. More complex supportive content selection may include character interactions, which is discussed further herein below.

Emotions cannot be measured directly therefore the system processor measures sentic modulation. Sentic modulations are modulations of biometric waveforms attributed to emotional states or changes in emotional states. In an aspect, to obtain baseline correlations between sentic modulations and emotional states, player actors may be shown a known visual stimulus (e.g., from focus group testing or a personal calibration session) to elicit a certain type of emotion. While under the stimulus, the test module may capture the player actor's biometric data and compare stimulus biometric data to resting biometric data to identify sentic modulation in biometric data waveforms.

Figure 10:
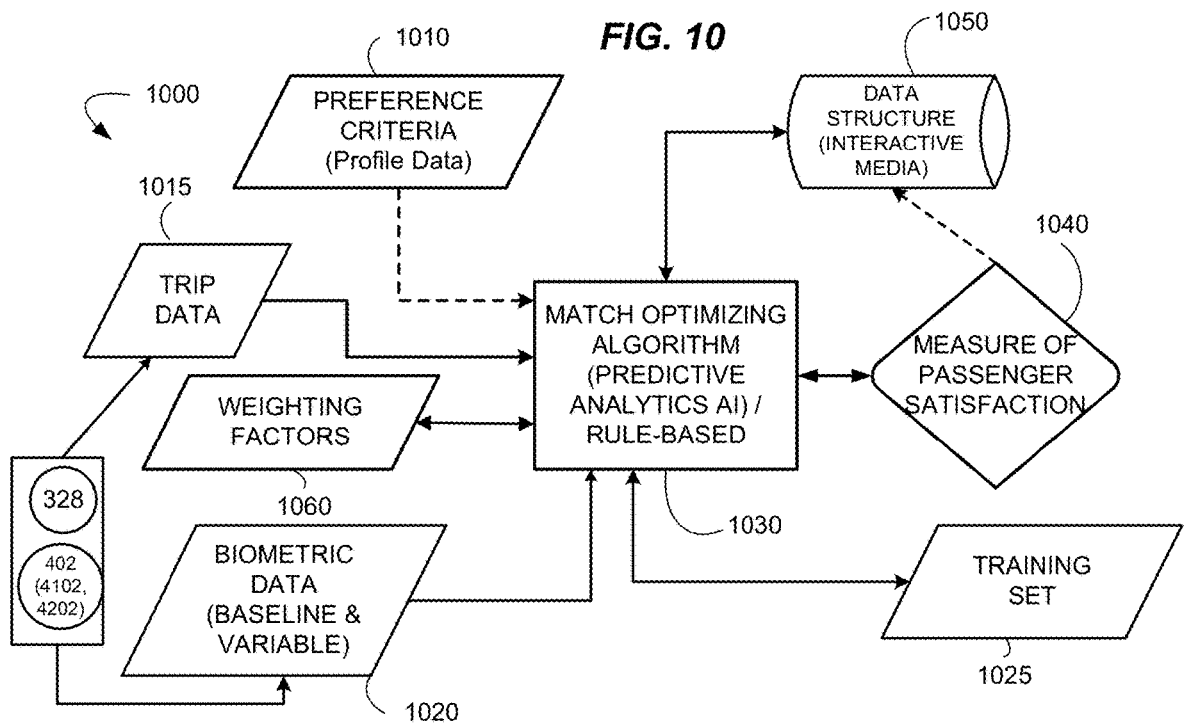
FIG. 10 is a block diagram illustrating high-level aspects of a system or apparatus for configuring interactive media customized for passengers temporarily sharing a common conveyance, or a passenger traveling in a vehicle.

Predictive analytics, including machine-learning algorithms sometimes referred to as artificial intelligence (AI), can be an efficient tool for uncovering correlations between complex phenomena. As shown in FIG. 10, a system 1000 for controlling output of interactive media content responsive to profile data 1010, trip data 1015, and sensor data (biometric data) 1020 indicating one or more passengers' emotional state(s) may use an interactive media content production process 1030, e.g., a predictive analytics algorithm using artificial intelligence (AI) to detect correlations between interactive media content and biometric data 1020. The interactive media content production process 1030 may receive profile data 1010 and/or trip data 1015 that are time-correlated to the biometric data 1020 from client devices (e.g., clients 300, 402, 4102, 4202, and the like). The data may be associated with a specific passenger/user or cohort in the group of passengers sharing the common conveyance, or the data may be generic. Both types of input data (associated with a passenger/group and generic) may be used together. Generic input data can be used to calibrate a baseline for emotional response, to classify a baseline emotional response to a scene or arrangement of interactive media content elements. If most passengers exhibit similar biometric tells when viewing or experiencing an interactive media content within a narrative context, the interactive media content component can be classified with other components that provoke similar biometric data from users. The similar interactive media title components may be collected and reviewed by a human creative producer, who may score the components on emotional indicator metrics 1040 manually, assisted by automated analysis tools. In an alternative, the measure of passenger satisfaction 1040 can be scored by human and semi-automatic processing without being classed with similar components. These human-scored elements become training data for the predictive analytics process 1030. In some embodiments, humans scoring elements of the interactive media content may include the users, such as via online survey forms. Scoring should consider cultural demographics and may be informed by expert information about responses of different cultures to scene elements.

The predictive analytics process 1030 compares human and machine-determined scores of components or other interactive media content elements and uses iterative machine learning methods as known in the art to reduce error between the training data and its own estimates. Interactive media content analysts may score data from multiple users and vehicle trips based on their professional judgment and experience. Individual users may score their own content. For example, users willing to assist in training their personal "director software" to recognize their emotional states might score their own emotions, interests, affinities or the relevance of produced content to trip information while consuming the interactive media content. An issue with this approach is that the user scoring may interfere with their normal reactions, misleading the predictive analytics algorithm. A combination of these and other approaches may be used to develop training data for the predictive analytics process 1030.

Once the process has learned correlations for a passenger or group of passengers, it is ready to apply its learned correlations during real-time content consumption.

Figure 11:
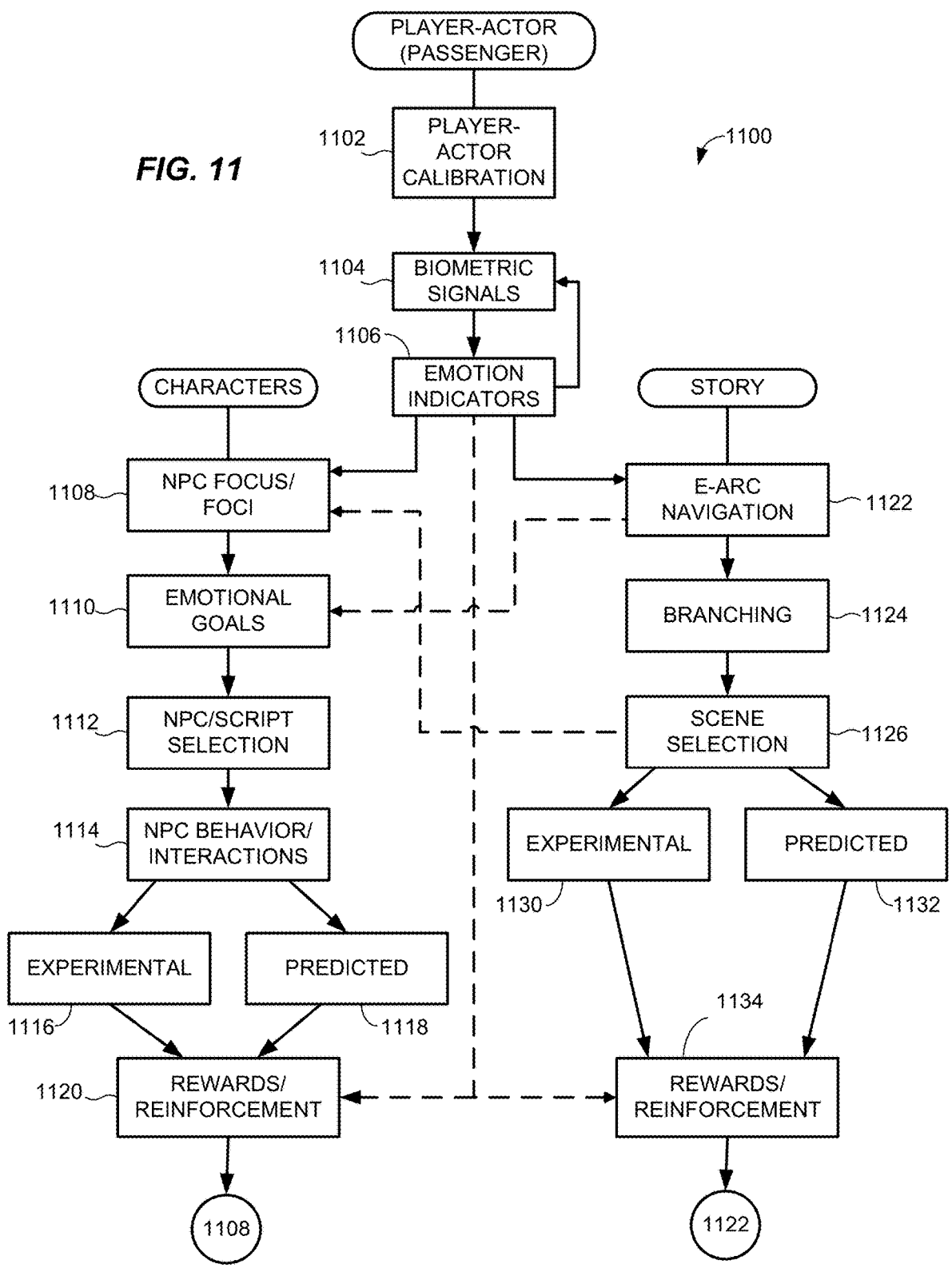
FIG. 11 is a flow diagram showing aspects of a method for configuring interactive media customized for passengers temporarily sharing a common conveyance, involving controlling output responsive to sensor data indicating a user's emotional state.

FIG. 11 shows aspects of a method 1100 for configuring interactive media content responsive to sensor data indicating a passenger's mood or emotional state, using cooperating AI loops. The method 1100 provides a more detailed example of the methods overview 900 illustrated by FIG. 9, in which a player actor interacts with a story arc and with computer-controlled characters (e.g., "bots" or NPCs) that play roles within the interactive media content. Such characters are an example of supportive content, which supports but does not nullify the narrative and emotional arcs that the interactive media content is designed to follow.

Blocks 1102-1104 correspond to a player actor loop. At 1102, an interactive media output device (e.g., content consumption apparatus 300) calibrates itself for use by a player actor. This may include training of a predictive analytics algorithm, taking baseline measurements, downloading available calibration data from a server for use in a session with the player actor, or other customization. In an aspect, calibration is designed to be as unobtrusive as possible. For example, calibration by the media player, alone or in cooperation with one or more artificial intelligence (AI) servers, may occur continuously or at intervals and gradually improve with time as the system builds a more accurate emotional profile of the user. In addition to resting physiology sensor calibration, the calibration system may also normalize biometric data between player actors to establish a baseline for comparing biometric responses between players. An additional content expectation normalization may also be measured to quantify player expectation of content. This process may include the measurement of biometric responses while under representative stimulus content. Calibration and normalization, when used together, provide a robust baseline methodology for computing both singular and aggregate biometric responses between players. The calibration and normalization factors may be used to compute emotional responses and engagement with content.

At 1104, the media player begins playing the interactive media content and the player actor begins experiencing it while the content consumption apparatus's sensors begin detecting biometric signals used for emotional indication. Biometric sensors used to detect the biometric signals are known in medical fields and may be adapted for sensing in the present application. For example, sensors developed for medical uses capable of monitoring physiological signals may include, for example, electromyography (EMG) sensors that sense electrical activity produced by skeletal muscles, electroencephalography (EEG) sensors that detect electrical activity in the brain, galvanic Skin Response (GSR) sensors that detect changes in the electrical resistance of the skin, electrocardiogram (ECG/EKG) sensors that detect heartbeat; optical sensors that detect body language, facial expressions, gaze direction and corneal deformation, brain-computer interface (BCI) signals that directly connect an enhanced brain with a coupled machined (e.g., the media player or an intermediate machine) with or without bidirectional communication capability between the brain and the coupled machine, and microphones for audio analysis to detecting emotional indicators such as voice modulation. Other sensors as more fully described in International Appl. No. PCT/US18/53614 may also be used. The processor may receive trip information data from a ride hailing application and augment the data during a trip by the vehicle navigation system and road condition sensors. Road condition sensors may include, for example, accelerometers, cameras, microphones and laser distances sensors. The processor may obtain affinity and preference information from each passenger profile or log-level mobile activity. The processor may infer preference and affinity information based on emotional response data (e.g., valance and arousal) to genres, types, and other aspects of interactive media content.

At 1106, the system 1000 (e.g., the content consumption apparatus, optionally with participation by network nodes) digitizes and processes sensor data, thereby deriving symbolic emotional indicators (e.g., measure of passenger satisfaction 1040) that can be correlated by story-telling software to emotional targets of a story arc. Machine learning/AI tools may be used to process the sensor data and derive indicators in real time. The emotional indicators may be, or may include, quantitative measures of symbolized emotional qualities, preferably in a compact form. For example, a 64-bit machine-readable value can convey a value of 21 different emotional qualities in a scale from zero to eight, in which the identity of the quality is conveyed by bit position of its value. For example, the first three bits may indicate a happiness value, the second three bits a tension value, and so forth. Schemes for indicating emotions in machine-readable data are described in more detail herein below.

Blocks 1108-1120 correspond to a non-player game character, object, or element (NPC) loop. At 1108, a processor of the media player determines a focus or foci on one or more NPCs. Relevant input to the determination 1108 may include emotional indicators from the player actor loop (block 1106) and a scene identifier from the story loop (block 1126). The scene identifier may be based on trip information. From the scene data, the processor narrows the list of available NPCs to those available for the scene at hand, for example using a database query to retrieve all NPC identifiers that the content designers have associated with the scene. The player actor's current emotional state from process 1106 is used at a later stage described below.

Further relevant input to process 1108 may include the NPCs' emotional impact scores. Each NPC may be associated with a predetermined emotional impact score, which may be generic or customized for the player actor. For example, a young child NPC might be scored high on a generic sympathy scale and low on a sympathy scale customized for a player actor who has an aversion to children. The emotional impact score is a predictive value based on experience of the content designer and/or empirical data. When well-crafted, the NPC's emotional impact score will predict the emotional reactions the NPC is most likely to evoke in the player actor. For example, a cute child NPC might score high on sympathy and low on fear. Similarly, the process 6108 may select a tactic for the NPC to use, e.g., confrontation, reassurance, and so forth. Each NPC may be associated with one or more tactics suitable for its emotional profile.

Before selecting an NPC based on emotional impact score, the one or more processors determine an emotional goal or goals for the player actor at 1110. For example, the one or more processors may determine from the emotional arc navigation process at 1122 that a targeted emotion for the player actor is suspenseful anxiety for the scene identified at 1126. Having received a current player actor emotional indicator value from the process 1106 via its upstream process 1108, the goal-setting process 1110 may compare the current value with the targeted value and determine an error. For example, suppose the target is suspense but the current emotional state indicator indicates that the player actor is bored. In response, the goal-setting process sets a goal of moving the player actor from boredom to suspense. The process 1110 may provide the goal to downstream process 1112, which selects an NPC and script for the NPC to operate. In an alternative, the process may select a different tactic for the NPC to follow, which may be associated with different scripts. Continuing the example, the selection process may select an NPC with an emotional impact profile that scores highly for transforming disinterest into suspense for the player actor, and a script that scores highly in the same category.

At 1114, the processor operates the selected NPC according to the selected script. The script may be interactive, such that the NPC behaves differently based on player actor direct interaction with it or on updated emotional indicators. In an aspect, the process 1114 may operate a predicted script illustrated at 1118. The predicted script is the one predicted by the process 1114 to be most likely able to correct the player actor's deviation from the targeted arc. If the predicted script fails, or based on random or quasi-random factors, the process 1114 may operate an experimental script illustrated at 1116. Experimental scripts test the player actor's response to untried circumstance. Such scripts may be useful to avoid payer actor boredom with repeated scripts or themes, or when predicted response data is lacking.

At 1120, the processor records the emotional effect of the NPC and script in the relevant data structures used for training the AI algorithms responsible for NPC and script selection. Successes and failures thereby become new data for use in improving the future effectiveness of the method 1100 in using NPC interaction to nudge player actors towards an emotional target. If the nudging is unsuccessful, the process may select and implement a different NPC, tactic, or script at any point when the emotional sensor data indicates that the targeted reaction is not being elicited from the player actor. The method 1100 may revert to block 1108 for the next scene.

Blocks 1122-1134 correspond to a story loop. The story loop proceeds similarly to the NPC loop, but is directed to component selection for the main interactive media content instead of NPC selection and behavior. At 1122, the processor navigates its trip and story model. For example, the processor may compare its current location and velocity in real space to a location and velocity in a model used for rendering the sensory content, to a library of components related to locations along the route for the current trip, or both. In addition or in an alternative, the processor may compare the player actor's current emotional indicator to an emotional arc defined in digital data for the story as further described in PCT/US18/53614.

At 1124, the processor selects a narrative branch based on predictive analytics for at least one of the player actor or trip information. For example, the processor may determine which narrative branch has the closest semantic relationship to objects along the route for which the passenger has an affinity. For further example, the processor may predict which narrative branch is most likely to result in the player actor experiencing the director's emotional arc, based on an emotional impact score for the branch. The processor may score semantic or emotional elements by taking an aggregate of scores for the scenes that the branch contains.

At 1126, the processor selects the next component in the narrative branch, again based on emotional impact and an estimation of error. A single narrative branch may contain alternative components that do not change the main story line but are tailored for greater semantic relevance, greater passenger affinity and/or emotional impact for users. For example, the same story may be told using different components for child and adult player actors. If the processor detects no emotional error, it may use a default component or branch. In an aspect, the processor may use an identity of the selected component for further customization of the NPC character as previously described.

At 1130 and 1132, the one or more processors select a component based on a predictive analysis 1132, or an experimental trial 1130. Predicted and experimental components may be selected by the one or more processors based on the same or similar factors used to decide between predicted and experimental NPCs and scripts. At 1134, the one or more processors record the measured emotional response for improving future AI predictions. Thus, a player actor loop, NPC loop, and story loop may run concurrently and cooperatively to actively implement schemes that interact with trip information and with sentic modulations of player actors, including the branch, scene and NPC control schemes for influencing player actors towards targeted emotional arcs and achieving relevance of content to travel undertaken as outlined above.

Multiple stories can be programmed into interactive media content produced for interactive media content production AI. Story elements can be combined in countless ways by AI engines reacting to emotional feedback from player actors, producing story patterns that content designers only dimly apprehend if at all during the creative process. Too much variety can become a technical weakness, if many varieties are unappealing. The technical challenge is to improve the frequency with which users find their own version of cinematic content appealing to watch and spend social time discussing. Hit the mark with high frequency, and the amount of variety will be an asset, not a liability. Player actors will have a new pastime: comparing personal versions. When personally identifiable viewing history is kept under the control of the subject, its social value as "knowledge for friends only" creates economic value for the creators of the information even if the creators have no access to the information. As material for private social exchange, its value is in creating demand for the interactive media content.

Data on emotional reactions and AI choices will have economic value stripped of personal identifying information, as well. Thus sterilized, researchers and creators can study the data using AI tools to understand usage trend and design new content. Emotional proxy ('tells') information that tracks (links with) certain attributes or other relevant story/arc/experience components from single passengers/users or cohorts may be used to guide generation of more stories or arcs or experience attributes, besides driving of-the-moment, real-time content flow. Emotion indicators gathered from single passengers/users or cohorts of users to feed the story management process has additional value for contouring new content (e.g. the next chapter of a story, level of a game, episode of episodic fare, sequel to a movie, and so forth), producing trailers for marketing and promotion, or green-lighting prospective story ideas, based on that information. In addition, the de-personalized data may be useful for user ratings of content.

As noted in connection with FIG. 11, in one approach, story branches are triggered by player actor emotions which provide a feedback loop into the story management software. Story management software controls the environment and artificial character inclusion and goals. Writers and directors train the story management AI but the AI controls the emergent stories possible by player actor interactions and emotions One technique for improving success frequency may be to use story element emotional codes, also called scores. Story management software changes interactive media content components and NPCs based on NPC goals designed to elicit emotions from player actors. Emotional responses will be mapped to common story elements including, for example, point of attack, inciting incident, climax, first culmination, and resolution. Story element emotional codes allow for dynamic emotional branching in various patterns.

Figure 12:
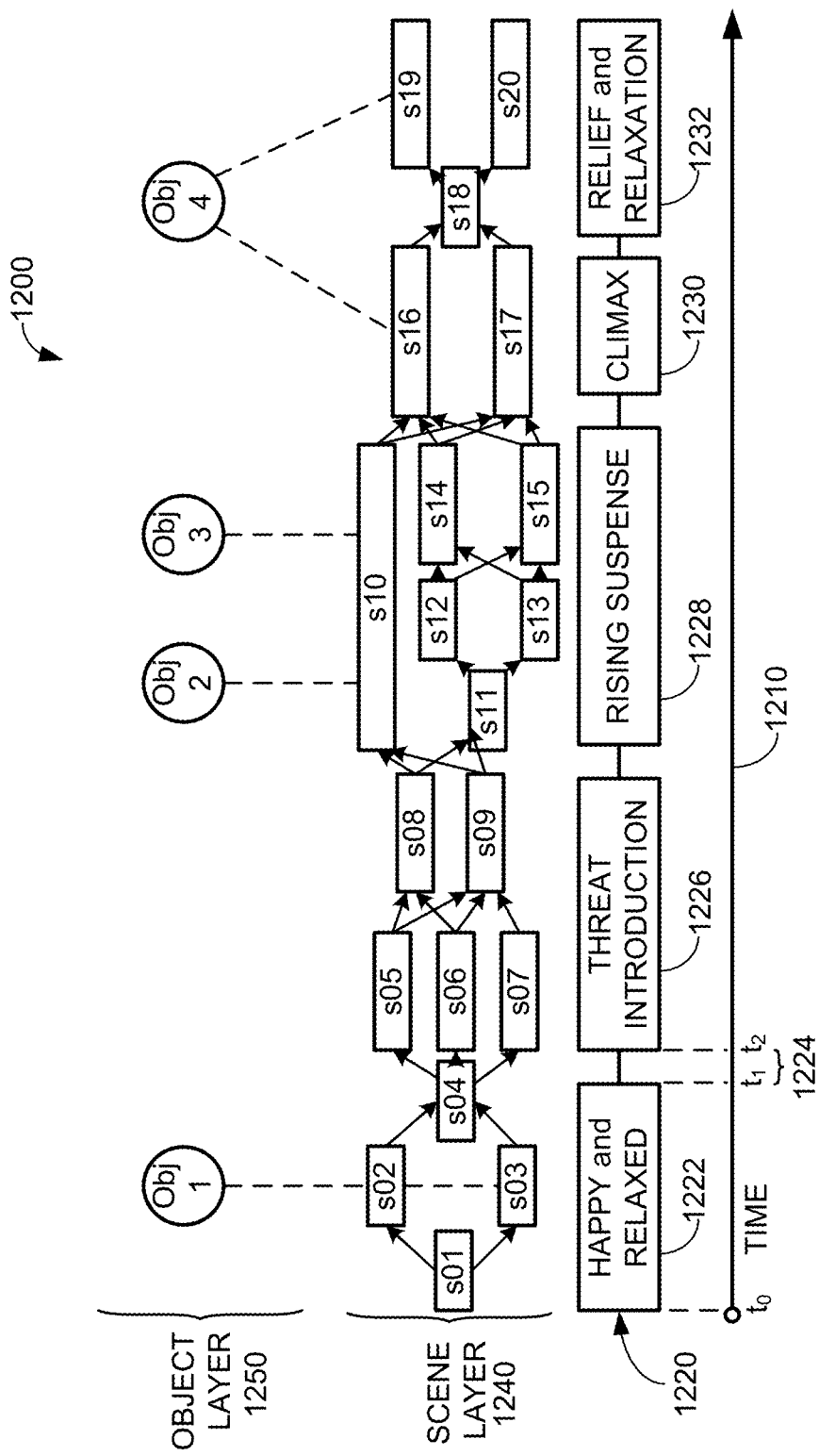
FIG. 12 is a concept diagram illustrating a map of layers and branching of interactive media content for a vehicle with an emotional arc responsive to sensor data indicating a user's emotional state.

FIG. 12 shows a map 1200 of layers and branching of interactive media content with an emotional arc 1220 responsive to sensor data indicating a user's emotional state. While the map is correlated to an emotional arc, in an alternative or in addition, the map may likewise be correlated to events during a trip and weighted by passenger affinity or preference information. The map is time-correlated against a timeline 1210 beginning at initial time $t_0$. The emotional arc 1220 includes a sequence of target periods that summarize predominate emotions during a time interval. For example, a predominate emotion in the first segment 1222 is happy and relaxed, in the second interval 1226 threat awareness (mild fear), in a third interval 1228 rising suspense, in the fourth interval 1230 climax (excitement), in the fifth interval 1232 relief and relaxation. The intervals may be separated by transition periods, a first 1224 between times $t_1$ and $t_2$, in which emotions overlap. Emotion arcs may be modeled by other models. For example, instead of a chain of intervals 1220, an emotional arc may be modeled as a vector of periodically (e.g., every 5 seconds or less) updated variable values, wherein each value of the vector represents a quantitative value of an emotional quality. The division into segments of predominate emotion is merely a convenient summary.

Component layer 1240 may be, or may include, a directed acyclic graph (DAG) of nodes (e.g., nodes s01-s20). A story tree is a restricted form of DAG, in which each child node can have only one parent. Component layers can be arranged in trees, or in any other DAG. FIG. 12 shows a component layer 1240 in a DAG not restricted to a tree. Some downstream components can have more than one parent, and the layer can separate into parallel chains in spots. For example, component s04 has two parents, s02 and s03. Components s12-s14 form competing parallel sub-chains. Each component has a definite length in time. For example, story software may define a maximum length of time for interactive content components as the maximum time allowed for NPC's or components to reach an emotional target before giving up. Gaps are shown between components merely for illustrative separation. In most interactive media content, each component should fit or blend smoothly with the next. Gaps may be avoided by predicting each player actor's preferences to delete certain components or moments, for example, based on prior offline data or an initial calibration exercise. In this manner, knowing that some gaps would otherwise occur if certain components or moments were to be abridged, the story controller may call up replacement components or moments, or implement seamless 'branching' to an appropriate next node or set of nodes to avoid gaps.

Object layer 1250 holds any emotion-influencing objects that appear in any scene, affect the appearance or any interactive media content component, or change the audio content of any component. Objects can include interactive NPCs and their scripts as previously described, props, backgrounds, environments, lighting schemes, surface colors and textures, audio tracks, or any other object in a component that is controlled to evoke an emotional response in a player actor. In layer 1250, a first object 'Obj. 1' can appear or operate in components s01-s02. Second and third objects 'Obj. 2' and 'Obj. 3' appear or operate in long components s10 only. A fourth object 'Obj. 4' can appear or operate in both components s16 or s19. Few objects are shown in the map 1200 for illustrative simplicity. In an actual map of most interactive media content, most components will be associated with numerous different objects. Although the map 1200 is simplified, it illustrates an example of a map such as may be used to provide structure and guidance to interactive media content production AI during a multi-loop control process 1100 as illustrated in FIG. 11.

Figure 13A:
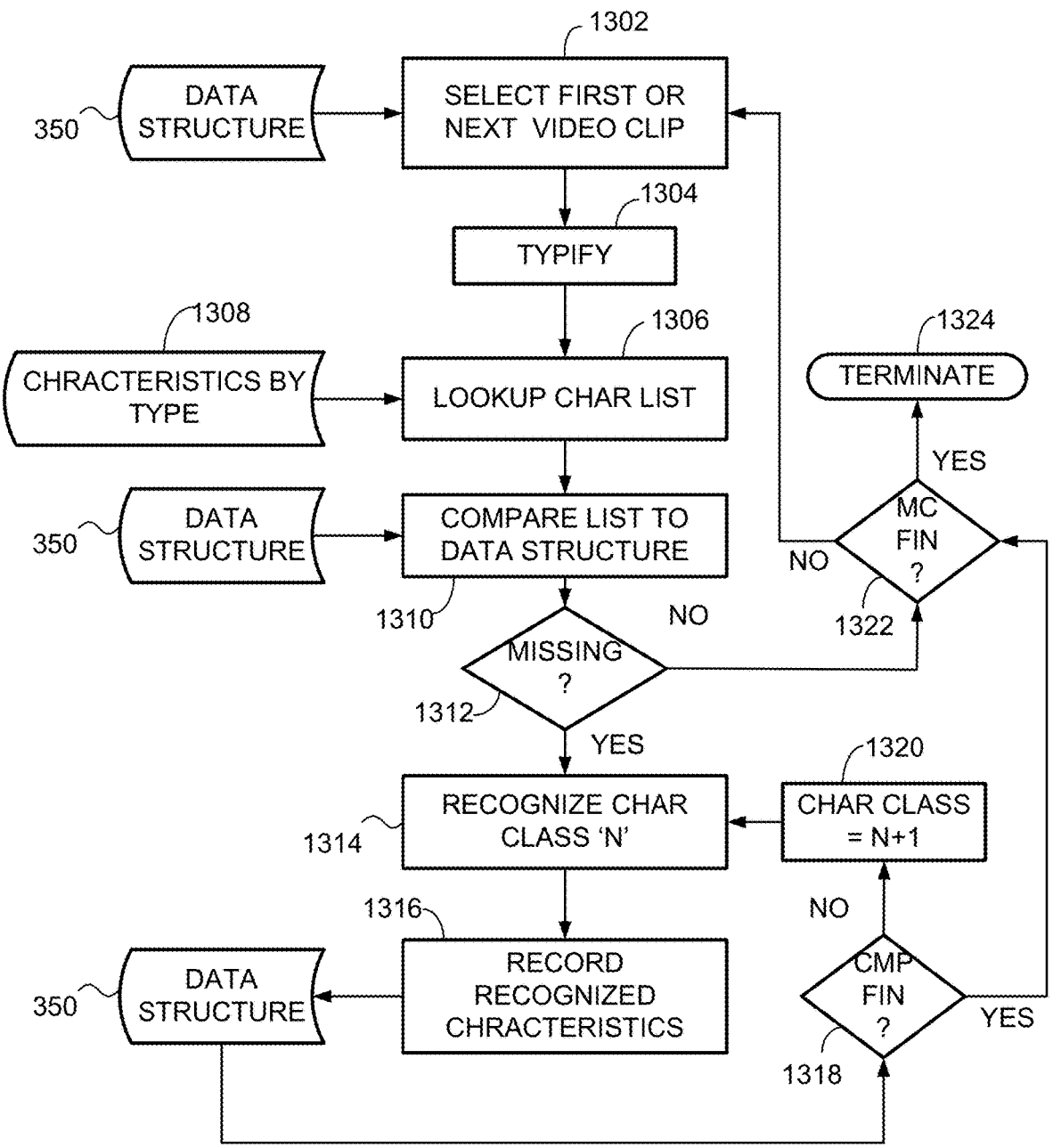
FIG. 13A is a flowchart showing an algorithm for associating by one or more processors an interactive media component with a user-perceivable characteristic of the component with travel events.

FIG. 13A shows aspects of an algorithm or method 1300 for associating by one or more processors an interactive media component with a user-perceivable characteristic of the component. User-perceivable characteristics may include, for example, tone of a color scheme, mood of a sound track, position in a narrative tree, a duration of a segment, a subject, and identities of one or more characters, objects, items, buildings, landscape, landmark, etc., appearing in or represented by the media component. At 1302, the processor may select the media component, for example, using a loop to pick the next or first media component in a list such as the data structure 350 shown in FIG. 3C. An equivalent or different list may also be suitable. An initial list of media may be assembled by a production team. For example, it may be convenient for a production team to create and partially or completely populate a data structure 350 as shown in FIG. 3C or equivalent structure during production of components for media content, as part of a content production process. If a complete data structure is already produced and does not need to be augmented, associating is already completed and there may be no need to execute an automatic process 1300. However, some user-perceivable characteristics may not easily be collected or described by the production team. In addition, when converting legacy media content (e.g., digital content converted from film, or older digital content) for use with the methods herein, essentially no user-perceivable characteristics may be available.

At 1304-1312, the processor may determine whether the component is missing any needed characteristic data. For example, at 1304 the processor may determine a type of the media component, for example, video clip, audio clip, 3D model, and so forth, based on metadata or based on a trained machine-learning recognition algorithm for digital data. Then, at 1306 the processor may look up a list 1308 of desired characteristic classes for the type of media component detected. For example, the list may contain classes of information relevant to travel events such as, for example, a geographic location, historical significance, relation to fictional or historical characters, or play duration; classes of emotional response such as valance, arousal, or content engagement power (CEP); or a class of eligible position or positions in a narrative tree. Then, at 1310 the processor may compare the list to the characteristic classes of the interactive media component in the data structure and based on the comparison determine whether the data structure 350 is lacking any desired class of characteristics defined by list 1308 for media components of its type. At 1312, if the processor determines characterization in a desired class of characteristic is missing, it may execute a process 1314 for recognizing characteristics of the missing class. If at 1312 the processor determines that no desired characteristic class is missing, it may proceed to determine at 1322 whether characterization of the media content is finished. From block 1322, if the process 1300 is not complete the processor may proceed to select the next media component in the content at block 1302.

The process 1314 may receive at least a portion (e.g., a segment of a video game session or a frame of video data, etc.) of the interactive media component and/or its metadata as input and output a characteristic in a specified class. The character may be expressed as metadata in the data structure 350, for example, as one of the semantic tags 356. The process 1314 may be, or may include, one or more of: a deterministic rules-based algorithm that processes the input using a predetermined ruleset; a predictive analytics (e.g., machine-learning) algorithm trained to recognize a characteristic (e.g., a character, place or object identity) over a set of training data; or a combination of deterministic and predictive analytics algorithms. At 1316, the processor may record the determined characteristic in the data structure 350. At 1318, the processor may determine whether determining characteristics for the media component is finished; if not, if may increment the class by one at 1320 and revert to process 1314 for the next class. If determination is finished, the processor may determine at 1322 whether characterization of the media content is finished. If the determination of the content is complete the processor may terminate the process 1300 at 1324.

Figure 13B:
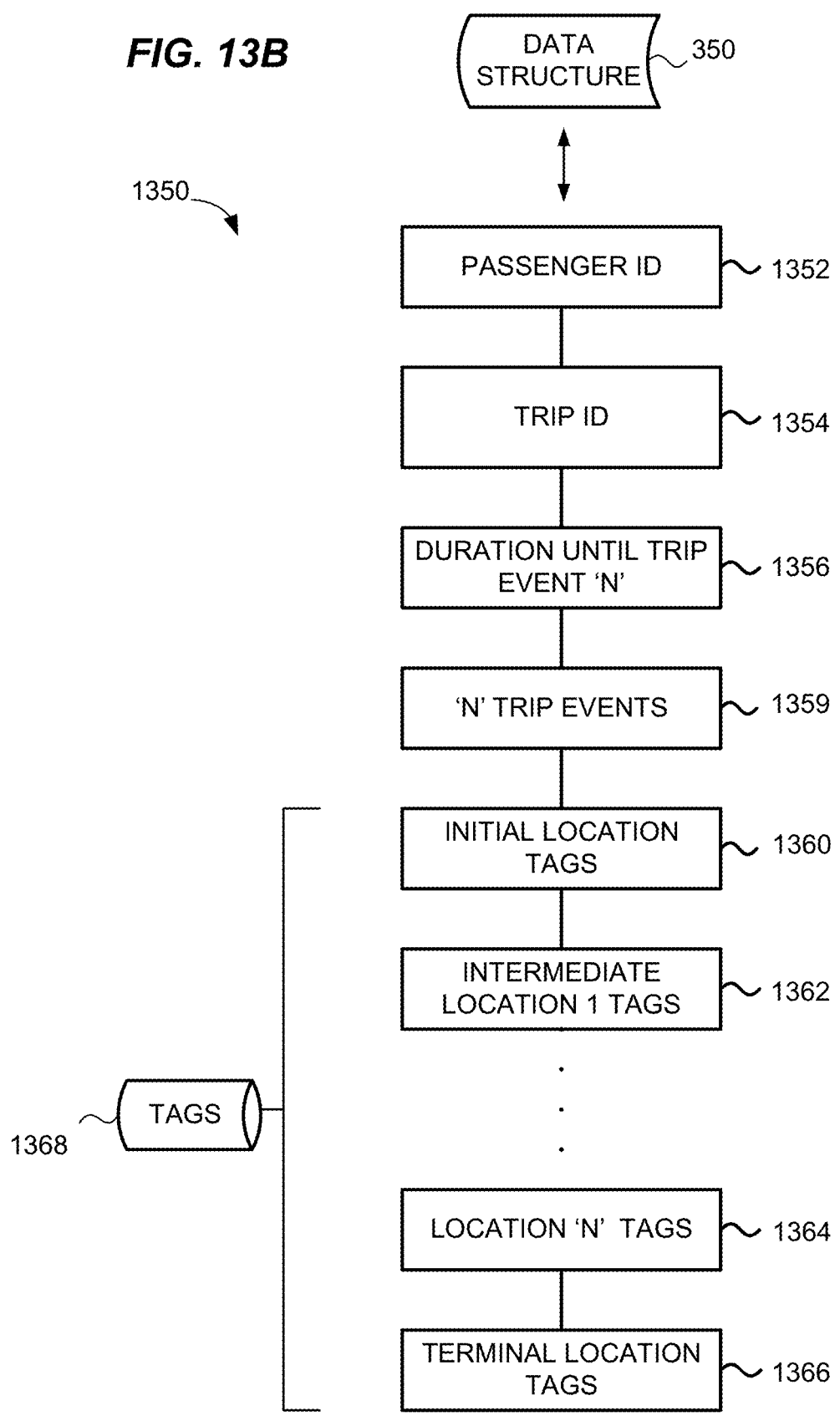
FIG. 13B is a schematic block diagram illustrating a data structure for use by one or more processors for relating a user-perceivable characteristic.

FIG. 13B shows an example of a data structure 1350 for use by one or more processors for relating a user-perceivable characteristic, for example a location, visible place, character or object appearing in or referenced by the interactive media component or a duration of play of the interactive media component with a trip data, for example a change in estimated time remaining until arriving at, or user selection of, a destination, an origin, or an intermediate location along the route. Elements of the data structure 1350 shown in FIG. 13B may be linked to any media component identifier by a data structure 350 as shown in FIG. 3C, or equivalent data structure having elements corresponding to one or more of the elements 1352-1356. The elements 1359-1366 may be generic with respect to any particular trip or passenger (or a group of passengers), and so may be used to correlate an interactive media component to multiple trips by multiple passengers. For example, a processor may correlate an interactive media component with a duration of 15 seconds (i.e., a particular duration) and a semantic tag of "Santa Monica" (i.e., a particular semantic tag) in the data structure 350 to any trip by any passenger along a route that includes at least one destination tag of "Santa Monica" (i.e., a matching tag) involved in a common conveyance or a travel in a vehicle (e.g., "proceeding towards") with a duration of 15 seconds or longer. The data structure 1350 may be of any suitable type, for example as described in connection with data structure 350 herein above.

The data structure 1350 may include elements pertaining to a trip and passenger or a group of passengers. A processor of a client device or server may set certain elements, for example, for each passenger or a group of passengers, the passenger ID 1352 tied to the respective profile data 700 (which may include preference criteria 750), trip ID 1354 tied to the respective trip data 600, and initial location name included in the initial location tags 1360 and a terminal location name included in the terminal location tags 1326, based on a trip request by the passenger(s) (e.g., from a ride hailing application). Other elements may be populated automatically by a server. For example, a remote trip configuration and tracking server may assign a unique trip ID 1352 for the dataset 1350, select one or more intermediate location names and locations if any, based on route information from the trip provided by a navigation server.

The trip configuration and tracking server and/or the navigation server may plan the route based on road and traffic information applicable to routes between the initial location (pick up) and terminal location (drop off), which can change along the route as known in the art. In addition, the trip configuration and tracking server may include affinity, preference, passenger requests and other information in route planning. For example, with reference to FIG. 21 (discussed separately below), suppose Passenger A is picked up at his residence in Santa Monica ($x_0$) and traveling to a café in Burbank ($x_z$) sees Santa Monica Beach ($IL_1$) en route the travel via the common conveyance/vehicle 106, and Passenger B is picked up by the common conveyance 106 at 400 W Riverside Dr. ($x_1$) and also traveling to the café in Burbank ($x_z$), where the group of passengers (A and B) are planning to have dinner together. Along the way, there are visible places Santa Monica Beach ($IL_1$), Dog Park $IL_2$, "Bat Bridge" $IL_3$ (a local sightseeing spot where bats often fly at nighttime), and a landmark neon café sign near the café ($IL_4$). The camera(s) of the common conveyance/vehicle 106 may capture image(s) of Santa Monica Beach ($IL_1$), dog park ($IL_2$), bat bridge ($IL_3$), and the neon café sign ($IL_4$). The processor then identifies Santa Monica Beach, the dog park, the bat bridge, and the café sign as the visible places (trip events) and tags them as such in the data structure 1310. The processor may tag other visible places or trip events as intermediate locations along the route. Based on the tagged locations, the trip configuration and tracking server may pick a non-zero integral number 'N' of trip event locations and add their names and location information (e.g., geolocation coordinates or addresses) to the data structure 1350 at elements 1362-1364. To pick the intermediate locations, the server may select from a list of places or trip events by filtering against expressed or implied preferences of the passenger, subject to the constraints that the added travel time should not be more than an allotted time. For example, if the group of passengers A and B has an expressed or implied interest in playing a route-based interactive video game of "I Spy," where players may be awarded game points for spying predefined trip events such as "a person surfing," "a person walking a dog," or "a bat flying," the server may weight a list of local places relevant to such special rewarding events using any available information, calculate a set of routes from Santa Monica to Burbank that pass one or more of the weighted places within the requested time limit, and pick the route having the highest weighted passenger interest. In an alternative, or in addition, the server may calculate a most favorable route using a predictive analytics algorithm trained over a set of travel and interest data. Once picking the most favorable route, the server may populate the relevant elements 1362-1364.

In addition to name and geographic location of any location element 1360-1366, the server may add other semantic tags relating to the locations, for example from a database of tags or other source. Continuing the example of the group of passengers A and B above, the tags may include the names of trip events and descriptions of the trip events that are predefined as part of interactive media contents, for example, "surfing," "waking a dog," "bat flying," "pick up," "drop off," and so forth. In some aspect, the locations or visible places and trip events that may be captured by the camera may be predefined according to a rule-based algorithm, or a predictive analytics algorithm trained over a training set of data, both of which may be modified by a feedback loop of measures of passenger satisfaction and passenger preference criteria. In a similar manner, the server may assign any tag relevant to both the place or trip event and to the passenger preference or affinity data.

The trip event element 1369 defines one or more locations or visible places relevant to each location element 1360-1366. The location or visible place include any object, item, building, structure, landscape, landmark, etc., that can be captured by the camera(s) of the vehicle 106 or identified by the server or a client device to occur or exist with respect to an intermediate location along the route of the trip 500 at a particular time. The "duration until trip event" element 1356 is of special interest to production of interactive media content, which is a forward-looking operation unconcerned with the past. To produce and configure the interactive media content in real time, the server needs to know how much time will pass until the vehicle reaches its final destination or passes an intermediate location for which the server will select one or more interactive media components. Trip events may include, for example, picking up or dropping off a passenger, capturing of locations or visible places and trip events (e.g., which may be rewarded game points) along the route of the travel 500 (e.g., "surfing," "walking a dog," and "bat flying,"), which can then be calculated at any point along the travel route. Duration until other trip events 1356 will change during travel, and may be updated in the data structure 1350 as travel progresses.

Trip events can apply to specific identified places (e.g., "Santa Monica Beach," "400 W Riverside Dr.," "Bat Bridge," etc.) or to a changing set of the locations based on progress of travel. For example, at the beginning of the trip, the server may calculate a "surfing" for Intermediate Location 1 ($IL_1$) 1362, "walking a dog" for Intermediate Location 2 ($IL_2$) (not shown in FIG. 13B), and "pick up" for Intermediate Location 3 ($X_1$) for the remaining destination and add each duration to the data structure. The server may refresh the duration element 1356 during travel, periodically and/or in response to events. For example, once the vehicle has departed Intermediate Location 1, the server may calculate the "pick up" for the next pick up location (e.g., Xn, not shown), or "walking a dog" near 400 W Riverside Dr., and recalculate the "arrive at" duration for the remaining destinations. In between triggering events such as departures from an intermediate location, the server may update the "duration until" element periodically, for example, every 5 or 10 seconds. In addition, the server may change, add, or remove intermediate locations and add or remove semantic tags associated with each location or visible place, as the trip progresses based on passenger input, biometric data, traffic data, invitation and/or addition of additional passengers to join the common conveyance, and any other new available information. Thus, the data structure 1350 can be updated and support dynamic configuring, assembling and producing of the interactive media content during travel 500.

Figure 13C:
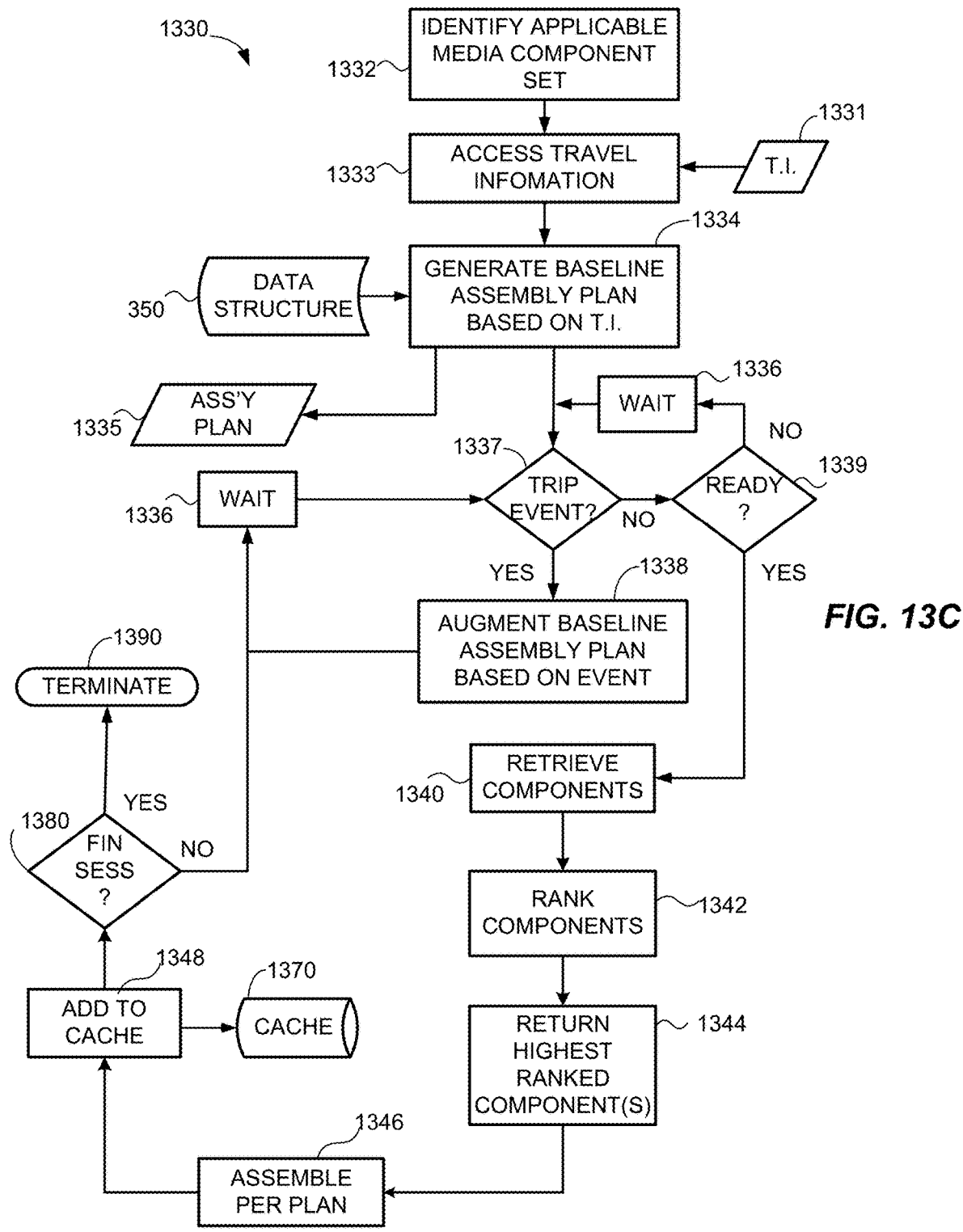
FIG. 13C is a flow chart illustrating aspects of assembling by one or more processors interactive media content from a set of media components based on trip information.

Based on the information as described in connection with data structures 350 600, 700, 750, and/or 1350, a server may assemble interactive media content for use during a trip. For example, FIG. 13C shows a method 1330 for assembling by one or more processors interactive media content from a set of media components based on travel event information. At 1332, the processor may identify an applicable media component set for a common conveyance based on geographic and personal affinities of the passenger or a passenger group.

For example, based on one or more records (e.g., in the passenger profiles) stating the passenger prefers to play interactive route-based "I Spy" game, lives in Santa Monica, and loves surfing and animal-related contents, the server may filter out identifiers for non-pertinent content components from its library of all available content components. At 1333, the server may access travel information 1331, for example by identifying a trip ID and passenger ID for locating pertinent travel information in a data structure 1310. At 1334, the server may generate a baseline (e.g., initial) assembly plan based on the travel information 1331, which may be contained in the data structure 1350. The server may generate the plan based on the trip origin, destination, preferred trip events (e.g., subject to game rewards), and other criteria as described elsewhere herein. The plan 1335 may include a sequence of interactive media segments with or without other media components, arranged in a list or other useful data structure.

At 1337, the server may determine that a new trip event defined in the data structure 1350 has been detected by the processor, for example by tracking progress of the vehicle along its route. If the trip event is detected, the server may update the assembly plan 1335 based on the trip event. Trip event may include a passenger input (e.g., biometric data 620) via sensors 328, 402, 4102, 4202, etc., or via U/I 324.

Although not shown in FIG. 13C, the augmentation process 1338 may use the most recent copies of the data structures 350, 1350 available. For example if an intermediate location or visible place aspect of the existing trip data is deleted or changed as a result of the new trip data or trip event, the server may remove components picked for a deleted location or visible place, add components picked for the new location or visible place, and if a preference data is deleted or changed via passenger input, the server may remove components picked for a deleted preference, add components picked for the new preference; the server may then adjust components based on changes in estimated durations. At 1336, the server may wait for the next trip event to occur. If at any time or times while waiting 1336 the server determines, at 1339 that it is ready to assemble and produce the interactive media content for presentation in the vehicle under travel, at 1340 it may retrieve the media components for assembly, rank components for relevance at 1342, and return highest ranked component(s) at 1344. The processor may rank components using the interactive media content algorithm discussed above and herein. Then at 1346 the server may assemble the components into the interactive media content or portion of the media content, for example by arranging media segments in a sequence and/or rendering a media component to produce a media segment.

At 1348, the server may add the assembled components to a cache 1370 for delivery to the vehicle under travel. Content in the cache may be streamed or delivered in periodic packages to an interactive media player in the vehicle, and thus, produced for consumption in real time. Once delivered, the server may delete delivered content from the cache 1370, immediately after delivery, immediately after the trip is completed, or at some later time. At 1380, the server may determine whether the production session is completed, for example in response to termination of the trip or termination of the session by the passenger(s). Once finished, the server may terminate 1390 the session.

Figure 14:
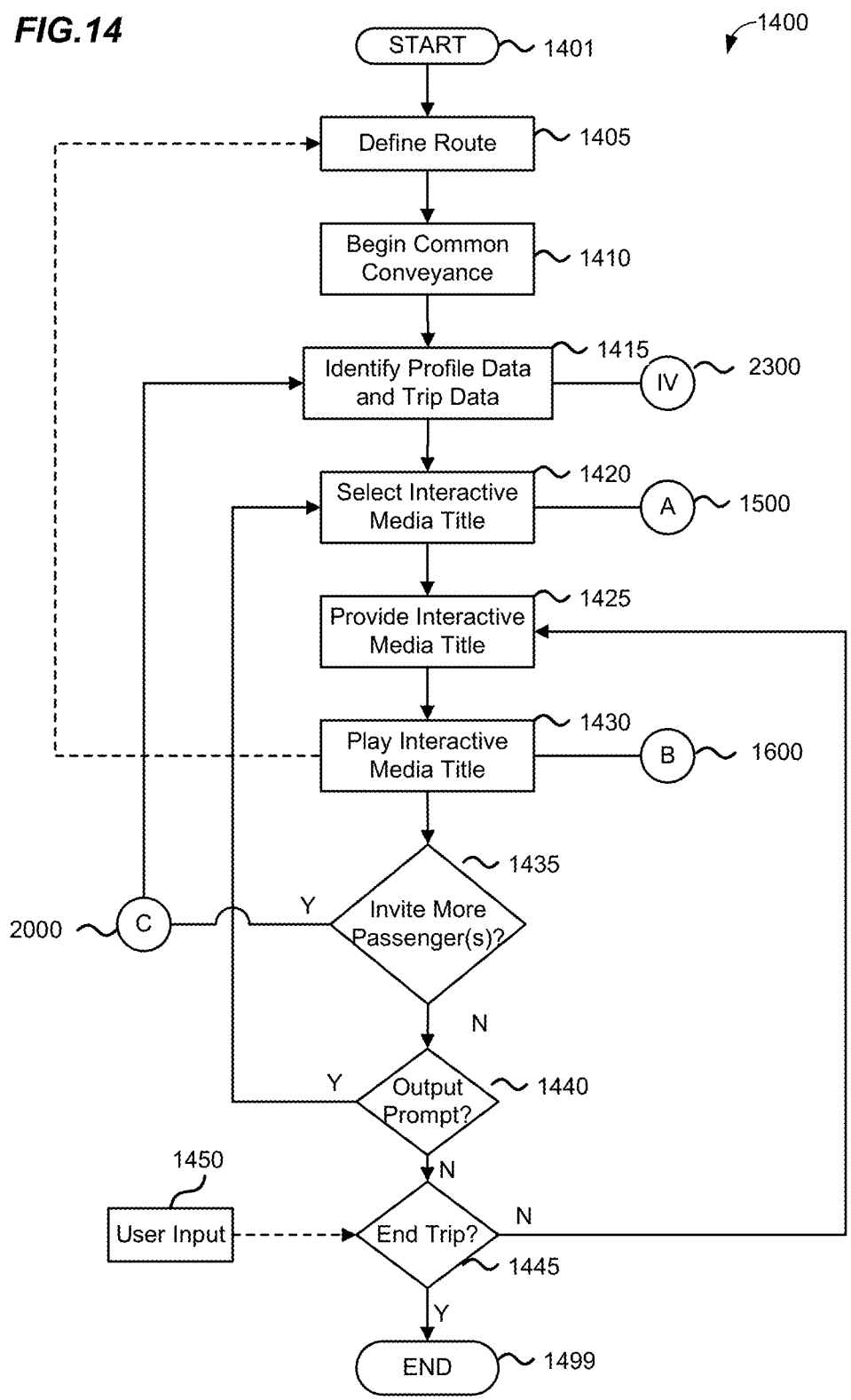
FIG. 14 is a is a flow chart illustrating further aspects of configuring interactive media customized for passengers temporarily sharing a common conveyance based on profile data and trip data.

Referring to FIG. 14, further aspects of the methods 900 are shown, for configuring interactive media customized for passengers temporarily sharing a common conveyance based on profile data 700 (or 1010) and trip data 600 (or 1015), as described in connection with data structure 350 and data structure 1350. The configuring method starts at 1401 when a first passenger (passenger A) in the group of passengers 330 requests a trip in the common conveyance 106 by hailing the ride in a manner, for example, as discussed with reference to FIG. 9 above. At 1405, the trip configuration and tracking server and/or the navigation server may define the route for picking up the passenger A at the location ($x_0$; FIGS. 5 and 6) designated by passenger A, and at 1410, begins the travel of the common conveyance by moving to the location $x_0$ according to the defined route.

At the identifying process 1415, one or more processors performing the method 1400 receive signals indicating passenger profile data 700 (including passenger preferences criteria) and the trip data 600 of passenger A (and of subsequent passengers B . . . n, as will be discussed below), in the manners as previously discussed with respect to process 920 in FIG. 9. In some aspect, the identifying process further includes identifying a special travel version of a video game and other processes associated therewith, as further described with respect to the process IV (2300) in FIG. 23 below.

At the process 1420, the method may include producing interactive media title for the passengers as a group by at least one of selecting or configuring the interactive media content components from the interactive media content database, in the manners as previously discussed with respect to process 930 in FIG. 9. In an aspect, the production of the interactive media title by the processor includes configuring parameters of the interactive media title based at least in part on the profile data and the trip data and may include other processes, as further described with respect to the process A (1500) in FIG. 15 below.

At the process 1425, the one or more processors deliver the produced interactive media title selected or configured at the process 1420 to the passenger(s) of the common conveyance, e.g., to the one or more interactive media player devices such as the interactive media content consumption apparatus 300, including but not limited to the virtual display devices 400, 4100, and 4200, and any or all of the components thereof.

At the process 1430, the at least one interactive media player plays the interactive media in the common conveyance enabled for interaction with the passengers during the period, in a manner as described with respect to process 950 in FIG. 9 above. In an aspect, the playing of the interactive media title includes one or more different route-based interactive games, as further described with reference to the process B (1600) in FIGS. 16-19 below. In an aspect, the one or more processors define the route for the common conveyance based at least in part on the interactive media title that is played. As a result, in some embodiment, the method 1400 returns to the process 1405.

At the process 1435, the one or more processors may invite one or more passengers B . . . n into the common conveyance prior to, upon, or subsequent to, the playing of the selected interactive media title. In an aspect, the one or more processors perform a group curating function at the process 1435. For example, in some implementation, the invitation of the additional passenger(s) B . . . n is automatically initiated by the processor, based on a common interest in the interactive media title or other trip event activity planned or ongoing in the common conveyance 106. For example, the additional passenger(s) may be selected based at least on one or more account identifiers for passengers identified in the database of profile data 700, and the one or more respective data elements corresponding to the identified passengers, including past preference data, present preference data, trip purpose, and preference criteria 750 for the identified passengers as previously discussed with respect to FIG. 7B, such as the timing of the preferred pick-up and drop-off times of the passengers. In an aspect, the one or more processors may deliver the invitation to the additional passenger(s) via text message, email, voice or other messaging means available to the additional passengers. In some other implementation, the invitation is initiated by a user input by the one or more passengers already sharing the common conveyance 106, for example, by requesting that specific additional passenger(s) to the shared common conveyance 106 be added, e.g., by using the hailing app, or via the user interface devices 324 of the content consumption apparatus (client device) or interactive media player 300.

In some implementations, sharing a common conveyance can earn exclusive interactive media content, such that the prospective passengers who may be friends with each other, or who may be strangers, are incentivized to share the common conveyance.

In an aspect, the passenger profile data 1010 includes tags, metadata, or other information about fellow passengers with account identifiers in the database of profile data 700 who are "friends." "Friends" may include friends, colleagues, acquaintances, family members, or anyone whom the passenger designates as a "friend." For example, Passenger A and Passenger B may be friends or a couple, and they may designate each other as a "friend" in their respective profile data 1010.

In some aspect, the group curating function at the process 1435 may serve as an icebreaker or as social introducer, in case passengers who are strangers or otherwise not designated as "friends" are invited to join the common conveyance.

In some implementation, the group curating function at the process 1435 may extend beyond a single vehicle 106, such that a fleet of vehicles 101 may be culled to provide the same selected interactive media content for large common interest groups or friends, such that the number of passengers in the group 330 is not necessarily limited by the passenger capacity of any given vehicle.

In some implementation, the group curating function at the process 1435 may be turned off or turned down (i.e., some of the preference criteria may be weighted less or disregarded entirely), such that the passengers sharing the common conveyance may enjoy more serendipitous experience. In some aspect, the interactive media title selected may also be surprise- or horror-themed.

In some implementation, at the process 1435, the one or more processors pick a companion for the passenger A to share the common conveyance, from several passengers identified in the database of profile data 700. For example, in some aspect, the processor picks the companion based on shared affinities and geographic factors. The picking of the companion may be useful for passengers looking for matchmaking or dating as part of the sharing of the common conveyance. In some implementation, the one or more processors may, given a time and monetary budget designated by the (prospective) passengers for the trip in the common conveyance, pick a destination (terminal location) or one or more intermediate locations of the common conveyance that are not identified or designated by the passengers, such that the passengers sharing the common conveyance are surprised and equally not in control of the trip.

Further details of the invitation process 1435 will be described with respect to the process C (2000) in FIG. 20 below.

At the process 1440, the one or more processors output a prompt to the passengers sharing the common conveyance whether to select different or additional interactive media title for play. If the response is yes, the processors proceed to process 1420. If the response is no, the method proceeds to process 1445. At the process 1445, the one or more processors may determine whether the trip in the common conveyance is ended, e.g., when the terminal location is reached. If no, the one or more processors proceed to process 1425. In yes, then the configuration method 1400 is ended at the process 1499. In some aspect, at the process 1445, the processors may determine that the trip (for one or more specific passengers in the passenger group) is ended when "ghosting" or "passenger transfer" is detected. For example, one or more passengers sharing the common conveyance may be allowed or required to be transferred in or out of the vehicle based on one or more parameters of the interactive media title. For instance, if the interactive media title is a video game such as a role playing game, and passenger A in the passenger group playing the interactive role playing game performs badly in the game such that the player character controlled by passenger A loses all hit points, the passenger A may be asked or required by the processors to leave the common conveyance.

In some examples, at process 1450, the one or more processors may receive user input from one or more passengers to end the trip in the common conveyance. For example, in some embodiment, when two passengers are sharing the common conveyance on a date, and if either or both passengers indicate via user interface device 324 or the hailing/ridesharing app that he or she wishes to terminate the trip ("date is not going well"), then the one or more processors may ghost the other passenger, i.e., ask or require the other passenger to leave the common conveyance. The purpose of the trip for effecting the ghosting is not necessarily limited to matchmaking or dating, and any and all other purpose of the trip, or no particular purpose of the trip, may be selected or identified as part of the shared common conveyance.

Figure 15:
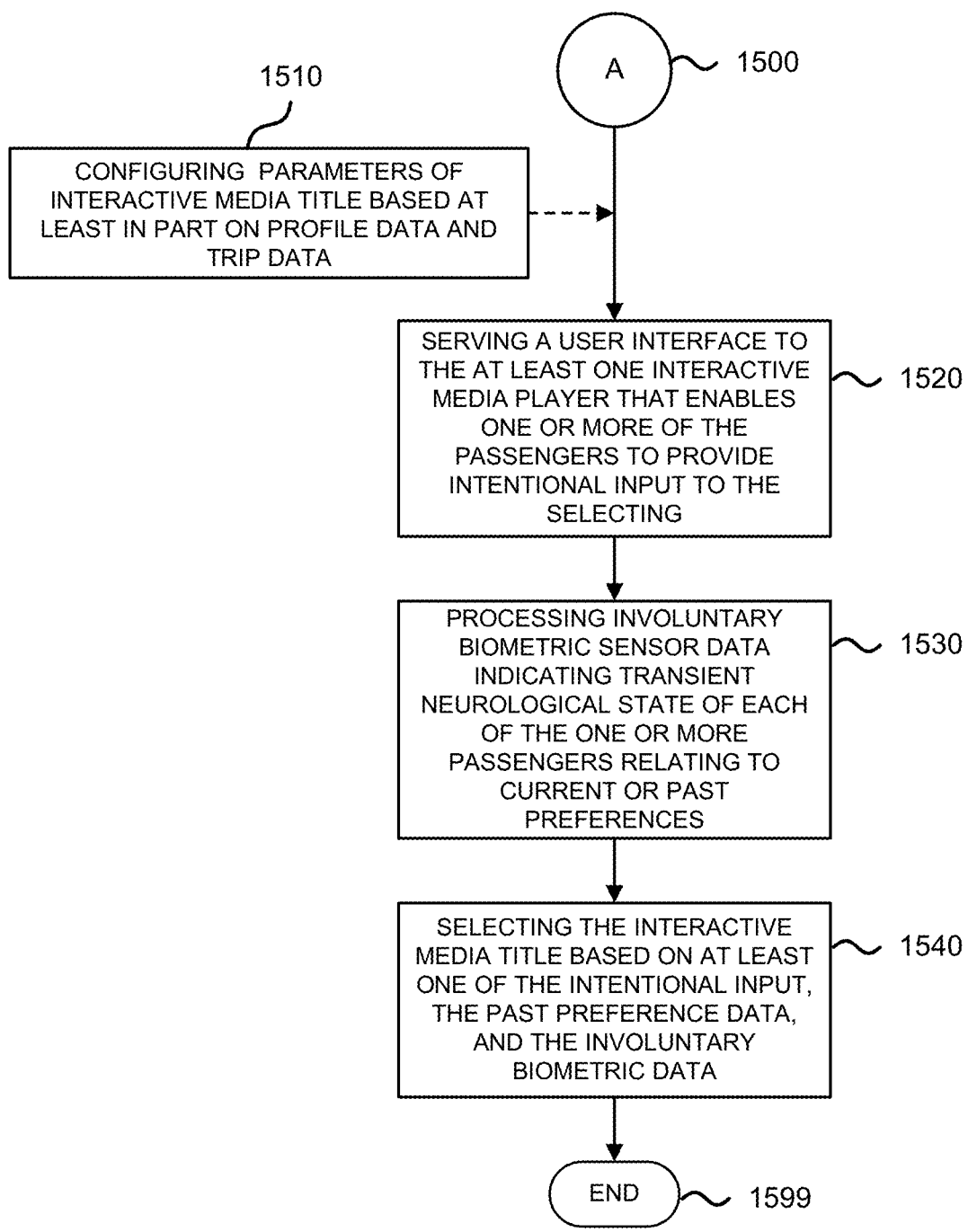
FIG. 15 is a flow chart showing an algorithm for selecting an interactive media title based on profile data and trip data.

Referring to FIG. 15, the one or more processors proceed to the process A at 1500. At the process 1510, the one or more processors may configure the parameters of the interactive media title based at least in part on the profile data and the trip data of the passengers sharing the common conveyance. For example, if the one or more processors identify the passengers as artists heading to an art production studio, the one or more processors activate a set of collaborative drawing functions as part of the selected interactive media title (e.g., "collaborative drawing application"). At the process 1520, the one or more processors may serve a user interface to the at least one interactive media player in the common conveyance that enables one or more passengers to provide intentional input to the selecting. For example, the one or more processors may turn on the touch panel feature of the virtual display device (touchscreen) 400 in the vehicle 106, such that the passengers may use the screen 412 to provide intentional input for selecting a desired interactive media title.

At the process 1530, the one or more processors may process involuntary biometric sensor data indicating transient neurological state of each of the one or more passengers relating to current or past preferences. For example, Passengers A and B, whose preference data indicates that they both like Harry Potter movies, but who both have previously viewed an interactive movie file corresponding to the film, "Harry Potter and the Sorcerer's Stone," may express boredom when a choice to play the same interactive movie file is presented to the passengers by the processors, such as a facial expression of boredom or a hand gesture of denial ("waiving off") that may be detected by the biometric sensors (e.g., 328, 402, 4102, or 4202).

At the process 1540, the one or more processors may select the interactive media title based on at least one of the intentional input, the past preference data, and the involuntary biometric data. For example, suppose Passengers A and B have already seen the movie, "Happy Potter and the Sorcerer's Stone," as indicated by the past preference data of the respective passengers. Suppose further that passengers A and B have not seen the sequel to the movie, and they would be interested in viewing a trailer or teaser for the sequel. In such example, the one or more processors may select the trailer or teaser of the sequel for playing to the passengers A and B.

Thereafter, the process A terminates at 1599.

Figure 16:
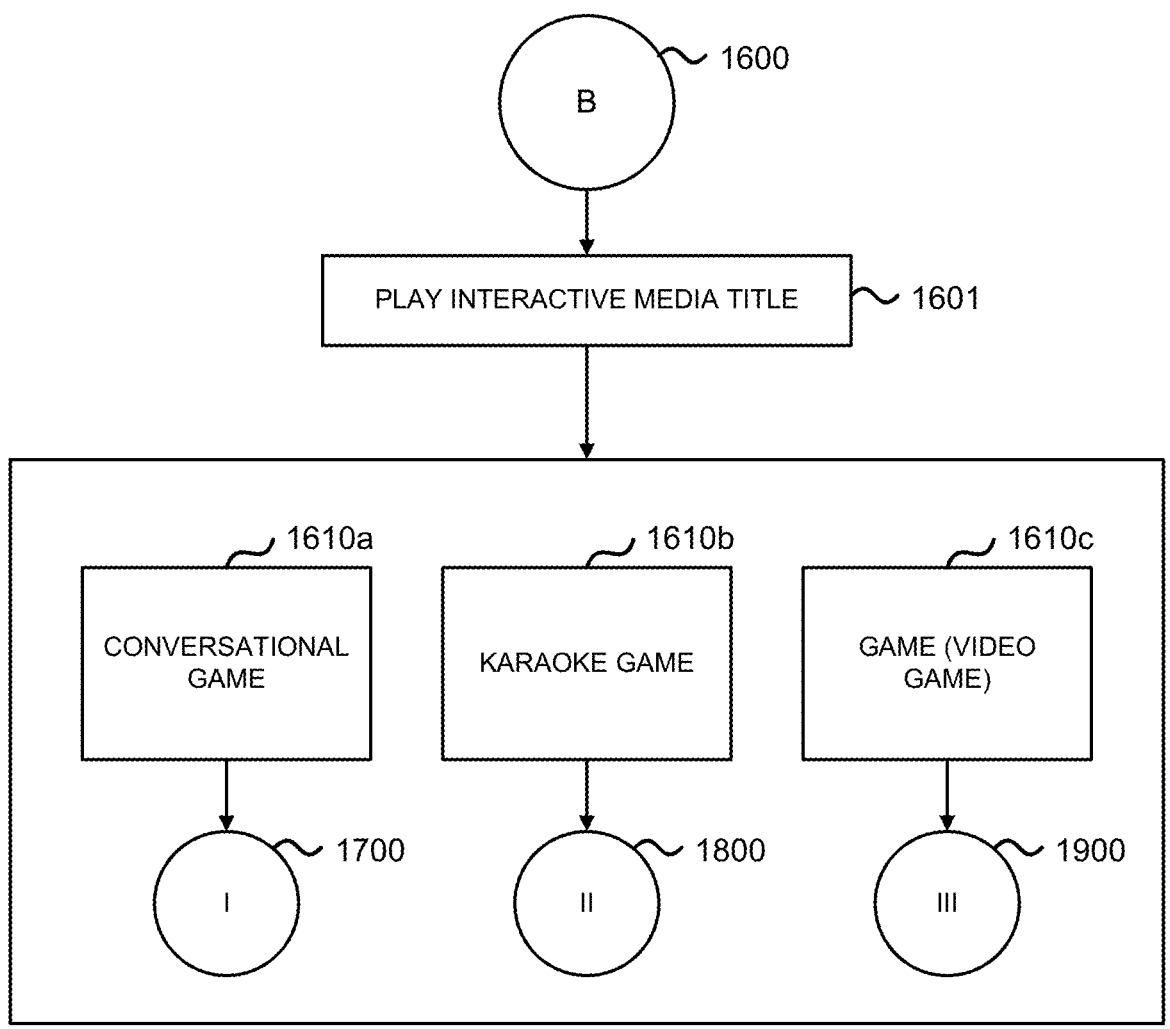
FIG. 16 is a flow chart illustrating high-level aspects of playing an interactive media title according to one or more embodiments.

Referring to FIG. 16, the one or more processors proceed to the process B at 1600. At the process 1601, the one or more processors play the interactive media title that has been selected (1420) and provided (1425). In some implementations, the interactive media title played at the process 1601 is a conversational game 1610*a*, a karaoke game 1610*b*, or another game (e.g., video game) 1610*c*, or a combination thereof. As described elsewhere herein, the one or more processors may select topics, questions and statements in a conversational game that relate to locations along the route or otherwise related to the trip. Likewise, in a karaoke game or video game the one or more processors may select or suggest songs, games, characters or game environments related to the trip, or modulate scoring depending on trip-related factors. More details follow.

Figure 17:
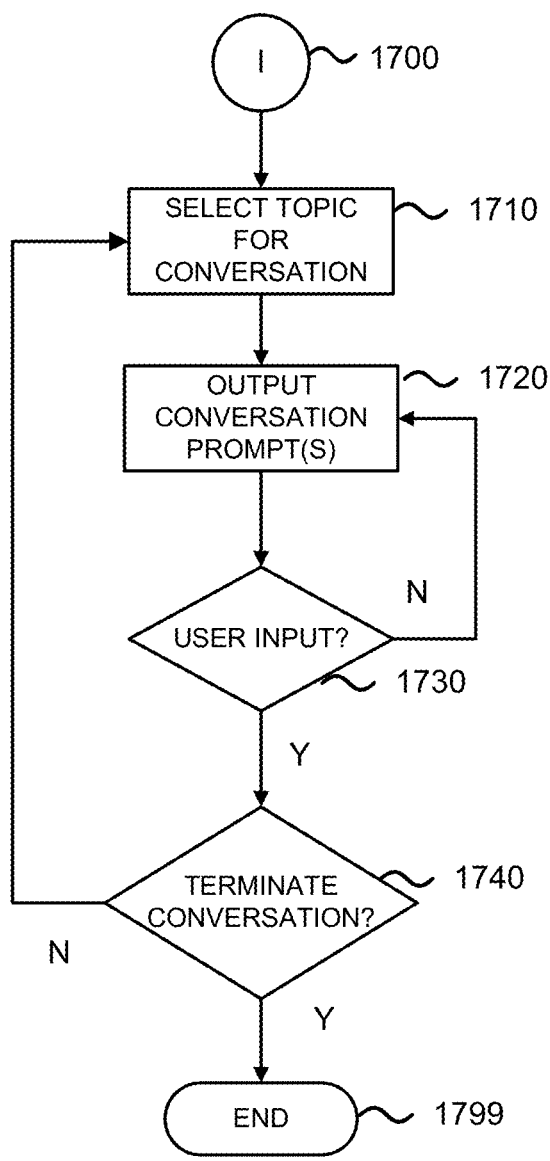
FIG. 17 is a flow chart showing an algorithm for playing a conversational game according to one or more embodiments.

FIG. 17 is a flow chart showing an algorithm for playing a conversational game 1610*a* according to one or more embodiments. The conversational game 1610*a* starts at the process I (1700). The one or more processors select a topic for conversation at 1710. For example, the one or more processors may select the topic, "Woolsey Fire" that has started on Nov. 8, 2018, based on the trip information for the example of the Passenger A traveling from Santa Monica to Burbank (e.g., on Nov. 9, 2018), and the local weather (air quality index) and safety/evacuation/traffic alert.

At the process 1720, the one or more processors output a conversation prompt to the Passenger A. For example, the one or more processors may audio-visual prompt via speaker 316 and display 320, "A person C in Malibu is shut-in due to the Woolsey Fire. Would you like to deliver emergency food supply located in the trunk to her?"

At the process 1730, the one or more processors detects user input in response to the output conversation prompt. If the user input that the processor detects is "No," or if no user input is detected, the processors proceed to process 1720 to output another conversation prompt. If the user input that the processor detects is "Yes," the method 1700 proceeds to process 1740. At the process 1740, the one or more processors determine whether the conversational game is terminated. For instance, in an aspect, upon arriving at the residence of the person in Malibu that is shut-in, the one or more processors determine that the conversational game is terminated, and proceeds to the end of the process 1799. If the one or more processors determine that the conversational game is not terminated, then the method 1700 proceeds to the process 1710. For example, the one or more processors may continue on the topic of the Woolsey Fire at the process 1710, and at the process 1720, output another audio-visual prompt, "A person D in Sherman Oaks is shut-in due to the Woolsey Fire. Would you like to deliver emergency food supply located in the trunk to her?" Of course, other conversation topics of various nature, and other conversation prompts as may be appreciated by the persons skilled in the art, may be contemplated here.

Figure 18:
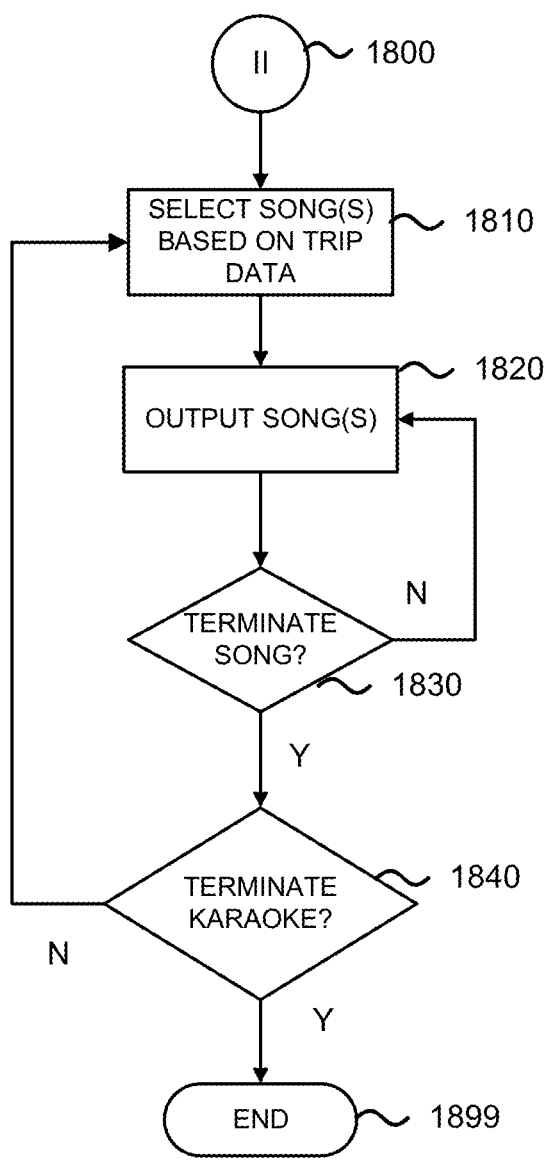
FIG. 18 is a flow chart showing an algorithm for playing a karaoke game according to one or more embodiments.

FIG. 18 is a flow chart showing an algorithm for playing a karaoke game according to one or more embodiments. The karaoke game 1608*b* starts at the process II (1800). The one or more processors select one or more songs as karaoke in the common conveyance 106, based on the trip data received. For instance, in an example of the Passenger A above passing Santa Monica Beach at IL$_1$ (FIGS. 6, 21) along the route of the travel 500 traveled by the common conveyance, Santa Monica Beach is visible to the passenger, according to the trip data. The one or more processors thus select the song, "Surfin' USA" by the Beach Boys for the karaoke play, and proceeds to output the song at 1820. Next, the one or more processors output a prompt to the passengers, or a selectable menu, via the virtual display device 400, "Terminate Song?" or the like at the process 1830. If the one or more processors detect a response of "Yes" (e.g., such response may be detected via audio input, text input, gesture input, touch input, mouse click, icon/menu touching, or another user interface input appreciated by a person skilled in the art), the process 1800 proceeds to the process 1840. Otherwise, if a response of "No" or no response is detected, the process 1800 loops back to the process 1820. At the process 1840, the one or more processors output a prompt to the passengers, or a selectable menu, via the virtual display device 400, "Terminate Karaoke Game?" or the like. If the one or more processors detect a response of "Yes" in a manner similar to the process 1830, the process 1800 ends at 1899. Otherwise, the process 1800 loops back to the process 1810.

Figure 19:
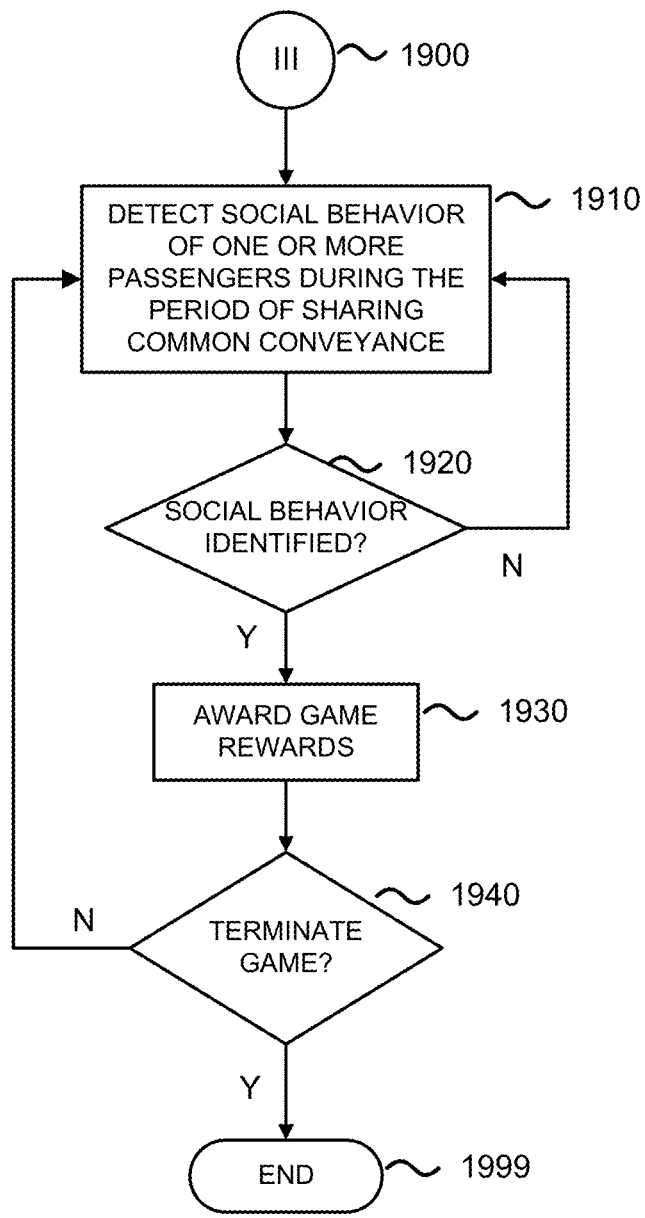
FIG. 19 is a flow chart showing an algorithm for playing a game such as a social game, a video game, or other games, according to one or more embodiments.

FIG. 19 is a flow chart showing an algorithm for playing a game 1608*c* such as a social game, a video game, or other games, according to one or more embodiments. The game 1608*c* starts at the process III (1900). For example, in an embodiment, the game 1608*c* is a game of social behavior. At the process 1910, the one or more processors detect social behavior of one or more passengers during the period of sharing common conveyance. For instance, in the example of the Passenger A delivering emergency food supply to a person C in Malibu, the one or more processors detect that the passenger A is involved in a social behavior, and at the process 1920, the processors identify that the passenger A is delivering during the period of sharing the common conveyance. Other identifiable social behaviors include ride-sharing, contributing, teaching, or encouraging. If no social behavior is identified at 1920, then the process 1900 reverts to the process 1910. If the social behavior is identified at 1920, then the one or more processors award game rewards to the passenger at 1930. For example, game rewards may be game points such as scores, a character hit points, character attribute points, game items, game features (bonus play, etc.), or any other game rewards that may be appreciated by a person skilled in the art. The one or more processors query the passenger(s), whether to terminate the game at 1940 and ends the game at 1999 if the response is detected as affirmative (as described above with respect to the karaoke game). If the detected response is negative or no response is detected, the process 1900 continues to the process 1910.

Figure 20:
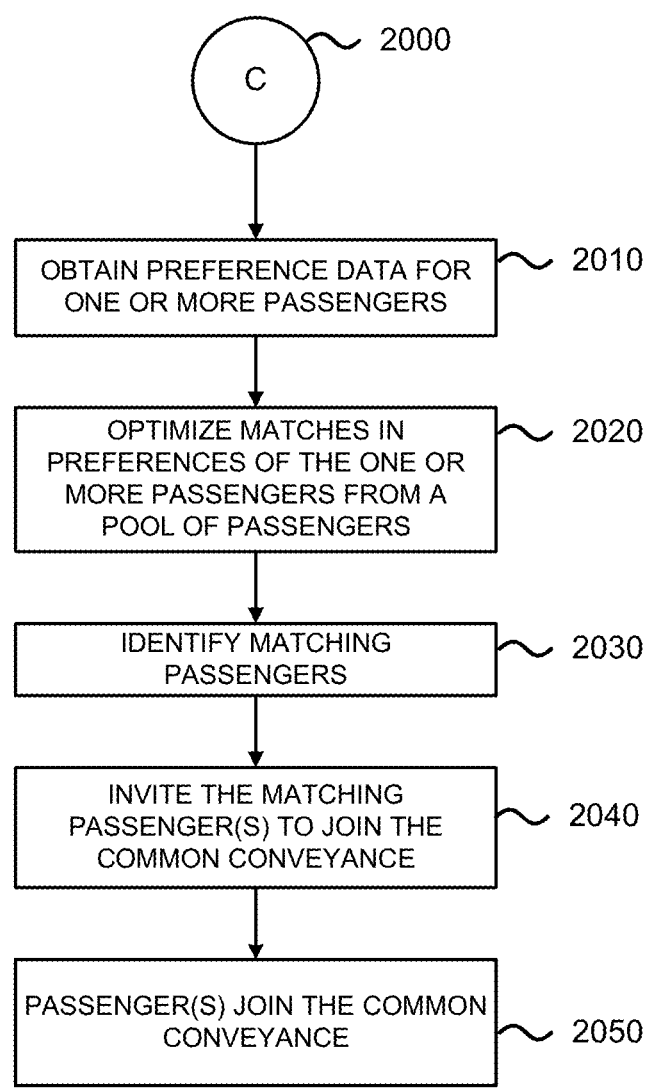
FIG. 20 is a flow chart showing an algorithm for inviting more passenger(s) to the common conveyance according to one or more embodiments.

FIG. 20 is a flow chart showing an algorithm for inviting more passenger(s) to the common conveyance according to one or more embodiments. The invitation process C begins at 2000. At 2010, the one or more processors obtain preference data for one or more passengers from the database of profile data 700 for the passengers in a manner described with respect to the process 1435 above. At 2020, the one or more processors optimize matches in preferences of the one or more passengers from a pool of passengers. In an aspect, the one or more processors may a rule-based algorithm, a predictive analytics (AI) algorithm (interactive media content AI), or a combination of both, to optimize the matches. For example, suppose Passenger A requesting a common conveyance from Santa Monica to Burbank likes to play karaoke game, likes the Beach Boys, and also likes to play a social behavior rewarding game. Similarly, Passenger D requesting a common conveyance from Downtown Los Angeles to Burbank likes to play karaoke game and likes the Beach Boys, but does not like to play social behavior rewarding game. Passenger E requesting a common conveyance from Santa Monica to Sherman Oaks likes to play a social behavior rewarding game. The preferred trip times for all the passengers coincide. At the process 2030, the method 2000 may optimize the matches, and as a result, identifies Passenger E as the matching passenger. In this example, the one or more processors gave more weight to the geographic factors (Santa Monica vs. Downtown Los Angeles) and shared affinities (social behavior). At the process 2040, the one or more processors invite the matching passenger E to join the common conveyance taken by Passenger A. At 2050, passenger E joins the common conveyance, for example, by affirmatively responding to the invitation from the processor.

Figure 21:
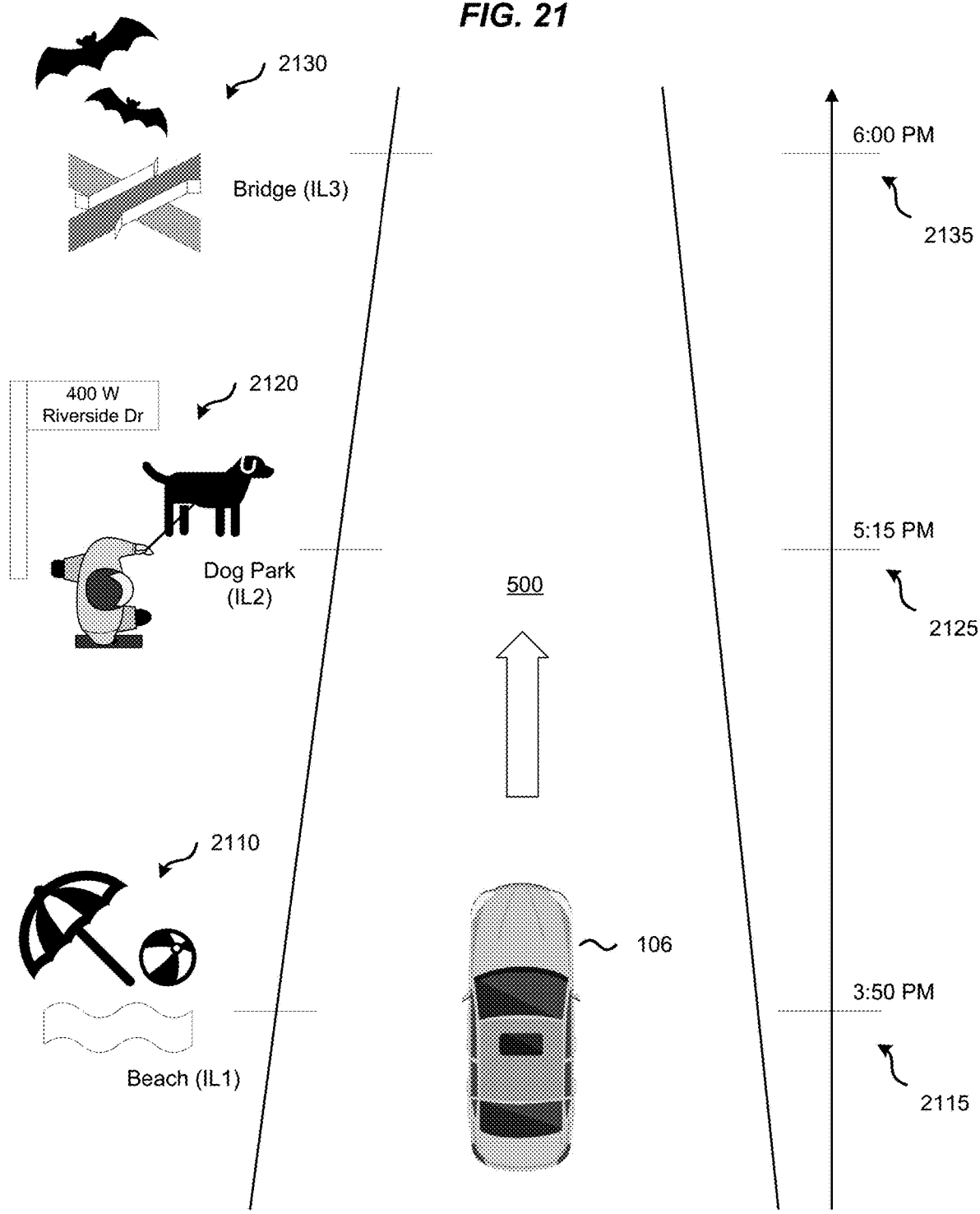
FIG. 21 is a concept diagram illustrating a map of example intermediate location(s) or places within sight from the common conveyance or visible to the passengers along a route traveled by the common conveyance, and times at which the common conveyance passes said places, according to one or more embodiments, or alternatively, example virtual driving games that may be experienced by a passenger traveling in a vehicle according to one or more embodiments.

FIG. 21 is a concept diagram illustrating a map of example intermediate location(s) or places (e.g., 2110, 2120, 2130) within sight from the common conveyance or visible to the passengers along a route 500 traveled by the common conveyance 106, and times (e.g., 2115, 2125, and 2135) at which the common conveyance passes or estimated to pass said places, according to one or more embodiments. Alternatively, FIG. 21 illustrates example virtual driving games that may be experienced by a passenger traveling in a vehicle according to one or more embodiments. For instance, following the example above of the Passenger A traveling from Santa Monica to Burbank for a dinner meeting with Passenger B in Burbank, picking up Passenger B along the way at 400 W Riverside Dr ($x_1$; FIGS. 5, 6), 2110 is Santa Monica Beach, which is visible to Passenger A. Passenger A is picked up at the initial location $x_0$ (FIGS. 5, 6) at 3:45 pm. The common conveyance transporting Passenger A is estimated to pass Santa Monica Beach at 3:50 pm (2115). Passenger B is scheduled for a pick up at $x_1$ at 5:10 pm. At 5:15 pm (2115), the common conveyance is estimated to pass a dog park (2120) near 400 W Riverside Dr. At 6:00 pm (2135), the common conveyance transporting both Passengers A and B is estimated to pass the Bat Bridge (2130). Accordingly, the time data elements may be recorded by the servers in the database of trip data 600 as shown in FIG. 6 for this example trip. Alternatively, in some other embodiments, in an example of a virtual driving game experienced by a single passenger, the vehicle 106 carrying the passenger A may simulate an alternate simulated route 500 of the vehicle traveling on the beach 2110 (Santa Monica Beach), rather than a paved road. For example, in an aspect, the one or more processors may display VR/AR/xR images of the Santa Monica Beach (incl. the sandy beach, the parasol, the ocean wave, and beach ball, etc.) on the virtual display device 400 (or 4100) to simulate the alternate route. In another aspect, the one or more processors may display on the virtual display device 400 an VR/AR/xR avatar image of the Passenger A walking a dog in the dog park 2120, simulating a virtual interaction with objects outside the vehicle. In another aspect, the one or more processors may simulate shooting "funny clothes" on pedestrians projected by the virtual display device 4200 using a virtual ray gun, as another example of virtual interaction with objects outside the vehicle. In some embodiments, virtual interaction with objects outside the vehicle may cause special effects of the outside objects, or game rewards to be awarded to the passenger virtually interacting with the outside objects. In another implementation, the one or more processors via the virtual display device 4100 may display VR/AR/xR avatar image of the Passenger A in the form of a bat, flying over the Bat Bridge, at 2130, providing an alternative viewpoint from the vehicle. In another aspect, the route 500 may include one or more of the locations 2110, 2120, and 2130, based in part on a content preference of Passenger A, for example, Passenger A likes beaches, dogs, and a virtual experience of flying.

Figure 22:
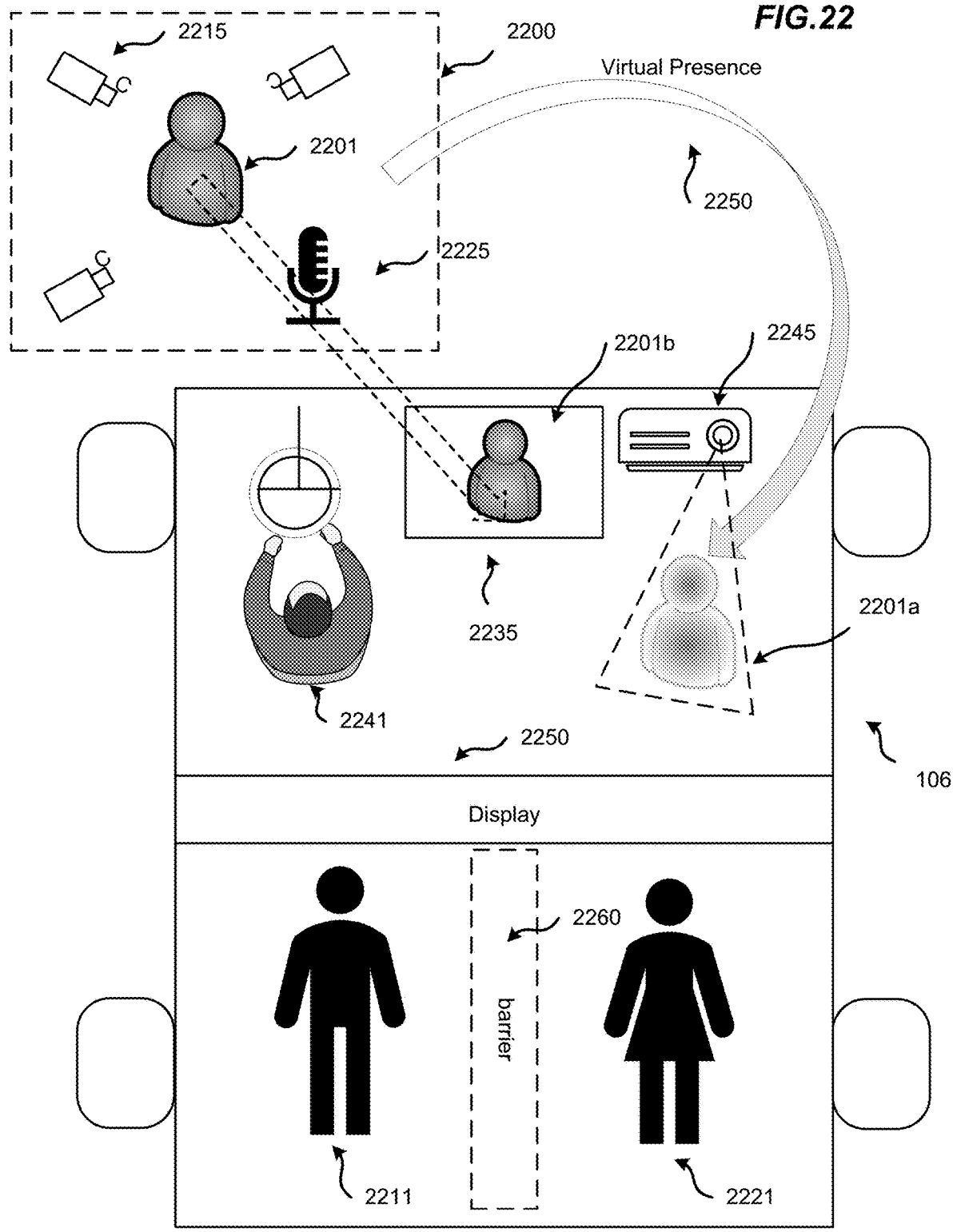
FIG. 22 is a schematic diagram showing features of an apparatus for configuring interactive media customized for one or more passengers in a vehicle or in relation to a vehicular trip, showing example aspects of virtual presence and creative work components of an interactive media title, and an isolation barrier.

FIG. 22 is a schematic diagram showing features of apparatuses for configuring interactive media customized for one or more passengers in a vehicle or in relation to a vehicular trip, showing example aspects of virtual presence and creative work components of an interactive media title, and an isolation barrier. In an aspect, the common conveyance 106 includes a passenger 2211 and another passenger 2221 sharing the common conveyance. In an aspect, the passengers 2211 and 2221 may be isolated from each other by an isolation barrier 2260, which may be a physical barrier that may be activated inside the vehicle 106, or other suitable means of isolation.

In an aspect, the interactive media title in the vehicle 106 may include a virtual presence component 2250 (or 2225). For example, one or more processors may enable a "passenger" 2201 of a mixed reality application 2200 outside the common conveyance 106 to virtually present herself 2201a inside the common vehicle 106, using virtual presence equipment such as virtual presence cameras 2215, microphone 2225, a holoportation device 2245 (e.g., Microsoft Holoportation), and any other suitable virtual presence equipment communicably connectable to the one or more processors and the vehicle 106 (not shown) that may be appreciated by a person skilled in the art. In another aspect, the passenger 2201 may be virtually presented as a passenger 2201b on a virtual display device 2235 in the vehicle 106. While not shown in FIG. 22, it should be appreciated that virtual presence may also work with respect to a passenger inside the vehicle 106 and virtually presenting herself outside the vehicle 106, e.g., inside a different vehicle or another location outside the vehicle 106, using holoportation technology such as the one described above. This way, the one or more processors may extend meeting or get-togethers of the passengers beyond physical confines of a single vehicle 106.

In another aspect, the vehicle 106 includes a display 2250, which includes a creative work component such as a 2D or 3D drawing tablet that enables a collaborative work by one or more passengers in a common workplace displaying the creative work. In some aspect, the common workplace includes displays 2250 in multiple vehicles 106. In some other embodiments, the display 2250 includes a touchscreen interface for editing interactive media titles. For example, editing features may include filters, layers, greenscreening, combining actual screens with IP content (e.g., Warner Bros. screenshots), and the like.

Figure 23:
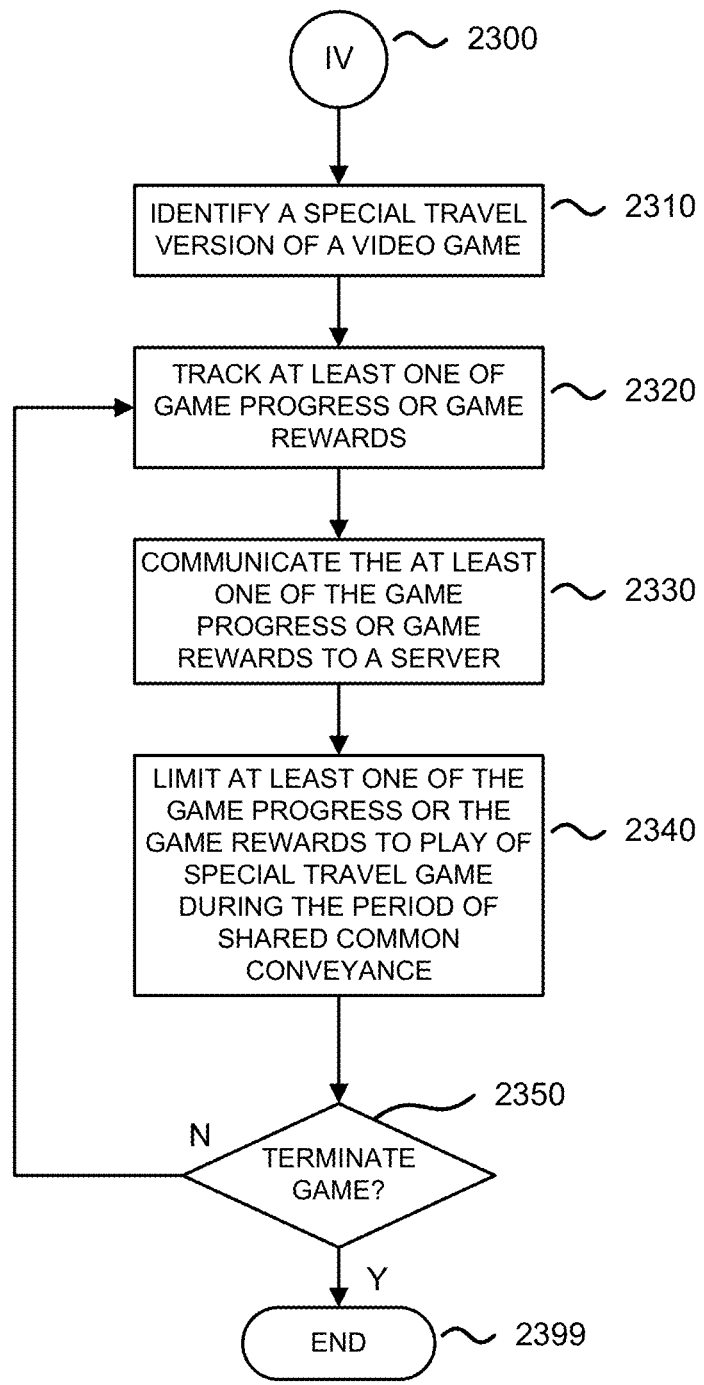
FIG. 23 is a flow chart showing an algorithm for identifying the profile data and trip data according to one or more embodiments related to a special travel version of a video game.

FIG. 23 is a flow chart showing an algorithm 2300 for identifying the profile data and trip data according to one or more embodiments related to a special travel version of a video game. At 2310, the one or more processors identify a special travel version of an interactive media title (e.g., video game). For example, the video game may be an I SPY™ video game (http://www.scholastic.com/ispy/videogames/), and the special travel version may be a version that is customized or modified to include travel route-related game elements, which may involve use of VR/AR/xR technology to incorporate visible places or other elements along the route of the common conveyance in the gameplay. At 2320, the one or more processors track at least one of game progress or game rewards. For example, in the special travel version of the video game, game rewards may be awarded to the passenger(s) for performing or participating in a predefined social behavior, e.g., the delivering example discussed with reference to FIG. 19 above, or in one or more virtual driving games such as the examples discussed with reference to FIG. 21 above. At 2330, the one or more processors communicate the at least one of the game progress or game rewards to the server. For example, once the trip in a common conveyance is terminated at a terminal location, or the drop off location of a particular passenger playing the special travel version of the game, the server receives the passenger's game progress, game rewards awarded, or both, from the one or more processors. In some embodiments, either the game progress or the game rewards or both may be used after termination of the period of shared common conveyance during travel in the vehicle, or in the video game during or after the travel in the vehicle. At 2340, the one or more processors may limit at least one of the game progress or the game rewards for the passenger to the play of the special travel game during the period of shared common conveyance. For example, the special travel version of the I SPY™ game may no longer be played by the passenger once he leaves the shared common conveyance, and/or no game reward may be awarded outside the shared common conveyance. At 2350, the one or more processors may query the passenger whether to terminate the special travel version of the game, and if "yes," the process IV (2300) ends at 2399. If the response is "no," or no response is detected, the one or more processors proceed to process 2320.

Figure 24C:
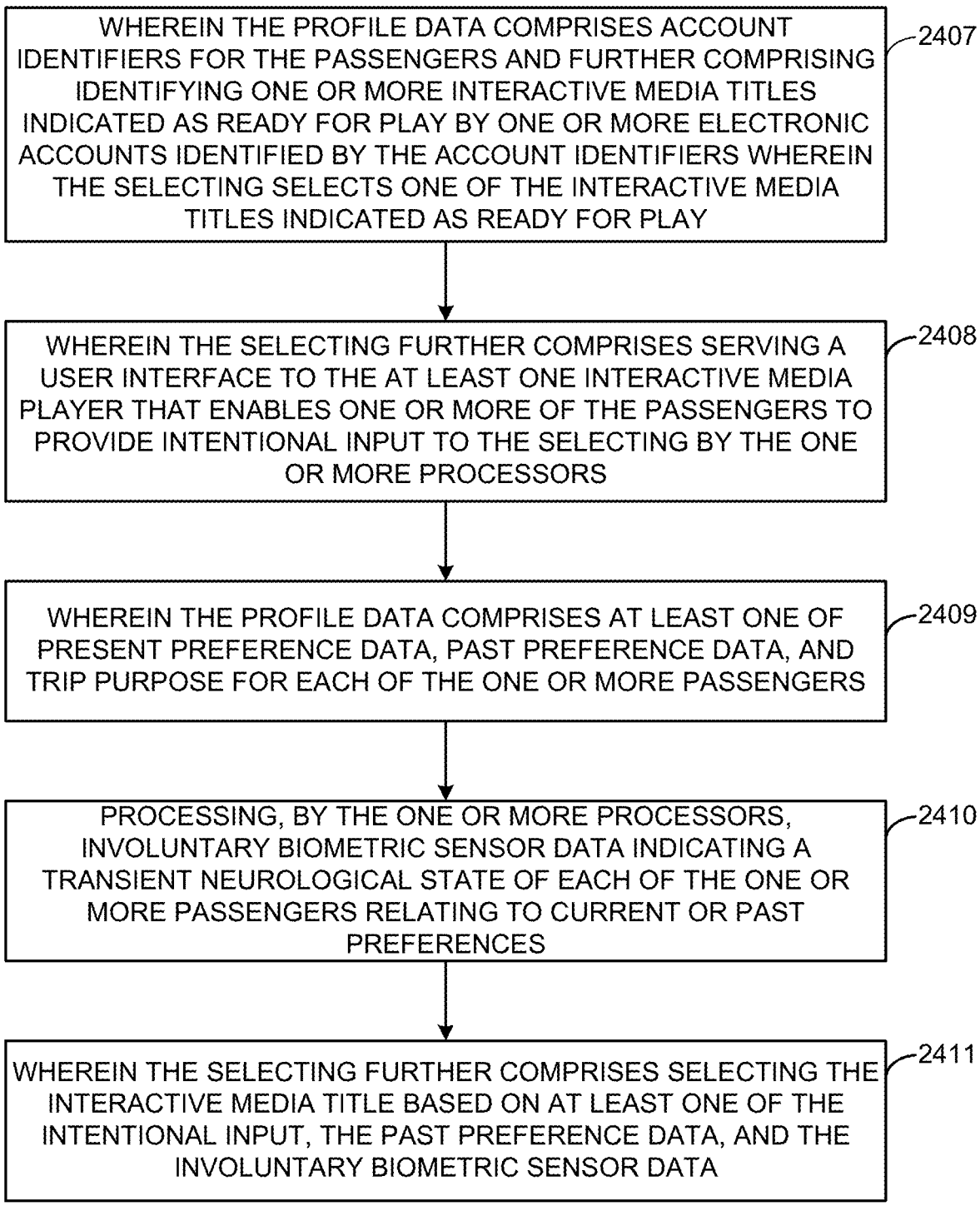

In accordance with the foregoing, FIG. 24A is a flow chart illustrating aspects of a useful automatic method 2400 for configuring interactive media customized for passengers temporarily sharing a common conveyance, for example, based at least in part on profile data and trip data, and FIGS. 24B-24J are flow charts illustrating further optional aspects or operations of the method diagrammed in FIG. 24A. In an aspect of the disclosure, the method 2400 may be performed by one or more processors at a content server or other servers described herein, and may include other details described elsewhere herein.

At 2401, a processor identifies profile data for each of the passengers in or boarding the common conveyance or hailing the common conveyance, and trip data for the common conveyance. For example, in one aspect, the passenger may use her smartphone communicably connected to the vehicle to hail the vehicle using a ridesharing app (e.g., Uber, etc.) to take a trip on the vehicle to a desired destination. As part of hailing the vehicle, profile data such as passenger identity and passenger profile may be collected from the smartphone by one or more processors. The interactive media content may include sensory content provided to a user/passenger/player actor via software or hardware or both during a time spent in a vehicle, such as electronic media content including audio, video and text; virtual or augmented reality (AR/VR) content; vehicle simulation; image projection/projection mapping; surround screen; and the like. For example, interactive media content may refer to interactive digital audio-video content that is arranged at least in part by a script designed to entertain and evoke emotions in viewers according to an emotional arc. For example, the interactive media content may be configured to support interactive features resembling video game features including responding to data indicative of user neurological or neurophysiological states. The passenger profile may include physical location/city, context such as weather, rain or snow, social trends broadly or in their network, attributes of the person such as age, or a location in a franchise venue universe (e.g., DC Universe). In addition, passenger profile may include a reward status, e.g., points earned in the franchise universe set of venues, including retail stores, parks, and events, and subscription status (e.g. Gold level in DC Universe). In an aspect, the destination and timing (trip start time and estimated or actual end time) may be collected as part of hailing the vehicle in the foregoing example.

At 2402, the processor selects an interactive media title for the passengers as a group. For example, the processor assembles and produces interactive media content for delivery to the passengers in the vehicle based on the preference data and geographic location data. In an aspect, the selected or configured interactive media content may refer to at least one place along the travel route as part of a defined narrative, topical assembly, or video game. The interactive media content may include audio video work of, for example entertainment, instructional information, video gaming, advertisement, and social networking. The interactive media content may also include AR/VR content. In an aspect, at least one of the selecting or configuring may include use of a predictive algorithm. For example, the method 2400 may further include, by one or more processors predicting an affinity of a user of the interactive media output device based at least in part on passenger identity, preference criteria and the trip data, using a predictive algorithm, for example, a machine-learning algorithm based on a deep neural network trained on interactive media content relative to affinities of consumers matching the passenger profile. Such an algorithm may include, for example a trained machine learning process or a rules-based algorithm that weights and compares characteristics of passenger profiles to semantic tags in media component metadata.

At 2403, the one or more processors provide the interactive media content configured for output by at least one interactive media player during a period in which the passengers are sharing the common conveyance, for example, by streaming media or by pushing one or more files.

At 2404, the at least one interactive media player plays the interactive media in the common conveyance enabled for interaction with the passengers during the period. In an aspect, a content production server may produce the interactive media content, and a content server may stream the interactive media content. In an aspect, the content production server and the content server may be co-located or may be combined in one server. In another aspect, an interactive content output device may produce the interactive media content. Other logical and physical arrangements as to where the interactive media content is produced are also possible.

FIGS. 24B-24J show additional operations 2405-2433 that may optionally be included in the method 2400 and performed by one or more processors performing the method 2400, in any operative order. Any one or more of the additional operations 2405-2433 may be omitted unless needed by a downstream operation and one or more of the operations 2405-2433 may replace one or more others of the operations of the method 2400. Any useful combination of operations selected from the group consisting of the operations 2405-2433 may be performed by one or more processors of an apparatus as described herein as an independent method distinct from other useful combinations selected from the same group.

Referring to FIG. 24B, at 2405, the one or more processors configure parameters of the interactive media title based at least in part on the profile data and the trip data. For example, for a common conveyance involving a Passenger A with affinity for social behavior (delivery) and pick up location at Santa Monica and termination location at Burbank, the parameters of the interactive media title are configured with higher priority for delivery vs. teaching as a social behavior, and intermediate locations between the pick-up location and the termination location will be given higher priority for configuring the interactive media title.

At 2406, the one or more processors define a route for the common conveyance based at least in part on the interactive media title. For example, if the interactive media title is a karaoke game with songs related to beach themes, the route for the common conveyance may be defined to includes one or more beaches as a visible place or intermediate locations of the route.

Referring to FIG. 24C, at 2407, the one or more processors perform the method 2400 wherein the profile data includes account identifiers for the passengers and the method 2400 further includes one or more processors identifying one or more interactive media titles indicated as ready for play by one or more electronic accounts identified by the account identifiers wherein the selecting selects one of the interactive media titles indicated as ready for play. For example, one or more processors may identify the electronic account (e.g., Uber rideshare) for Passenger A, and the processor selects an interactive media title indicated as ready for play on a Uber rideshare.

At 2408, the one or more processors perform the method 2400 wherein the selecting further includes serving a user interface to the at least one interactive media player that enables one or more of the passengers to provide intentional input to the selecting by the one or more processors. For example, the user interface may be a touchscreen display.

At 2409, the one or more processors perform the method 2400 wherein the profile data includes at least one of present preference data, past preference data, and trip purpose for each of the one or more passengers, for example, as discussed with reference to FIGS. 7A-7B above.

At 2410, the one or more processors process involuntary biometric sensor data indicating a transient neurological state of each of the one or more passengers relating to current or past preferences. For example, the involuntary biometric sensor data may be processed in the manners as described with reference to FIGS. 10-12 above.

At 2411, the one or more processors perform the method 2400 wherein the selecting further includes selecting the interactive media title based on at least one of the intentional input, the past preference data, and the involuntary biometric sensor data.

Figure 24D:
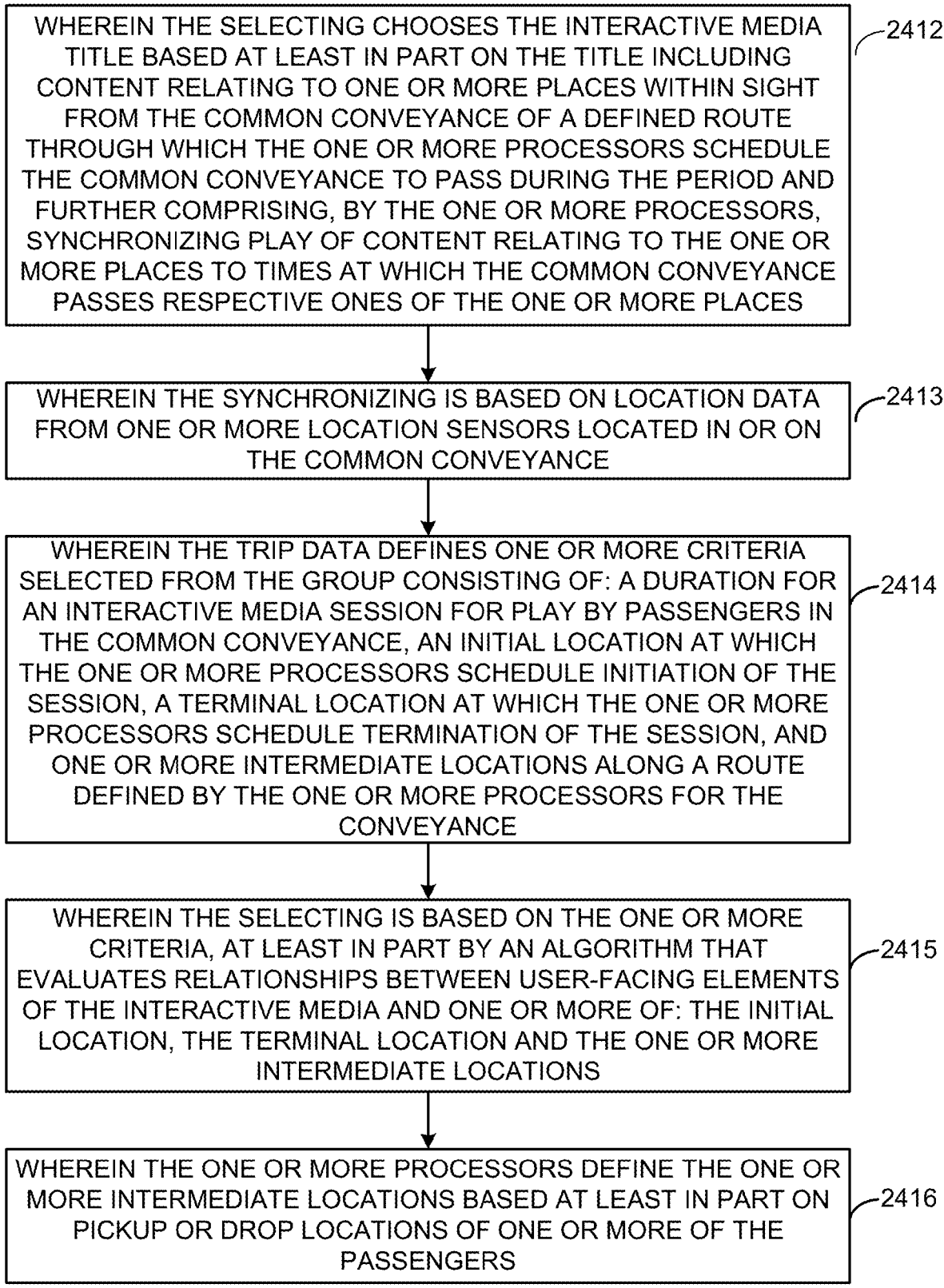

Referring to FIG. 24D, at 2412, the one or more processors perform the method 2400 wherein the selecting chooses the interactive media title based at least in part on the title including content relating to one or more places within sight from the common conveyance of a defined route through which the one or more processors schedule the common conveyance to pass during the period and further may include, by the one or more processors, synchronizing play of content relating to the one or more places to times at which the common conveyance passes respective ones of the one or more places. For example, the processors may choose the interactive media title in accordance with examples discussed with reference to FIG. 21 above.

At 2413, the one or more processors perform the method 2400 wherein the synchronizing is based on location data from one or more location sensors located in or on the common conveyance. Examples of the location sensors are illustrated with reference to FIG. 3B above.

At 2414, the one or more processors perform the method 2400 wherein the trip data defines one or more criteria selected from the group consisting of: a duration for an interactive media session for play by passengers in the common conveyance, an initial location at which the one or more processors schedule initiation of the session, a terminal location at which the one or more processors schedule termination of the session, and one or more intermediate locations along a route defined by the one or more processors for the conveyance. Examples of the criteria defined by the trip data are described with reference to FIGS. 5-6 above.

At 2415, the one or more processors perform the method 2400 wherein the selecting is based on the one or more criteria, at least in part by an algorithm that evaluates relationships between user-facing elements of the interactive media and one or more of: the initial location, the terminal location and the one or more intermediate locations. User-facing elements of the interactive media may include user-perceivable characteristics of the media components that are described with reference to FIG. 13A, for example, tone of a color scheme, mood of a sound track, position in a narrative tree, a duration of a segment, a subject, and identities of one or more characters, objects, items, buildings, landscape, landmark, etc., appearing in or represented by the media component.

At 2416, the one or more processors perform the method 2400 wherein the one or more processors define the one or more intermediate locations based at least in part on pickup or drop locations of one or more of the passengers, for example, in a manner described in connections with the example of Passengers A, D, and E with reference to FIG. 20 above, i.e., intermediate locations between Santa Monica and Sherman Oaks may be defined, but not between Downtown Los Angeles and Burbank.

Figure 24E:
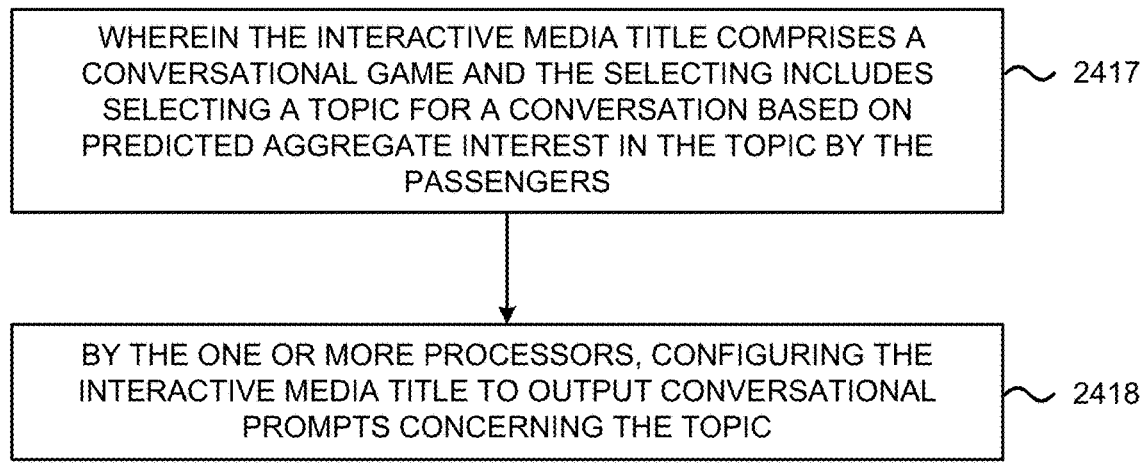

Referring to FIG. 24E, at 2417, the one or more processors perform the method 2400 wherein the interactive media title may include a conversational game and the selecting includes selecting a topic for a conversation based on predicted aggregate interest in the topic by the passengers. At 2418, one or more processors configure the interactive media title to output conversational prompts concerning the topic. An example of a conversational game is discussed with reference to FIG. 17, and an example of the predicted aggregate interest is discussed with reference to FIG. 8 above.

Figure 24G:
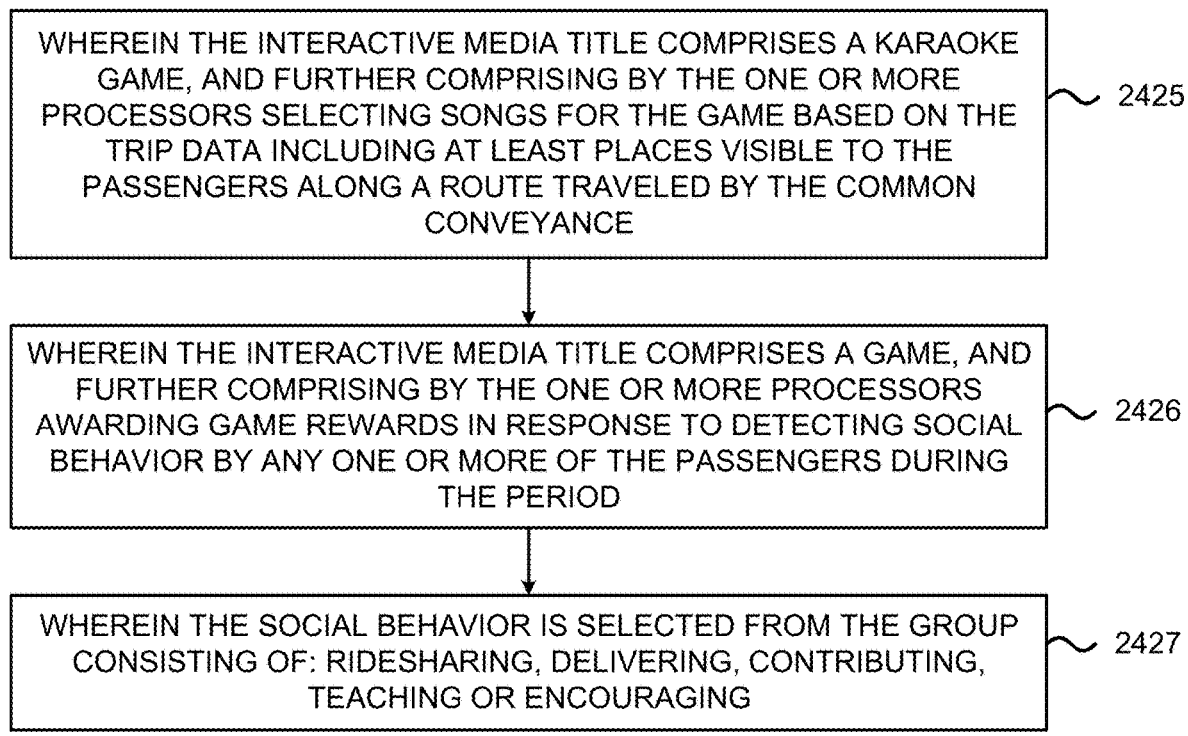
Figure 24F:
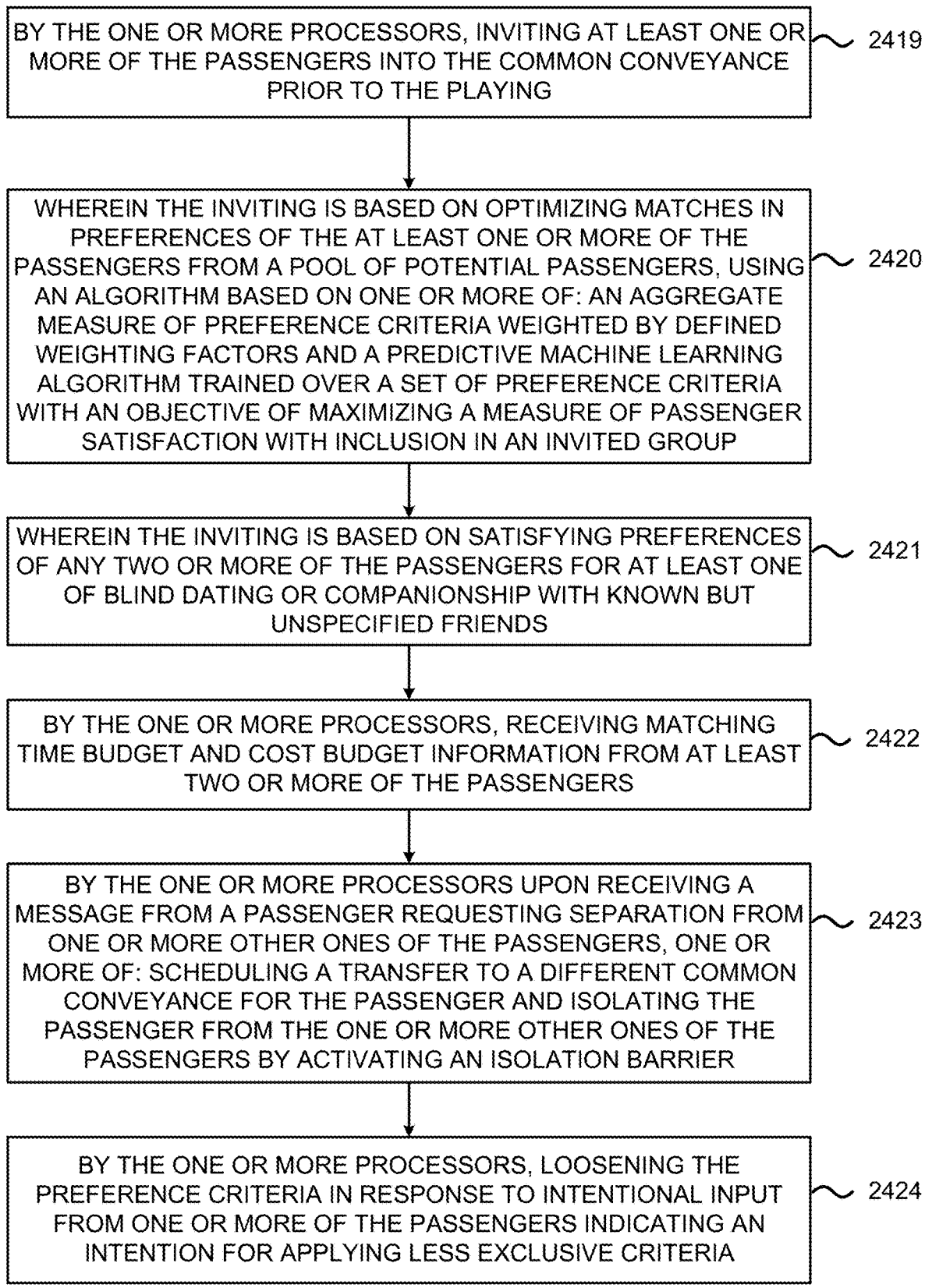

Referring to FIG. 24F, at 2419, the one or more processors invite at least one or more of the passengers into the common conveyance prior to the playing of the interactive media title, for example, in manners as described with respect to the process 1435 in FIG. 14 and to the process 2000 in FIG. 20.

At 2420, the one or more processors perform the method 2400 wherein the inviting is based on optimizing matches in preferences of the at least one or more of the passengers from a pool of potential passengers, using an algorithm based on one or more of: an aggregate measure of preference criteria weighted by defined weighting factors and a predictive machine learning algorithm trained over a set of preference criteria with an objective of maximizing a measure of passenger satisfaction with inclusion in an invited group, for example, as described with respect to the process 2020 in FIG. 20.

At 2421, the one or more processors perform the method 2400 wherein the inviting is based on satisfying preferences of any two or more of the passengers for at least one of blind dating or companionship with known but unspecified friends, for example, as discussed in connections with the process 1435 with reference to FIG. 14.

At 2422, the one or more processors receive matching time budget and cost budget information from at least two or more of the passengers, for example, Passengers B . . . n vis-a-vis Passenger A in connections with the process 1435 with reference to FIG. 14 above.

At 2423, the one or more processors, upon receiving a message from a passenger requesting separation from one or more other ones of the passengers, one or more of: scheduling a transfer to a different common conveyance for the passenger and isolating the passenger from the one or more other ones of the passengers by activating an isolation barrier. Example of the passenger transfer is described concerning the process 1445 with reference to FIG. 14 above.

At 2424, the one or more processors loosen the preference criteria in response to intentional input from one or more of the passengers indicating an intention for applying less exclusive criteria. For example, the processors may detect an intentional input from Passenger A indicating that the preference for playing a karaoke game should be loosened during a trip between Santa Monica and Burbank on Nov. 9, 2018, because Passenger A prefers instead to make a delivery of emergency food supply to a person that is shut-in in Sherman Oaks with higher priority.

Referring to FIG. 24G, at 2425, the one or more processors perform the method 2400 wherein the interactive media title may include a karaoke game, and the one or more processors further selects songs for the game based on the trip data including at least places visible to the passengers along a route traveled by the common conveyance, for example, in manners as described with respect to the process 1800 in FIG. 18.

At 2426, the one or more processors perform the method 2400 wherein the interactive media title may include a game, and further may include by the one or more processors awarding game rewards in response to detecting social behavior by any one or more of the passengers during the period, and at 2427, wherein the social behavior is selected from the group consisting of: ridesharing, delivering, contributing, teaching or encouraging, for example, as described with reference to the process 1900 in FIG. 19.

Figure 24H:
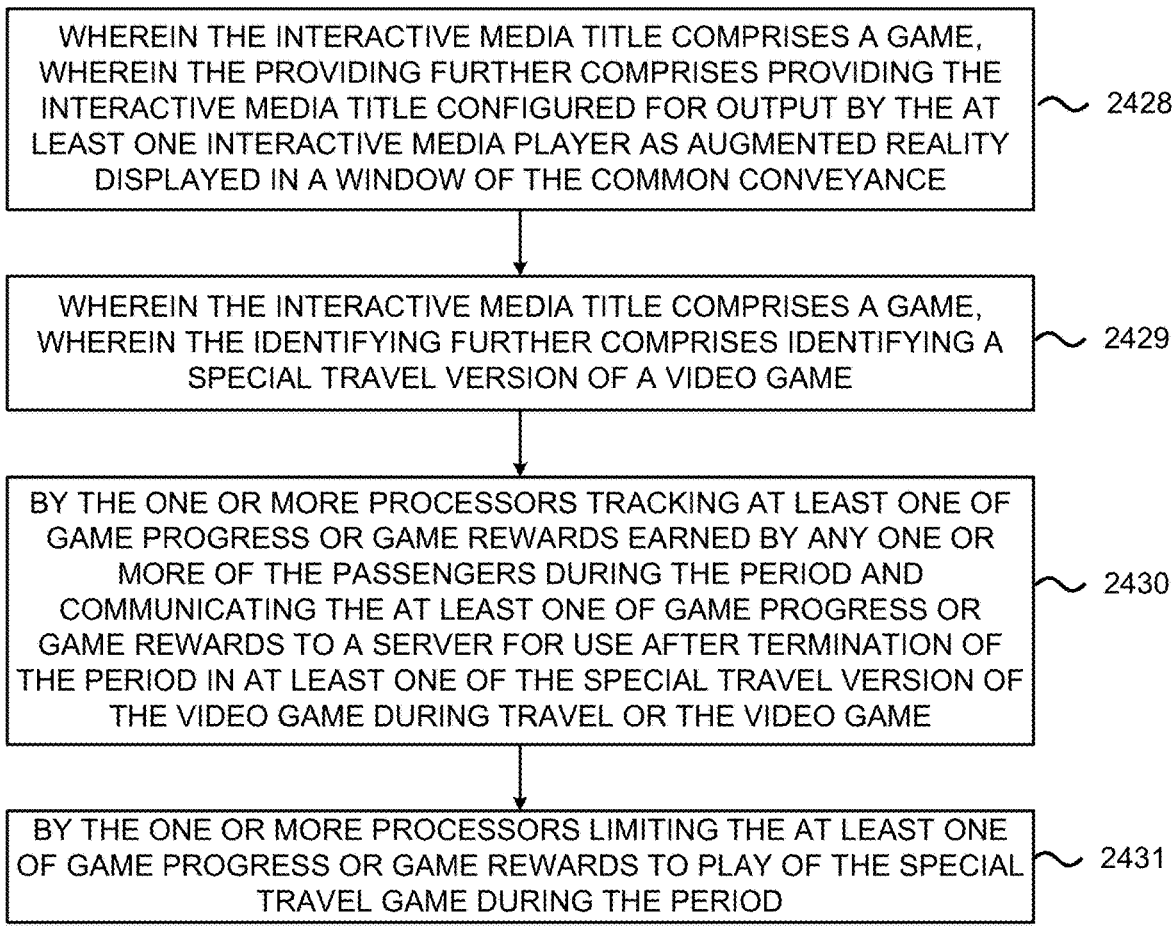

Referring to FIG. 24H, at 2428, the one or more processors perform the method 2400 wherein the interactive media title may include a game, wherein the providing further may include providing the interactive media title configured for output by the at least one interactive media player as augmented reality displayed in a window of the common conveyance. An example of the interactive title output as augmented reality in a window of the common conveyance is described with reference to FIGS. 4A, 4B, and 21 above.

At 2429, the one or more processors perform the method 2400 wherein the interactive media title may include a game, wherein the identifying further may include identifying a special travel version of a video game, at 2430 the one or more processors tracking at least one of game progress or game rewards earned by any one or more of the passengers during the period and communicating the at least one of game progress or game rewards to a server for use after termination of the period in at least one of the special travel version of the video game during travel or the video game, and at 2431 the one or more processors limiting the at least one of game progress or game rewards to play of the special travel game during the period, for example in the manners as described for the special travel version of the video game with reference to FIG. 23 above.

Figure 24J:
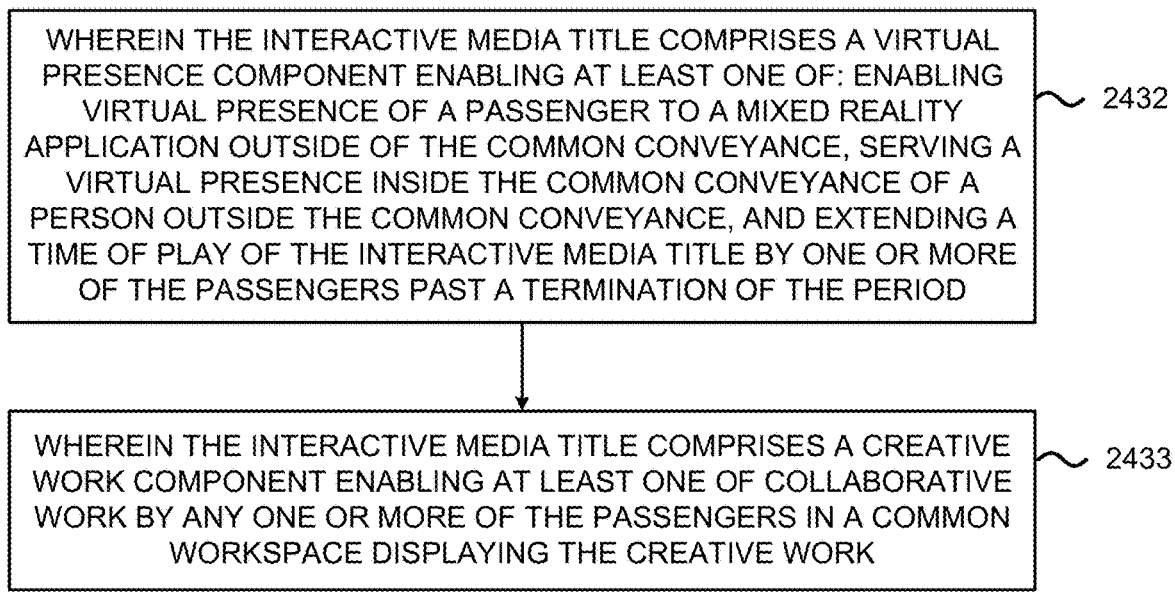

Referring to FIG. 24J, at 2432, the one or more processors perform the method 2400 wherein the interactive media title may include a virtual presence component enabling at least one of: enabling virtual presence of a passenger to a mixed reality application outside of the common conveyance, serving a virtual presence inside the common conveyance of a person outside the common conveyance, and extending a time of play of the interactive media title by one or more of the passengers past a termination of the period, for example, as discussed with reference to FIG. 22 above. In some aspect, the time of play of the interactive media title may be extended by one or more of the passengers in the shared common conveyance past a termination of the period of shared common conveyance, when the one or more of the passengers is virtually present inside the common conveyance.

In 2433, the one or more processors perform the method 2400 wherein the interactive media title may include a creative work component enabling at least one of collaborative work by any one or more of the passengers in a common workspace displaying the creative work, for example, as discussed with reference to FIG. 22.

Referring to FIG. 25, FIG. 25 is a conceptual block diagram illustrating components of an apparatus or system 2500 for configuring interactive media customized for passengers temporarily sharing a common conveyance, the parameters of the interactive media title based at least in part on the profile data and the trip data, as described herein, according to one embodiment. The apparatus or system 2500 may include additional or more detailed components for performing functions or process operations as described herein. As depicted, the apparatus or system 2500 may include functional blocks that can represent functions implemented by a processor, software, or combination thereof (e.g., firmware).

As illustrated in FIG. 25, the apparatus or system 2500 may include an electrical component 2502 for identifying profile data for each of the passengers and trip data for the common conveyance. The component 2502 may be, or may include, a means for said identifying. Said means may include the processor 2510 coupled to the memory 2516, a network interface 2511, a biometric sensor (array) 2514, a storage 2515, an output port 2512, and a bus 2513, the processor executing an algorithm based on program instructions stored in the memory. In an aspect, the profile data and trip data may be received from external systems via the network interface (not shown). Such algorithm may include a sequence of more detailed operations, for example, establishing a communication session with a client device associated with at least one of a passenger or a vehicle; receiving during the session information from the client device identifying a second client device associated with the other one of a passenger or a vehicle, establishing a second communication session with the second client device, requesting and/or receiving the information about a travel route from one or both of the client device and the second client device;

and determining travel information based at least in part on the travel route and a position of the vehicle.

The apparatus 2500 may further include an electrical component 2503 for selecting an interactive media title for the passengers as a group. The component 2503 may be, or may include, a means for said selecting. Said means may include the processor 2510 coupled to the memory 2516, a network interface 2511, a biometric sensor (array) 2514, a storage 2515, an output port 2512, and a bus 2513, the processor executing an algorithm based on program instructions stored in the memory. Such algorithm may include a sequence of more detailed operations, for example, as shown in FIGS. 7, 13A, and FIG. 15.

The apparatus 2500 may further include an electrical component 2504 for providing the interactive media title configured for output by at least one interactive media player during a period in which the passengers are sharing the common conveyance. The component 2502 may be, or may include, a means for said providing. Said means may include the processor 2510 coupled to the memory 2516, a network interface 2511, a biometric sensor (array) 2514, a storage 2515, an output port 2412, and a bus 2413, the processor executing an algorithm based on program instructions stored in the memory. Such algorithm may include a sequence of more detailed operations, for example, establishing a communication session with an interactive media player located in the common conveyance, and at least one of streaming or pushing the interactive media title to the interactive media player for output in the common conveyance.

The apparatus 2500 may further include an electrical component 2505 for playing, by the at least one interactive media player, the interactive media in the common conveyance enabled for interaction with the passengers during the period. The component 2455 may be, or may include, a means for said playing. Said means may include the processor 2510 coupled to the memory 2516, a network interface 2411, a biometric sensor (array) 2514, a storage 2515, an output port 2512, and a bus 2513, the processor executing an algorithm based on program instructions stored in the memory for playing the interactive media. In some aspect, the media player may include xR mixed reality output (including augmented and virtual reality). For example, the interactive media player may be or include xR (mixed reality) output devices (e.g., xR headsets), computers (e.g., mobile), televisions, digital projectors, smartphones, personal digital assistants (PDAs), and other electronic devices both wired and wireless a vehicle-based media player. In another aspect, the media player device may be or may include a mobile communication device, in addition to or instead of vehicle-based media players.

The apparatus 2500 may optionally include a processor module 2510 having at least one processor. The processor 2510 may be in operative communication with the modules 2502-2505 via a bus 2513 or similar communication coupling. In the alternative, one or more of the modules may be instantiated as functional modules in a memory of the processor. The processor 2510 may effect initiation and scheduling of the processes or functions performed by electrical components 2502-2505.

In related aspects, the apparatus 2500 may include a network interface module 2511 operable for communicating with system components over a computer network, or communicating with any external storage device, with external systems or servers, or connected vehicles over a computer network. A network interface 2511 module may be, or may include, for example, an Ethernet port or serial port (e.g., a Universal Serial Bus (USB) port), a Wi-Fi interface, or a cellular telephone interface. In further related aspects, the apparatus 2500 may optionally include a module for storing information, such as, for example, a memory device 2516. The computer readable medium or the memory module 2516 may be operatively coupled to the other components of the apparatus 2500 via the bus 2513 or the like. The memory module 2416 may be adapted to store computer readable instructions and data for effecting the processes and behavior of the modules 2502-2505, and subcomponents thereof, or the processor 2510, the method 2400 and one or more of the additional operations 2405-2433 disclosed herein, or any method for performance by an interactive media content output device (interactive media player) described herein. The memory module 2516 may retain instructions for executing functions associated with the modules 2502-2505 and any one or more of the operations described herein, for example in connection with one or more of FIGS. 5-23. While shown as being external to the memory 2516, it is to be understood that the modules 2502-2505 can exist within the memory 2516 or an on-chip memory of the processor 2510.

The apparatus 2500 may include a transceiver 2512 configured as a wireless transmitter/receiver, or a wired transmitter/receiver, for transmitting and receiving a communication signal to/from another system component such as, for example, an RFID tag or location information transmitter. In alternative embodiments, the processor 2510 may include networked microprocessors from devices operating over a computer network. In addition, the apparatus 2500 may include a stereoscopic display or other immersive display device for displaying immersive content, or other suitable output device. A stereoscopic display device may be, or may include, any suitable stereoscopic AR or VR output device as described herein above, or as otherwise known in the art. The apparatus 2500 may include, or may be connected to, one or more biometric sensors 2514, which may be of any suitable types. Various examples of suitable biometric sensors are described herein above.

Figure 26:
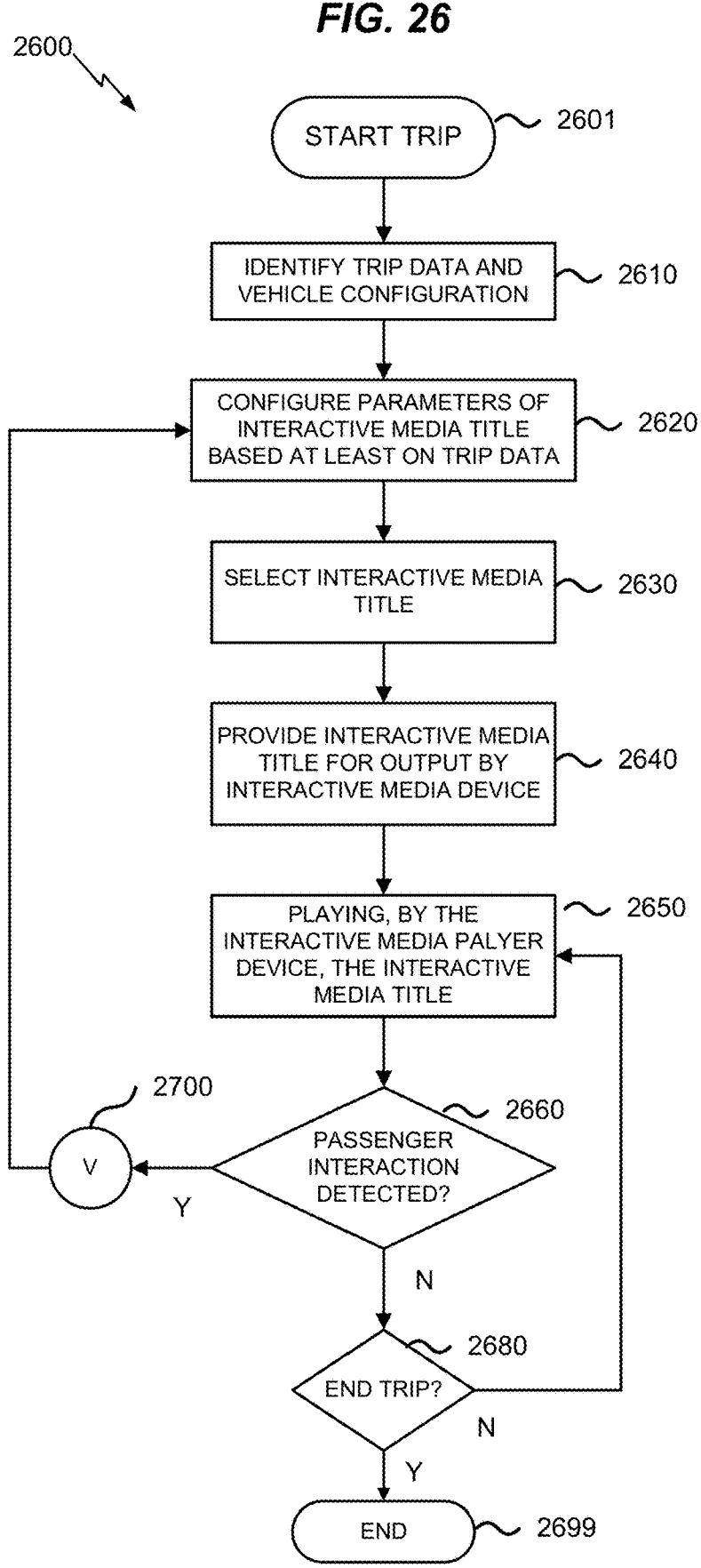
FIG. 26 is a flow chart illustrating high-level aspects of a method for configuring interactive media customized for a passenger traveling in a vehicle.

The apparatus 200 and 300 may perform methods for configuring interactive media customized for a passenger traveling in a vehicle, each alone, or working in cooperation. FIG. 26 shows an overview 2600 of configuring interactive media customized for a passenger traveling in a vehicle. The method 2600 may be performed by one or more computer processors of a server in electronic communication with the connected vehicle 106 and servers within the system 100, and/or an independent server of the vehicle not in electronic communication with other vehicle or the servers. The method begins at 2601 when a passenger is detected in a vehicle, boarding a vehicle, or hailing a vehicle, for traveling in the vehicle, as defined elsewhere herein.

At the process 2610, the one or more processors at a content server receive signals indicating trip data 1015 describing a trip for the vehicle in which the passenger travels (e.g., vehicle 101 or 106) and the vehicle configuration. In some embodiments, the processor(s) access a database (e.g., any one or more of 116, 122, 124, 126, 128, 220, etc.) including configuration information for the vehicle 106 upon receiving the signals.

In an aspect, the trip data may include data bits representing at least the vehicle's trip origin, destination, an estimated duration, places along the trip's route, and vehicle configuration. The trip data contains information representing geospatial locations of one or more data targets, and may include, for example, positional coordinates such as the latitude, longitude, and height relative to an ellipsoidal Earth model as may be provided by a satellite-based radio navigation system such as the Global Positioning System (GPS), street address, name (e.g., landmark or building names such as the Golden Gate Bridge, San Francisco International Airport, Stanford University, city name, etc.), street view (e.g., Street View available on Google Maps, etc.), and the like of the data target.

In one aspect, a passenger uses her smartphone communicably connected to the vehicle 106 to hail the vehicle 106 using a ridesharing app (e.g., Uber, etc.) to take a trip on the vehicle 106 to a desired destination. As part of hailing the vehicle 106, trip data 1015 may be collected from the smartphone by the processor 202, 214, or 302. For example, at least the destination and timing (trip start time and estimated or actual end time) and vehicle configuration may be collected. In other embodiments, the trip data 1015 may be collected or inferred from input by the passenger via U/I 324, or from available information on the internet including social media information pertaining to the passenger (e.g., Facebook accounts, etc.). In certain embodiments, trip data 1015 may be collected with respect to any of the vehicles 101 (involving other use examples other than the ridesharing scenario described above) using similar or other means that may be appreciated by those having ordinary skill in the art.

At the process 2620, the method may further include configuring parameters of interactive media title based at least on trip data. For example, for a single Passenger A taking a solo ride on a vehicle 106 having a pick up location at Santa Monica and a termination location at 400 W Riverside Dr. (e.g., FIGS. 5, 6, and 21), the parameters of the interactive media title are configured with higher priority for intermediate locations between the pick up location and the termination location, e.g., Beach (IL1) and Dog Park (IL2).

At the process 2630, the method may further include producing an interactive media title for the passenger by at least one of selecting or configuring the interactive media content components from the interactive media content database. In an aspect, the selection or configuration of the components is based at least on the trip data 1015 for the passenger. In another aspect, the selected or configured components refer to at least one place along the route while in-bound from or out-bound to a trip destination as part of an interactive narrative. In an aspect, time (for example, hour, day, month, season, etc.) of the trip may also be used in the selection or configuration of the interactive media content components. The method may also include selecting or configuring, and producing the interactive media content based in part on the specifications of the hardware such as the interactive media player for entertainment consumption at each vehicle, for example whether the media player has 3D or virtual reality/augmented reality capabilities. The one or more processors at process 2630 may use an interactive media content algorithm 1030 (FIG. 10), which may be a rule-based algorithm, a predictive analytics (AI) algorithm (interactive media content AI), or a combination of both, to select and configure an interactive media content for the identified passenger. Further details of the structure and operations of the interactive media content algorithm 1030 are discussed above with reference to FIGS. 13B-13C.

At the process 2640, the one or more processors deliver the produced interactive media title selected or configured at the process 2630 to the passenger traveling in the vehicle, e.g., to the one or more interactive media player devices in or on the vehicle, such as the interactive media content consumption apparatus 300, including but not limited to the virtual display devices 400, 4100, and 4200, and any or all of the components thereof.

At the process 2650, the at least one interactive media player plays the interactive media title in the vehicle enabled for interaction with the passenger during the trip. For example, suppose the vehicle configuration according to the trip data indicates that the vehicle is enabled for a virtual driving game. In such example, a virtual driving game such as the ones described with reference to FIG. 21 may be played.

At the process 2660, the one or more processors determine whether a passenger interaction is detected. If yes, the configuration method proceeds to the process V (2700). If not, the process 2600 proceeds to the process 2680, in which the one or more processors determine whether the trip is ended. For example, once the vehicle arrives at the terminal location, the one or more processors determine that the trip is ended, and ends the configuration process 2600 at the process 2699. If not, the configuration method 2600 proceeds to the process 2650.

Figure 27:
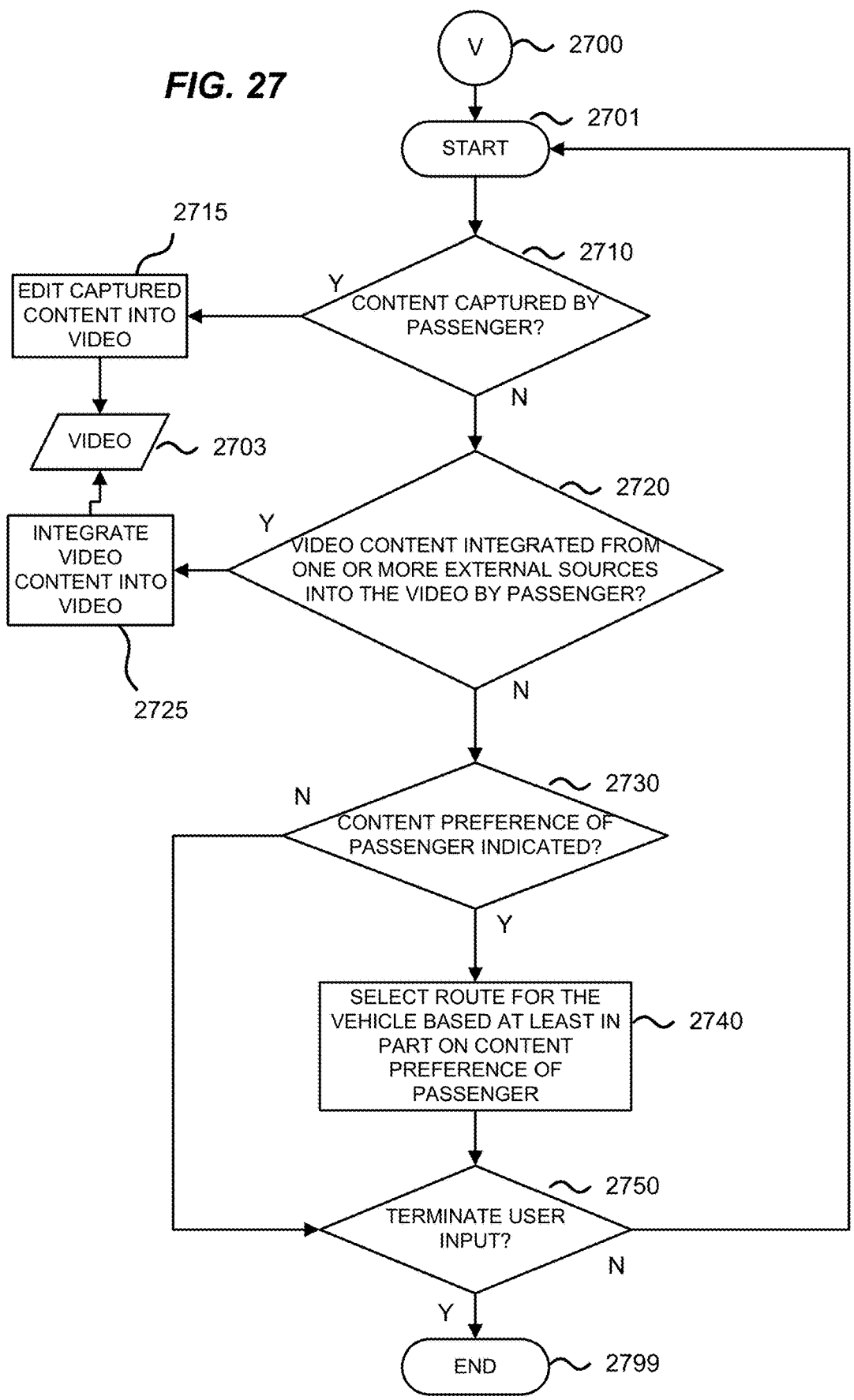
FIG. 27 is a flow chart showing an algorithm for configuring parameters of interactive media title in response to passenger interaction with the interactive media title.

Referring to FIG. 27, the process V (2700) starts at 2701. At the process 2710, the one or more processors determine whether a content is captured by the passenger. For example, the content may include captured by one or more cameras of the vehicle. In another aspect, the content may be captured by a camera device connected to the vehicle, such as the passenger's smartphone or other connected devices. If yes, the captured content may be edited at 2715 into a video 2703. If not, the one or more processors may detect whether video content from one or more external sources is selected or configured for integration into the video 2703 by the passenger. If yes, the external video content is integrated into the video 2703 at the process 2725. If not, the one or more processors determine whether content preference is indicated by the passenger, e.g., as part of the profile data that the processors may optionally collect as part of the hailing of the ride, or specifically indicated by user interface input by the passenger. If yes, the one or more processors at the process 2740 select route for the vehicle based at least in part on the indicated content preference of passenger, in whole or in part. The method 2700 then proceeds to the process 2750. If no content preference is indicated at 2730, the process 2700 proceeds to the process 2750.

At process 2750, the one or more processors determine whether the user input is terminated, and if so, end the process 2700 at 2799. If not, the process 2700 reverts to the beginning at 2701.

Figure 28A:
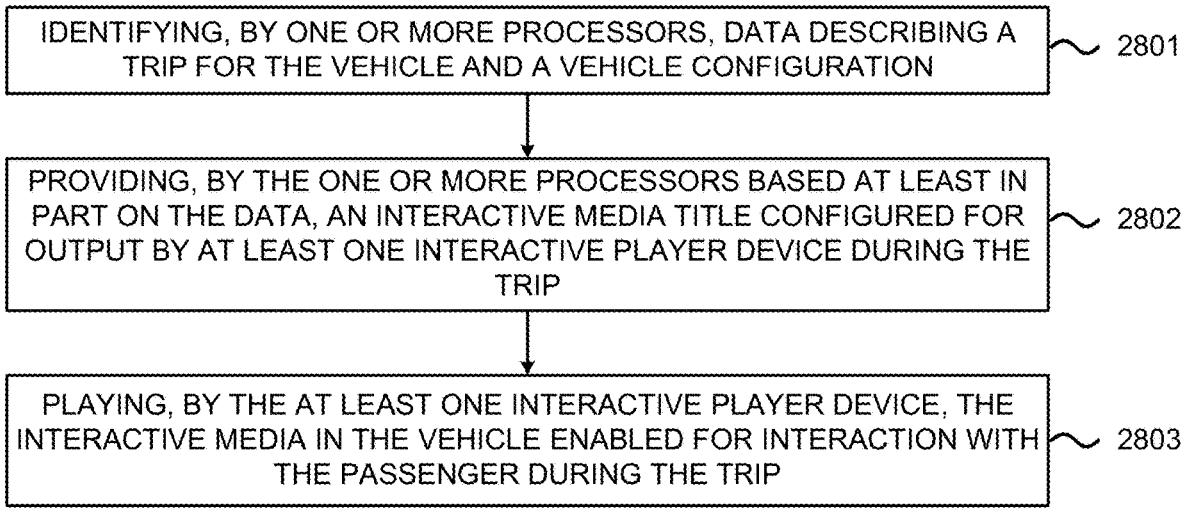
FIG. 28A is a flow chart illustrating aspects of a method for configuring interactive media customized for a passenger traveling in a vehicle.
Figure 28B:
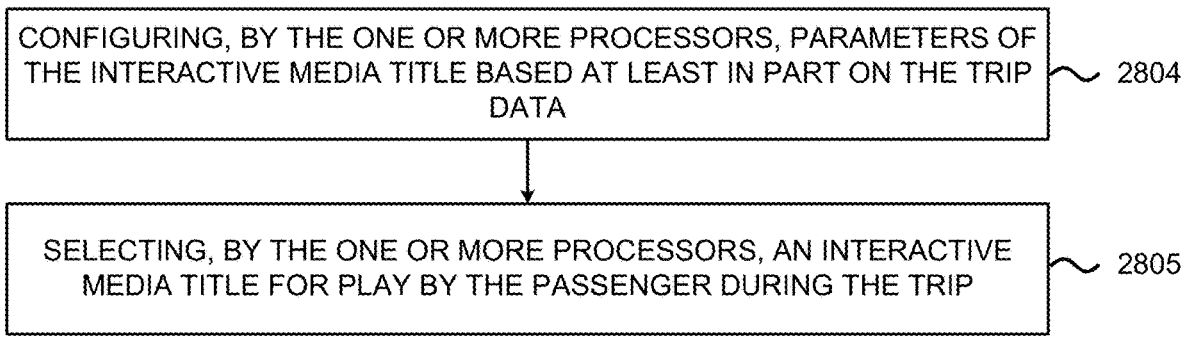
FIGS. 28B and 29A-29B are flow charts illustrating further optional aspects or operations of the method diagrammed in FIG. 28A.
Figure 29A:
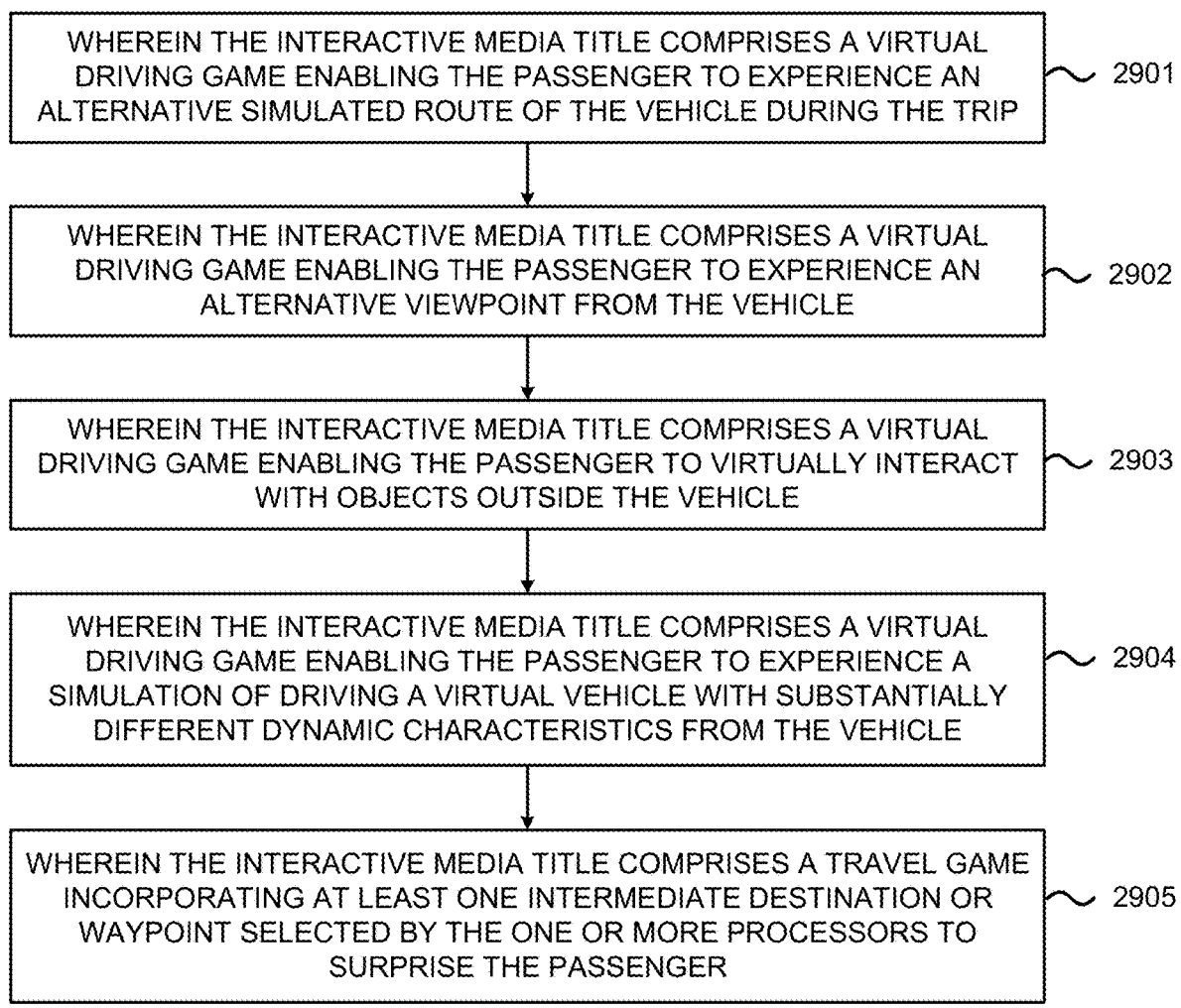
Figure 29B:
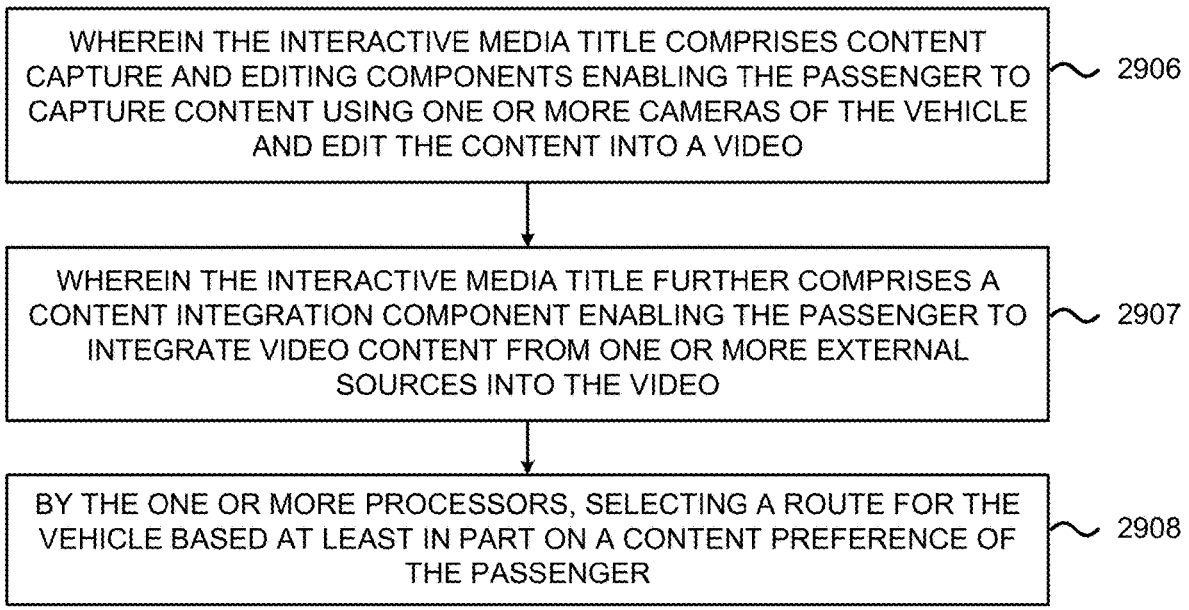

Referring to FIG. 28A, FIG. 28A is a flow chart illustrating aspects of a useful automatic process 2800 for configuring interactive media customized for passenger traveling in a vehicle, for example, based at least in part on the trip data, and FIGS. 28B-29B are flow charts illustrating further optional aspects or operations of the method diagrammed in FIG. 28A. In an aspect of the disclosure, the process 2800 may be performed by one or more processors at a content server or other servers described herein.

At the process 2801, the one or more processors identify data describing a trip for the vehicle and a vehicle configuration, for example, in manners as described with respect to the process 2610 with reference to FIG. 26 above.

At the process 2802, the one or more processors provide, based at least in part on the data, an interactive media title configured for output by at least one interactive player device during the trip, for example in manners as described with respect to the process 2640 with reference to FIG. 26 above.

At the process 2803, at least one interactive player device plays the interactive media in the vehicle enabled for interaction with the passenger during the trip, for example in manners as described with respect to the process 2640 in FIG. 26.

At the process 2804, the one or more processors configure parameters of the interactive media title based at least in part on the trip data, for example, in manners as described with respect to the process 2620 with reference to FIG. 26.

At the process 2805, the one or more processors select an interactive media title for play by the passenger during the trip, for example, in manners as described with respect to the process 2650 with reference to FIG. 26.

At the process 2901, the one or more processors perform the method 2800 wherein the interactive media title includes a virtual driving game enabling the passenger to experience an alternative simulated route of the vehicle during the trip, for example the virtual driving game enabling the passenger to experience an alternative simulated route (driving on a sandy beach 2110) as described with reference to FIG. 21.

At the process 2902, the one or more processors perform the method 2800 wherein the interactive media title may include a virtual driving game enabling the passenger to experience an alternative viewpoint from the vehicle, for example the virtual driving game enabling the passenger to experience an alternative viewpoint (bat flying over a bridge 2130) as described with reference to FIG. 21.

At the process 2903, the one or more processors perform the method 2800 wherein the interactive media title may include a virtual driving game enabling the passenger to virtually interact with objects outside the vehicle, for example the virtual driving game enabling the passenger to virtually interact with objects outside the vehicle (walking a dog 2120) as described with reference to FIG. 21.

At the process 2904, the one or more processors perform the method 2800 wherein the interactive media title may include a virtual driving game enabling the passenger to experience a simulation of driving a virtual vehicle with substantially different dynamic characteristics from the vehicle. For example, in an aspect, the one or more processors may simulate a racecar, airplane, etc., with substantially different dynamic characteristics from the vehicle (with dynamic characteristics of an ordinary street car). For example, VR/AR/xR technology may be used to enhance the experience of driving the simulated vehicle (e.g., the VR/AR/xR display on the windshield and windows display outside scenery moving at a much accelerated speed than the actual speed that the vehicle otherwise would travel under a given input/depression of the gas pedal). In an aspect, operation of the simulated vehicle is limited on a special track for safety reasons. In another aspect, the operator control of the simulated vehicle is limited in scope and/or degree within computer-controlled limits, again for safety. In another aspect, the control of the simulated vehicle may be completely controlled by a computer for less daring drivers.

At the process 2905, the one or more processors perform the method 2800 wherein the interactive media title may include a travel game incorporating at least one intermediate destination or waypoint selected by the one or more processors to surprise the passenger. For example, the passenger A, in hailing the vehicle for a trip between Santa Monica and Burbank, does not expect that the travel on the vehicle would take him to a flower shop in Century City. However, the one or more processors select the flower shop to surprise the passenger. For example, the one or more processors determines that today is a wedding anniversary for Passenger A and his wife, and Passenger A still has not purchased a flower for the occasion. For example, such information may be deduced by the one or more processors based on the trip history of Passenger A from exactly one year ago as recorded in the trip data, where Passenger A has stopped at the same flower shop in Century City (to purchase an anniversary bouquet). Other sources of information may be used, such as the profile data of Passenger A, or social media posting (e.g., Facebook profile) on the internet.

At the process 2906, the one or more processors perform the method 2800 wherein the interactive media title includes content capture and editing components enabling the passenger to capture content using one or more cameras of the vehicle and edit the content into a video, for example, as described with reference to FIG. 27.

At the process 2907, the one or more processors perform the method 2800 wherein the interactive media title further may include a content integration component enabling the passenger to integrate video content from one or more external sources into the video as described with reference to FIG. 27.

At the process 2908, the one or more processors further select a route for the vehicle based at least in part on a content preference of the passenger. For example, in the flower shop example above, the content preference of the passenger in the profile data includes the flower shop in Century City, and the processor selects a route between Santa Monica and Burbank that passes or stops at the flower shop in Century City.

FIG. 30 is a conceptual block diagram illustrating components of an apparatus or system 3000 for configuring interactive media customized for passengers temporarily traveling in a vehicle, based at least in part on the data describing a trip for the vehicle and a vehicle configuration, as described herein, according to one embodiment. As depicted, the apparatus or system 3000 may include functional blocks that can represent functions implemented by a processor, software, or combination thereof (e.g., firmware).

As illustrated in FIG. 30, the apparatus or system 3000 may include an electrical component 3002 for identifying data describing a trip for the vehicle and a vehicle configuration. The component 3002 may be, or may include, a means for said identifying. Said means may include the processor 3010 coupled to the memory 3016, storage which may store the data structure (not shown), the output port 3012, and to the network interface (not shown), the processor executing an algorithm based on program instructions stored in the memory. Such algorithm may include a sequence of more detailed operations, for example, as described in connection with FIGS. 26 and 27 above. In an aspect, the data describing the trip and the vehicle configuration may be received from external systems via the network interface (not shown). Such algorithm may include a sequence of more detailed operations, for example, establishing a communication session with a client device associated with at least one of a passenger or a vehicle; receiving during the session information from the client device identifying a second client device associated with the other one of a passenger or a vehicle, establishing a second communication session with the second client device, requesting and/or receiving the information about a travel route from one or both of the client device and the second client device; and determining travel information based at least in part on the travel route and a position of the vehicle.

The apparatus or system 3000 may further include an electrical component 3003 for providing, based at least in part on the data, an interactive media title configured for output by at least one interactive player device during the trip. The component 3003 may be, or may include, a means for said providing. Said means may include the processor 3010 coupled to the memory 3016, storage which may store the data structure (not shown), the output port 3012 and to the network interface (not shown), the processor executing an algorithm based on program instructions stored in the memory. Such algorithm may include a sequence of more detailed operations, for example, as described in connection with FIG. 26.

The apparatus or system 2500 may further include an electrical component 3004 for playing, by the at least one interactive player device, the interactive media in the vehicle enabled for interaction with the passenger during the trip. The component 3004 may be, or may include, a means for said playing. Said means may include the processor 3010 coupled to the memory 3016, storage which may store the data structure (not shown), the output port 3012 and to the network interface (not shown), the processor executing an algorithm based on program instructions stored in the memory for playing the interactive media. In some aspect, the media player may include xR mixed reality output (including augmented and virtual reality). For example, the interactive media player may be or include xR (mixed reality) output devices (e.g., xR headsets), computers (e.g., mobile), televisions, digital projectors, smartphones, personal digital assistants (PDAs), and other electronic devices both wired and wireless a vehicle-based media player. In another aspect, the media player device may be or may include a mobile communication device, in addition to or instead of vehicle-based media players.

The apparatus or system 3000 may further include an electrical component 3005 for configuring parameters of the interactive media title based at least in part on the trip data. The component 3005 may be, or may include, a means for said configuring. Said means may include the processor 3010 coupled to the memory 3016, storage which may store the data structure (not shown), the output port 3012 and to the network interface (not shown), the processor executing an algorithm based on program instructions stored in the memory. Such algorithm may include a sequence of more detailed operations, for example, as described in connection with FIGS. 13B, and 13C above.

The apparatus or system 3000 may further include an electrical component 3006 for selecting, by the one or more processors, the interactive media title for play by the passenger during the trip. The component 3006 may be, or may include, a means for said selecting. Said means may include the processor 3010 coupled to the memory 3016, storage which may store the data structure (not shown), the output port 3012 and to the network interface (not shown), the processor executing an algorithm based on program instructions stored in the memory. Such algorithm may include a sequence of more detailed operations, for example, as described in connection with FIGS. 3C, 5, 6, 10, 13A, 13B, and 13C above.

The apparatus or system 3000 may further include a processor 3010 having one or more processors, which may include a digital signal processor. The processor 3010, in such case, may be in operative communication with the modules 3002-3008 via a bus 3013 or other communication coupling, for example, a network. The processor 3010 may execute a predictive analytics algorithm 3014 logically structured in memory 3016.

The apparatus or system 3000 may further include an output port 3012 operable for communicating with any external storage device, with external systems or servers, or connected vehicles over a computer network.

The apparatus or system 3000 may further include memory 3016, which may be or include a module for storing information, such as, for example, a memory device/module. The computer readable medium or the memory module 3016 may be operatively coupled to the other components of the apparatus 3000 via the bus 3013 or the like. The memory module 3016 may be adapted to store computer readable instructions and data for effecting the processes and behavior of the modules 3002-3008, and subcomponents thereof, or the processor 3010, or one or more steps of the method 2800. The memory module 3016 may retain instructions for executing functions associated with the modules 3002-3006 and any one or more of the operations described herein, for example in connection with one or more of FIGS. 3C, 5, 6, 10, 13A, 13B, 13C, 26, and 27. While shown as being external to the memory 3016, it is to be understood that the modules 3002-3006 can exist within the memory 3016.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other formats). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for configuring interactive media customized for one or more passengers temporarily sharing a common conveyance, the method comprising:
   identifying, by one or more processors, profile data for each of the one or more passengers and trip data for the common conveyance;
   selecting, by the one or more processors, an interactive media title for the one or more passengers as a group, wherein the selecting includes selecting one or more songs for the interactive media title based on the trip data, and wherein the trip data includes at least one or more places visible to the passengers along a route traveled by the common conveyance;
   providing, by the one or more processors, the interactive media title configured for output by at least one interactive media player during a period in which the one or more passengers are sharing the common conveyance; and
   playing, by the at least one interactive media player, the interactive media title in the common conveyance enabled for interaction with the one or more passengers during the period.

2. The method of claim 1 further comprising configuring, by the one or more processors, parameters of the interactive media title based at least in part on the profile data and the trip data.

3. The method of claim 1, wherein the profile data comprises account identifiers for the one or more passengers and further comprising identifying one or more interactive media titles indicated as ready for play by one or more electronic accounts identified by the account identifiers wherein the selecting selects one of the interactive media titles indicated as ready for play.

4. The method of claim 1, wherein the selecting further comprises serving a user interface to the at least one interactive media player that enables the one or more of the passengers to provide intentional input to the selecting by the one or more processors.

5. The method of claim 4, wherein the selecting further comprises selecting the interactive media title based on at least one of the input, the past preference data, and the involuntary biometric sensor data.

6. The method of claim 1, wherein the profile data comprises at least one of present preference data, past preference data, and trip purpose for each of the one or more passengers.

7. The method of claim 1, further comprising processing, by the one or more processors, involuntary biometric sensor data indicating a transient neurological state of each of the one or more passengers relating to current or past preferences.

8. The method of claim 1 further comprising, by the one or more processors, defining a route for the common conveyance based at least in part on the interactive media title.

9. The method of claim 1 wherein the selecting chooses the interactive media title based at least in part on the title including content relating to one or more places within sight from the common conveyance of a defined route through which the one or more processors schedule the common conveyance to pass during the period and further comprising, by the one or more processors, synchronizing play of content relating to the one or more places to times at which the common conveyance passes respective ones of the one or more places.

10. The method of claim 9, wherein the synchronizing is based on location data from one or more location sensors located in or on the common conveyance.

11. The method of claim 1, wherein the trip data defines one or more criteria selected from the group consisting of: a duration for an interactive media session for play by the one or more passengers in the common conveyance, an initial location at which the one or more processors schedule initiation of the session, a terminal location at which the one or more processors schedule termination of the session, and one or more intermediate locations along a route defined by the one or more processors for the conveyance.

12. The method of claim 11, wherein the selecting is based on the one or more criteria, at least in part by an algorithm that evaluates relationships between user-facing elements of the interactive media and one or more of: the initial location, the terminal location and the one or more intermediate locations.

13. The method of claim 12, wherein the one or more processors define the one or more intermediate locations based at least in part on pickup or drop locations of the one or more passengers.

14. The method of claim 1, wherein the interactive media title comprises a conversational game and the selecting includes selecting a topic for a conversation based on predicted aggregate interest in the topic by the one or more passengers.

15. The method of claim 14 further comprising by the one or more processors, configuring the interactive media title to output conversational prompts concerning the topic.

16. The method of claim 1, further comprising by the one or more processors, inviting the one or more passengers into the common conveyance prior to the playing.

17. The method of claim 16, wherein the inviting is based on optimizing matches in preferences of the one or more passengers from a pool of potential passengers, using an algorithm based on one or more of: an aggregate measure of preference criteria weighted by defined weighting factors and a predictive machine learning algorithm trained over a set of preference criteria with an objective of maximizing a measure of the one or more passenger satisfaction with inclusion in an invited group.

18. The method of claim 1, wherein the interactive media title comprises a karaoke game.

19. The method of claim 1, wherein the interactive media title comprises a game, and further comprising by the one or more processors awarding game rewards in response to detecting social behavior by any of the one or more passengers during the period.

20. The method of claim 1, wherein the interactive media title comprises a game, wherein the providing further comprises providing the interactive media title configured for output by the at least one interactive media player as augmented reality displayed in a window of the common conveyance.

21. The method of claim 1, wherein the interactive media title comprises a game, wherein the identifying further comprises identifying a special travel version of a video game, and further comprising by the one or more processors tracking at least one of game progress or game rewards earned by any of the one or more passengers during the period and communicating the at least one of game progress or game rewards to a server for use after termination of the period in at least one of the special travel version of the video game during travel or the video game.

22. The method of claim 1, wherein the interactive media title comprises a virtual presence component enabling at least one of: enabling virtual presence of a passenger to a mixed reality application outside of the common conveyance, serving a virtual presence inside the common conveyance of a person outside the common conveyance, and extending a time of play of the interactive media title by the one or more passengers past a termination of the period.

23. The method of claim 1, wherein the interactive media title comprises a creative work component enabling at least one of collaborative work by any of the one or more passengers in a common workspace displaying the creative work.

24. An apparatus for configuring interactive media customized for one or more passengers temporarily sharing a common conveyance, the apparatus comprising at least one processor coupled to a memory and to an output for digital content, the memory holding instructions that when executed by the at least one processor causes the apparatus to perform:
- identifying profile data for each of the one or more passengers and trip data for the common conveyance;
- selecting an interactive media title for the one or more passengers as a group, wherein the selecting includes selecting one or more songs for the interactive media title based on the trip data, and wherein the trip data includes at least one or more places visible to the passengers along a route traveled by the common conveyance;
- providing the interactive media title configured for output by at least one interactive media player during a period in which the one or more passengers are sharing the common conveyance; and
- playing the interactive media title in the common conveyance enabled for interaction with the one or more passengers during the period.

* * * * *

UNITED STATES PATENT AND TRADEMARK OFFICE
CERTIFICATE OF CORRECTION

Page 1 of 1

PATENT NO. : 12,280,308 B2
APPLICATION NO. : 17/429293
DATED : April 22, 2025
INVENTOR(S) : Gary Lake-Schaal et al.

It is certified that error appears in the above-identified patent and that said Letters Patent is hereby corrected as shown below:

In the Claims

Column 64, Line 39, Claim 4, after "one or more" delete "of the"

Signed and Sealed this
Third Day of June, 2025

Coke Morgan Stewart
*Acting Director of the United States Patent and Trademark Office*